United States Patent
Kim et al.

(10) Patent No.: US 10,055,117 B2
(45) Date of Patent: Aug. 21, 2018

(54) REFRIGERATOR INCLUDING A TERMINAL TO PROVIDE CONTENT RELATED TO THE REFRIGERATOR

(71) Applicant: LG Electronics Inc., Seoul (KR)

(72) Inventors: Ji Hea Kim, Seoul (KR); Jung Ah Hwang, Seoul (KR); You Sook Eun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/143,051

(22) Filed: Apr. 29, 2016

(65) Prior Publication Data

US 2016/0239179 A1   Aug. 18, 2016

Related U.S. Application Data

(63) Continuation of application No. 13/580,422, filed as application No. PCT/KR2011/001209 on Feb. 23, 2011, now Pat. No. 9,353,990.

(30) Foreign Application Priority Data

Feb. 23, 2010 (KR) .................. 10-2010-0016207
Feb. 23, 2010 (KR) .................. 10-2010-0016208
(Continued)

(51) Int. Cl.
*G06F 3/0488* (2013.01)
*F25D 29/00* (2006.01)
(Continued)

(52) U.S. Cl.
CPC .......... *G06F 3/0488* (2013.01); *F25D 29/00* (2013.01); *G05B 15/02* (2013.01); *G05F 1/66* (2013.01);
(Continued)

(58) Field of Classification Search
CPC ... G06F 3/00; G06F 3/01; G06F 3/016; G06F 3/041; G06F 3/048; G06F 3/0481;
(Continued)

(56) References Cited

U.S. PATENT DOCUMENTS 5,544,295 A * 8/1996 Capps .................. G06F 3/0481
345/473
6,148,623 A * 11/2000 Park .................... G01M 99/005
62/129
(Continued)

FOREIGN PATENT DOCUMENTS

JP   7-325734 A   12/1995
JP   2000-193695 A   7/2000
(Continued)

*Primary Examiner* — Xiomar L Bautista
(74) *Attorney, Agent, or Firm* — Birch, Stewart, Kolasch & Birch, LLP

(57) ABSTRACT

The present invention relates to a refrigerator including a terminal and to a method for controlling same, and particularly, to a refrigerator including a terminal and to a method for controlling same which can visually provide necessary information to a user. To achieve this aim, the present invention provides a refrigerator including a terminal, comprising: a display module provided on the refrigerator; a communication unit communicating with the outside; and a control unit performing control to display various information on the display module.

6 Claims, 77 Drawing Sheets

(30) Foreign Application Priority Data

| Feb. 23, 2010 | (KR) | 10-2010-0016210 |
|---|---|---|
| Feb. 23, 2010 | (KR) | 10-2010-0016211 |
| Feb. 25, 2010 | (KR) | 10-2010-0017135 |
| Feb. 25, 2010 | (KR) | 10-2010-0017138 |
| Feb. 25, 2010 | (KR) | 10-2010-0017139 |
| Feb. 25, 2010 | (KR) | 10-2010-0017140 |
| Feb. 25, 2010 | (KR) | 10-2010-0017141 |

(51) Int. Cl.
*G05B 15/02* (2006.01)
*G05F 1/66* (2006.01)
*G06F 3/0481* (2013.01)
*G06F 3/0484* (2013.01)
*G06F 3/0486* (2013.01)
*G06F 3/14* (2006.01)
*G06T 11/20* (2006.01)

(52) U.S. Cl.
CPC ........ *G06F 3/0486* (2013.01); *G06F 3/04817* (2013.01); *G06F 3/04842* (2013.01); *G06F 3/14* (2013.01); *G06T 11/206* (2013.01); *F25D 2400/361* (2013.01); *F25D 2500/06* (2013.01); *F25D 2700/08* (2013.01); *G06T 2200/24* (2013.01)

(58) Field of Classification Search
CPC .... G06F 3/0482; G06F 3/0486; G06F 3/0488; G06F 3/04883; G06F 9/4443; G06F 1/1626; G01D 4/12; G01R 11/56; F25D 23/00; F25D 29/00
See application file for complete search history.

(56) References Cited

U.S. PATENT DOCUMENTS

| 6,714,222 | B1 | 3/2004 | Bjorn et al. |
| 6,845,486 | B2 | 1/2005 | Yamada et al. |
| 8,629,753 | B2 | 1/2014 | Yum et al. |
| 8,769,443 | B2* | 7/2014 | King ................ G06F 3/04883 715/863 |
| 2001/0010516 | A1 | 8/2001 | Roh et al. |
| 2002/0029575 | A1 | 3/2002 | Okamoto |
| 2005/0156870 | A1* | 7/2005 | Flinner .................. F25D 29/00 345/107 |
| 2005/0275636 | A1* | 12/2005 | Dehlin ................... G06F 3/011 345/173 |
| 2006/0111811 | A1 | 5/2006 | Okamoto et al. |
| 2006/0123807 | A1* | 6/2006 | Sullivan ................ G01D 4/004 62/129 |
| 2007/0097042 | A1* | 5/2007 | Bauer .................... F25D 29/00 345/82 |
| 2007/0257906 | A1* | 11/2007 | Shimura ................ A63F 13/10 345/419 |
| 2008/0046932 | A1 | 2/2008 | Stallings et al. |
| 2008/0159494 | A1 | 7/2008 | Quinlan et al. |
| 2008/0168403 | A1* | 7/2008 | Westerman ......... G06F 3/04883 715/863 |
| 2008/0195944 | A1 | 8/2008 | Lee et al. |
| 2008/0263445 | A1 | 10/2008 | Park |
| 2008/0272934 | A1* | 11/2008 | Wang ..................... H02J 3/14 340/870.11 |
| 2008/0309632 | A1* | 12/2008 | Westerman ............ G06F 3/038 345/173 |
| 2009/0046715 | A1 | 2/2009 | McCoy |
| 2009/0093277 | A1 | 4/2009 | Lee et al. |
| 2009/0158173 | A1 | 6/2009 | Palahnuk et al. |
| 2009/0201171 | A1* | 8/2009 | DeMartini ............ G01D 4/002 340/870.02 |
| 2009/0271731 | A1* | 10/2009 | Lin ...................... G06F 3/04883 715/776 |
| 2009/0289904 | A1 | 11/2009 | Park et al. |
| 2010/0036708 | A1 | 2/2010 | Lee et al. |
| 2010/0041442 | A1 | 2/2010 | Hong |
| 2010/0058792 | A1* | 3/2010 | Seo ....................... F25D 11/02 62/264 |
| 2010/0094475 | A1* | 4/2010 | Masters .................. G06F 1/26 700/292 |
| 2010/0304731 | A1* | 12/2010 | Bratton ................. H04N 5/232 455/420 |
| 2011/0193788 | A1* | 8/2011 | King ..................... G06F 3/017 345/173 |
| 2011/0202878 | A1* | 8/2011 | Park ..................... G06F 3/0482 715/825 |
| 2011/0209104 | A1* | 8/2011 | Hinckley .............. G06F 3/0416 715/863 |
| 2014/0114867 | A1* | 4/2014 | Volkmann ............ G06Q 10/06 705/308 |

FOREIGN PATENT DOCUMENTS

| JP | 2001-248955 A | 9/2001 | |
| JP | 2002-162149 A | 6/2002 | |
| JP | 2002-251518 A | 9/2002 | |
| JP | 2003-50880 A | 2/2003 | |
| JP | 2003-162787 A | 6/2003 | |
| JP | 2003-177950 A | 6/2003 | |
| JP | 2005-249358 A | 9/2005 | |
| JP | 2007-139270 A | 6/2007 | |
| KR | 10-2001-0016945 A | 3/2001 | |
| KR | 10-2001-0077305 A | 8/2001 | |
| KR | 10-0406094 B1 | 11/2003 | |
| KR | 10-2005-0097741 A | 10/2005 | |
| KR | 10-0565583 B1 | 3/2006 | |
| KR | 10-2006-0045582 A | 5/2006 | |
| KR | 10-2006-0056059 A | 5/2006 | |
| KR | 10-2006-0111004 A | 10/2006 | |
| KR | 10-2008-0045201 A | 5/2008 | |
| KR | 10-2008-0057475 A | 6/2008 | |
| KR | 20080055295 | * 6/2008 | ............ F25D 23/00 |
| KR | 10-0850671 B1 | 8/2008 | |
| KR | 10-2008-0103768 A | 11/2008 | |
| KR | 10-2008-0105930 A | 12/2008 | |
| KR | 10-2009-0035332 A | 4/2009 | |
| KR | 10-2009-0089521 A | 8/2009 | |
| KR | 10-2009-0089707 A | 8/2009 | |
| KR | 10-2010-0003589 A | 1/2010 | |
| KR | 10-2010-0011343 A | 2/2010 | |
| KR | 10-2010-0018244 A | 2/2010 | |
| KR | 10-2010-0020333 A | 2/2010 | |
| WO | WO 2008/072932 | * 6/2008 | ............ F25D 23/00 |

* cited by examiner

FIG. 42

| 2010, Jan. | | | | | | |
|---|---|---|---|---|---|---|
| SUN | MON | TUE | WED | THU | FRI | SAT |
|  |  |  |  |  | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| 31 |  |  |  |  |  |  |

~1422

FIG. 45
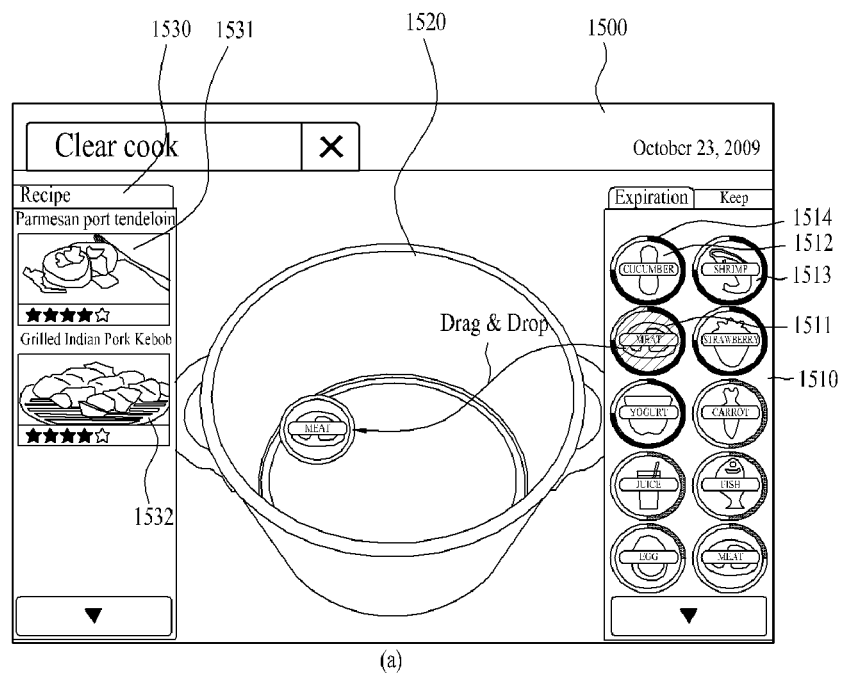
(a)
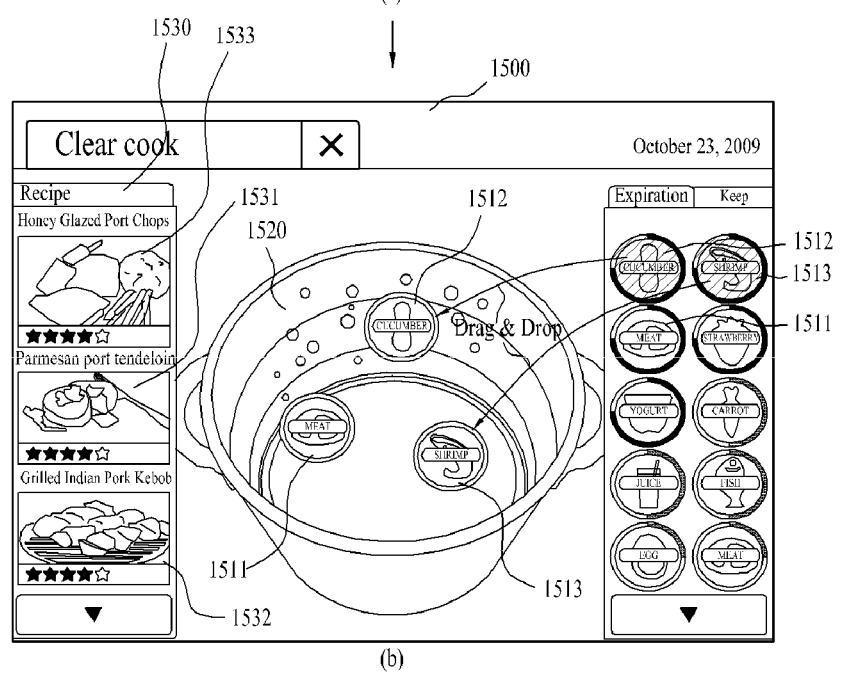
(b)

FIG. 48
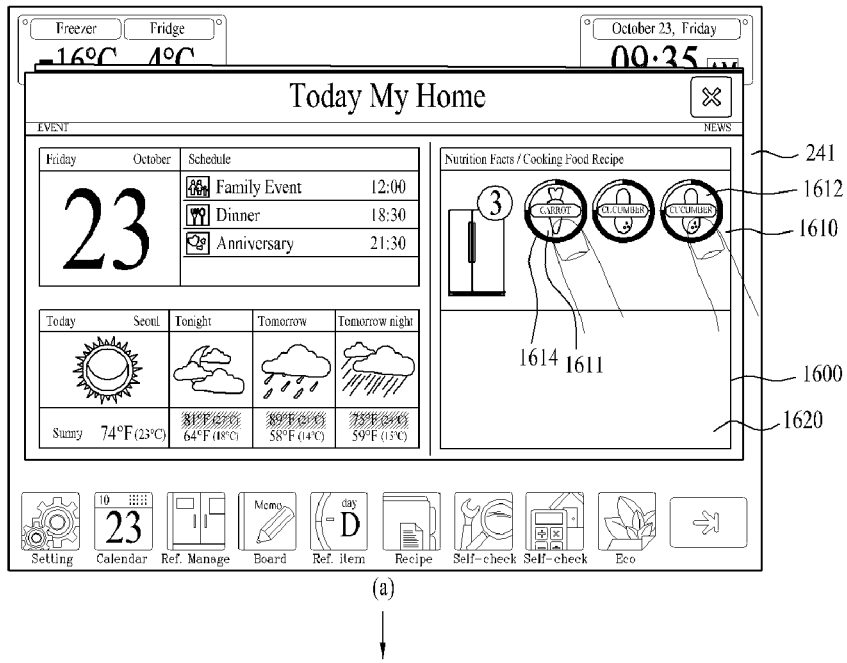
(a)
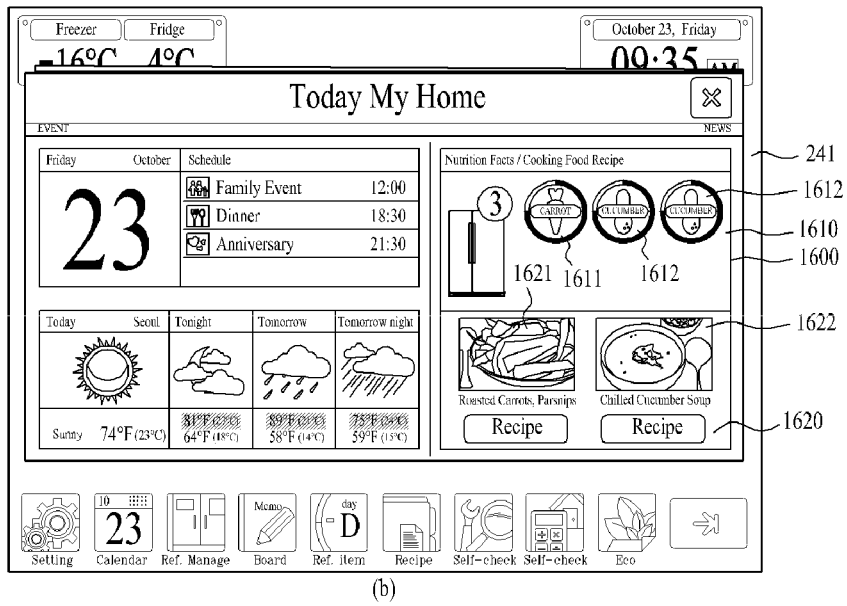
(b)

FIG. 67
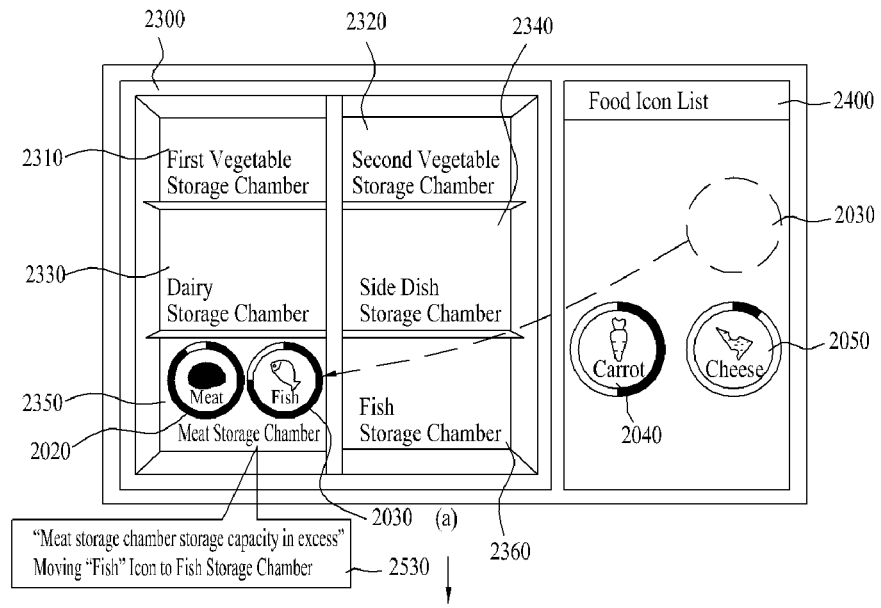
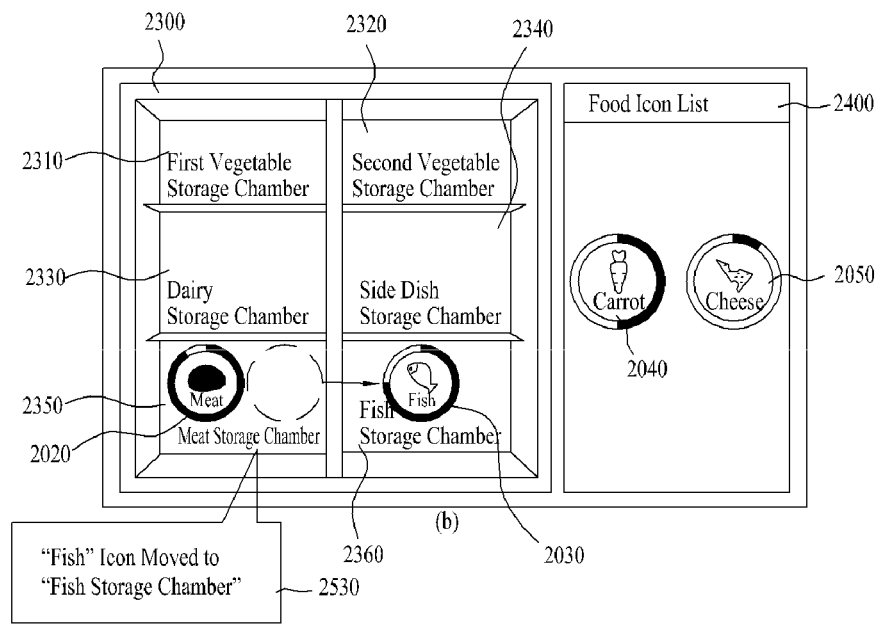

REFRIGERATOR INCLUDING A TERMINAL TO PROVIDE CONTENT RELATED TO THE REFRIGERATOR

CROSS-REFERENCE TO RELATED APPLICATIONS

This application is a Continuation of copending application Ser. No. 13/580,422, filed on Nov. 6, 2012, which was a National Stage Entry of PCT International Application No. PCT/KR2011/001209, filed on Feb. 23, 2011, which claims the benefit under 35 U.S.C. § 119(a) to Patent Application Nos. 10-2010-0017139, filed in the Republic of Korea on Feb. 25, 2010, 10-2010-0017140, filed in the Republic of Korea on Feb. 25, 2010, 10-2010-0017135, filed in the Republic of Korea on Feb. 25, 2010, 10-2010-0017141, filed in the Republic of Korea on Feb. 25, 2010, 10-2010-0017138, filed in the Republic of Korea on Feb. 25, 2010; 10-2010-0016210, filed in the Republic of Korea on Feb. 23, 2010, 10-2010-0016211, filed in the Republic of Korea on Feb. 23, 2010, 10-2010-0016208, filed in the Republic of Korea on Feb. 23, 2010, and 10-2010-0016207, filed in the Republic of Korea on Feb. 23, 2010, all of which are hereby expressly incorporated by reference into the present application.

TECHNICAL FIELD

Embodiments of the invention relate to a refrigerator including a terminal and a method for controlling the same, more particularly, to a refrigerator including a terminal and a method for controlling the same, which can visually provide necessary information to a user.

BACKGROUND

A refrigerator is an electric appliance that can refrigerate or freeze stored goods such as food stuffs, using a refrigerant cycle.

Typically, such a refrigerator includes freezer and refrigerator compartments, doors for opening and closing the freezer and refrigerator compartments, respectively, and a dispenser provided in the door to dispense ice or water.

A display device is provided in the conventional door to display an operational state of the refrigerator, namely, information on the temperature of the freezer compartment or the refrigerator compartment or ice making and to provide such information to a user.

However, the trend of smart electric appliances makes it necessary for display devices of electric appliances to have a function of providing or managing information on the user's life to enhance user convenience, rather than information on electric appliances.

DISCLOSURE

Technical Problem

Accordingly, the embodiments may be directed a refrigerator including a terminal and a method for controlling the same. An object of the embodiments may be to provide to a refrigerator including a terminal that can visually provide necessary information to a user, and a method for controlling the same.

Technical Solution

To achieve these objects and other advantages and in accordance with the purpose of the embodiments, as embodied and broadly described herein, a refrigerator comprising a terminal, the terminal includes a display module provided in the refrigerator to display actual power consumption or actual electric charge at a current electric power consumer, reference power consumption or reference electric charge provided from an outside and the result of comparison between them; a communication part to receive the reference power consumption or reference electric charge provided from the outside; a controller connected with the display module and the communication part, to control a data value to be displayed on the display module by comparing the actual power consumption or actual electric charge at the current electric power consumer with the reference power consumption or reference electric charge control and to control the result of the comparison to be displayed on the display module via different colors.

A color display window may be displayed on the display module to display whether the actual power consumption or actual electric charge is under, in an identical range with or over the reference power consumption or reference electric charge.

The color display window may include green, yellow and red lights.

The reference power consumption or the reference electric charge is variable according to time change and the controller controls the color display window to be luminous green when the actual power consumption or the actual electric charge is under the reference power consumption or the reference electric charge.

The controller may control the color display window to be luminous yellow when the actual power consumption or the actual electric charge is in the same range as the reference power consumption or the reference electric charge.

The controller may control the color display window to be luminous red when the actual power consumption or the actual electric charge is higher than the reference power consumption or the reference electric charge.

The controller may transmit a power consumption decreasing operation command to a compressor or a defrost heater connected thereto, to lower the actual power consumption or actual electric charge that is over the reference power consumption or reference electric charge.

The controller may control the electric bill or power consumption saved by the power save operation to be displayed on the display module.

The reference power consumption or reference electric charge includes,

A first reference power consumption or a first reference electric change that is an average value of the electric power or electric charge consumed in several houses who are customer of an electric power company or an electric power service company, and A second reference power consumption or a second reference electric charge that is a reference of a higher section where the electric bill is remarkably high that is defined by the user or the electric power company or the electric power service company.

In an embodiment of the invention, a method for controlling a refrigerator having a terminal includes a step of displaying the actual power consumption or actual electric charge at a current electric power consumer, reference power consumption or reference electric charge provided from an outside and the result of comparison between them; a step of comparing the actual power consumption or the actual electric charge with the reference power consumption or the reference electric charge; and a step of displaying the result of the comparison on the display module.

A step of displaying the result of the comparison as color information may display the result of the comparison as colors.

When the actual power consumption or the actual electric charge is under the reference power consumption or the reference electric charge, a green color is displayed on the display module.

When the actual power consumption or the actual electric charge is in the same range as the reference power consumption or the reference electric charge, a yellow color may be displayed on the display module.

When the actual power consumption or the actual electric charge is higher than the reference power consumption or the reference electric charge, a red color is displayed on the display module.

There may be further provided a step of displaying the actual power consumption or the actual electric charge and the reference power consumption or the reference electric charge on the display module as graphs or numbers changed by time.

In an embodiment of the invention, a refrigerator comprising a terminal, the terminal includes a touch screen to display a control icon for inputting a refrigerator operation control command, operation information of the refrigerator and electricity information; and a controller connected with the touch screen, to display an operation mode of the refrigerator based on the operation of the control icon and to display operation date of the refrigerator on the display module based on each operation mode.

The control icon may be draggable to enable the user to select an operation mode of the refrigerator.

A moving passage of the control icon may be displayed on the touch screen and an operation mode of power saver may be displayed at an end of the moving passage and an operation mode of high performance may be displayed at the other end of the moving passage.

The moving of the control icon by the user's touch and drag may be implemented between the end and the other end of the moving passage.

The controller may control change in data related to the operation states of the refrigerator including target temperatures of storage compartments based on the movement of the control icon to be displayed on the touch screen.

The data related to the operation modes of the refrigerator may include a temperature and power consumption of each storage compartment.

Based on the control of the controller, the target temperature of each storage compartment displayed on the touch screen may be displayed to be lowered and a target power consumption to be heightened as the user is moving the control icon closer to the end of the moving passage, and the target temperature is displayed to be heightened and the target power consumption is displayed to be lowered as the user is moving closer to the other end of the moving passage.

The electric charge data variable based on time provided from the outside and power consumption data of the other electric appliances in the house is received and a communication part connected with the controller.

On the touch screen may be displayed the actual power consumption of each of the other electric appliances, and The actual power consumption or the actual electric charge currently consumed in the house, and A reference power consumption or reference electric charge that is provided from the outside to be compared with the actual power consumption or the actual electric charge in the house.

The controller compares the actual power consumption or the actual electric charge currently consumed in the house with the reference power consumption or the reference electric charge. The controller may control the touch screen to display whether the former is under or in the same range as or over the latter.

The touch screen displays the result of the comparison such a short, the same or excess between the actual power consumption or the actual electric charge consumed in the house currently and the reference power consumption or the reference electric charge.

A color display window may be provided on the touch screen to display the results of the comparison as various colors.

When the result of the comparison is a short value, the result is displayed in green.

When the result of the comparison is in the identical range, the result may be displayed as yellow.

When the result of the comparison is in excess, the result may be displayed red.

Also, according to the invention may be further provided (A) determining whether a position of a control icon provided in the touch screen to generate an operation mode change command is changed;

(B) displaying a refrigerator operation corresponding to a changed position of the control icon and operation information related to the refrigerator operation, when the position of the control icon is changed.

The control icon is movable between an operation mode display having the highest power consumption of the refrigerator and an operation mode display having the lowest power consumption, to select a plurality of operation modes provided between the highest power consumption operation mode display and the lowest power consumption operation mode display.

The (B) may display operation information related to an operation mode of the refrigerator changed according to positions of the moved control icon by the user touch and drag.

The (B) step may display that a target temperature of each compartment is heightened and a target power consumption of the refrigerator is lowered, as the control icon is moved getting closer to the operation mode display having the lowest power consumption.

As the control icon is moved closer to the lowest power consumption operation mode display, the target temperature of each storage chamber may be displayed to be heightened and the target power consumption of the refrigerator may be displayed to be lowered.

Also, a method for controlling a refrigerator may include (C) receiving actual power consumption for each of electric appliances provided in the current house; (D) receiving a reference power consumption data or a reference electric charge data that will be compared with the actual power consumption or the actual electric charge; (E) comparing the actual power consumption or the actual electric charge with the reference power consumption or the reference electric charge to determine whether the former is under, in the same range or over the latter; (F) displaying letters or colors corresponding to the result of the determination.

The (E) may include a step of displaying the result of the comparison on the color display window provided in the touch screen green, when the result of the comparison is under the reference; a step of displaying the result of the comparison on the color display window yellow when the result is in the same range as the reference; and a step of displaying the result of the comparison on the color display window red when the result of the comparison is over the reference.

Meanwhile, there may be further provided (G) step overlapping the change in the actual power consumption or the actual electric charge classified by time as graphs to enable the user to visually compare it with the reference power consumption or the reference electric charge.

A refrigerator comprising a terminal, the terminal includes a touch screen to display predetermined information and to receive an input signal by touch; and a controller to control a display state or display contents of a calendar displayed on the touch screen based on the input signal input to the touch screen, wherein an enlarged frame is displayed on the touch screen to enlarge a display state of a specific week in the calendar, compared with the other weeks.

When the user touches the touch screen and moves the touched point upward or downward, the controller controls the calendar to be moved upward or downward along the moving of the touched point.

The enlarged frame may be fixed to a specific position on the touch screen.

The week before the specific week is displayed in an upper area of the enlarged frame and the week after the specific week is displayed in a lower area of the enlarged frame.

The controller may control a specific week located on the enlarged frame to be moved upward and the next week with respect to the specific week to be located on the enlarged frame, when the user moves a touched point on the touch screen upward.

The controller may control the specific week of the calendar located in the enlarged frame to be moved downward and the week before the specific week to be located on the enlarged frame, when the user moves a touched point on the display module downward.

An icon displaying a specific schedule may be displayed on the calendar.

When the week having the date corresponding to the schedule displaying icon is in the enlarged frame, comments on the schedule may be displayed together with the icons.

When the user moves the touched point upward or downward on the touch screen, the controller controls the specific week of the calendar located in the enlarged frame to be out of the enlarged frame and comments on a schedule planned in the specific week located in the enlarged frame to disappear.

The next week or the former week with respect to the specific week located outside the enlarged frame is controlled to be moved in the enlarged frame and comments related on a schedule corresponding to the icon are controlled to be popped up on the next week or the former week located in the enlarged frame.

When the touched icon corresponding a specific date is dragged to another date, the controller controls the icon moved to the dropped date.

When the user touches a specific date two or more times at preset intervals, the controller displays a plurality of icons displaying different schedule, respectively.

When the user touches a specific one of the icons, the controller displays the touched icon on a specific date.

The controller may display a touch keypad on the touch screen to enable the user to input desired text once touching a specific one of the icons.

There may be provided a step of determining whether touch is input to the touch screen; a step of determining whether the touched point is moved upward or downward;

a step of moving the calendar having lines referring to weeks along the moving direction of the touched point, when the touched point is moved upward or downward; and a step of enlarging the size of the specific week more than the other weeks, when a specific week is located in the enlarged frame provided in the display module in moving the calendar.

When an icon displaying a specific schedule and comments on the specific schedule are input on a specific date of the calendar, an icon and comments on the icon are displayed on the week having the specific date located in the enlarged frame and an icon is displayed on the week having the specific date located out of the enlarged frame.

Meanwhile, there may be provided a refrigerator comprising a terminal, the terminal including a touch screen to display predetermined information and to receive an input signal by touch; a communication part in communication with the outside to transmit and receive predetermined information; and a controller connected with the communication part and the touch screen to control a message or information received by the communication part from the outside to be displayed on the touch screen.

The controller stores a corresponding message or information in a predetermine memo board and controls the message or information to be displayed on the memo board continuously, when the user inputs a storage command for a message or information displayed on the touch screen by the user's touch.

When receiving a new message or information and input of a storage command on the touch screen, the controller controls new stored message or information prior to the former message or information stored and displayed on the memo board.

When the user touches the information message displayed on the memo board and drags and drops the information or message, the controller controls the corresponding information or message to be moved to a dropped position.

The terminal further includes a storage folder for each of family members that is displayed adjacent to the memo board.

When the user drags and drops the message or information displayed on the memo board to the storage folder, the controller controls the corresponding message or information to be moved to the corresponding folder.

In the storage folder for each of the family members, a communication device icon displaying a personal communication device of each family member.

When the user drags and drops a specific message or information tip to the communication device icon, the controller controls a corresponding message or information to the personal communication device possessed by the corresponding family member.

In the storage folder for each of the family members, a schedule icon displaying a schedule list for each of the family members may be provided.

When the user drags and drops a specific message or information to the schedule icon, the controller controls a corresponding message or information to be input to the schedule list for each family member.

When the message or information dragged and dropped to the schedule icon is related to a specific event, the controller controls the corresponding message or information to be input to a date corresponding to the even out of dates provided in the schedule list.

Specific messages or information may be stored in the storage folder for each of the family members, when the corresponding message or information is not checked by the corresponding family member, new message or information storing is displayed on the storage folder.

Furthermore, a method for controlling a refrigerator including a terminal includes a step of displaying a new message or information on a touch screen having a display part and an input part; a step of storing and displaying the displayed message or information, when a command of storing the displayed message or information is input; a step of moving a memo board to a corresponding storage folder, when the message or information stored and displayed on the memo board is dragged and dropped to the storage folder for each of the family members.

There may be further provided a step of displaying the new stored message or information prior to the former stored message or information, when there is a former message or information stored in the memo board.

A schedule icon displaying a schedule list for each of the family members is provided in the storage folder. When the user drags and drops a message or information displayed on the memo board related to a specific event to the schedule icon, a step of transmitting the message or information to a personal communication device of a specific family member.

In the storage folder for each of the family members, a schedule icon displaying a schedule list for each of the family members may be provided. There may be provided a step of automatically storing the message or information in a date of the schedule list corresponding to the specific event, when the user drags and drops a specific message or information to the schedule icon.

There may be provided a step of unfolding and displaying the communication device icon or the schedule icon hidden and stored in the storage folder, when the user drags a specific message or information closer to a specific one out of the storage folders.

In another aspect, the present invention provides a method for controlling a refrigerator comprising a terminal including (A) determining whether the refrigerator is in error or abnormal operation;

(B) displaying information related to a component part that is the reason of the error or abnormal operation, when the error or abnormal operation is generated;

(C) determining whether a service for repairing the refrigerator is requested by the user operating the touch screen; and (D) searching a service center and a repairman to provide service reservation, when the user requests the service.

The (B) step comprises a step of popping up a window notifying an abnormal operation or an error on the display module; and A step of displaying a position of a component part that causes the abnormal operation or the error.

The display module may be a touch screen.

The (C) step is performed after determining whether the user touches a service requesting button generated on the touch screen.

The (D) step includes a step of searching service centers located near in the region where the refrigerator is located;

When the user selects one of the searched service centers, a step of displaying a list of repairmen belonging to the selected service center and service reservation schedules aligned to the repairmen;

a step of making an on-site service reservation for the selected repairman, when the user selects a specific one of the repairmen.

The (D) step includes a step of searching repairmen belonging to the service centers located in a predetermined distance near the current position of the refrigerator;

a step of displaying a list of repairmen having available service schedule in the desired time out of the searched repairmen; and a step of making a service reservation for the selected repairman when the user selects one of the repairmen displayed on the list.

The present invention provides a method for controlling a refrigerator comprising a terminal including (E) determining whether determining whether the refrigerator is in error or abnormal operation;

(F) displaying information related to a component part that is the reason of the error or abnormal operation, when the error or abnormal operation is generated;

(G) transmitting the error or abnormal operation to a service center, when the error or abnormal operation is generated;

(H) displaying instructions provided by the service center on the display module, when the error or abnormal operation is for recall or for an on-site service of a repairman.

Furthermore, there may be provided (I) checking whether the user makes an on-site service or repairman requesting reservation for the error or abnormal operation displayed on the display part after transmitted from the service center;

(J) step of making an on-site service or recall to the near service center or the repairman, when the on-site service or reservation applying is made by operation of the display part.

The (J) step displays the information related to the repairmen to enable the user to select a specific repairman.

A refrigerator including a terminal mounted in or demountable from a refrigerator cabinet to provide information related to the refrigerator, the terminal includes a touch screen to display icons corresponding to foods having short expiration dates that are stored in the refrigerator; a memory comprising recipe information including the foods having the short expiration dates; and a controller to search and display at least one recipe information tip related to the foods corresponding to a selected icon of the memory, when at least one icon is selected on the touch screen.

At this time, the icon may be displayed as an image displaying the category of the corresponding foods and remaining days until the expiration date of the foods.

The controller prioritize the remaining days to the expiration dates corresponding to the icons and aligns the icons based on the priority order of the remaining days until the expiration dates.

The controller prioritize the remaining days to the expiration dates corresponding to the icons and aligns the icons based on the priority order of the remaining days until the expiration dates.

When the icon is dragged and dropped to a preset region on the screen, the controller searches recipe information having the food corresponding to the moved icon and displays the searched recipe information.

Also, the controller divides the screen into first to third regions. A list of the icons may be displayed in the first region and the preset region is displayed in the second region. The searched recipe information tips may be listed in the third region.

The preset region may be displayed as a cooking container image. When the icons are moved to the preset region, the controller may display refrigerator storage positions of the foods corresponding to the moved icons on the screen.

The terminal according to the present invention may further include an audio output part. When the icons are moved to the preset region, the controller may output the detected storage positions of the foods via the audio output module 242 as a sound.

When the icon is touched, the controller may display detail information of the food corresponding to the icon. The detail information may include at least one of a category, remaining days until the expiration date of the food and a storage position of the food in the refrigerator.

The recipe information may include at least one of a title, an image and recipe information of the food.

Once the recipe information is selected, the controller may display recipe information of the selected recipe information.

Once the recipe information is selected, the controller searches the controller searches additional cooking materials on the foods having the short expiration dates, rather than the foods included in the recipe information. Hence, the additionally searched foods may be displayed. The controller may display icons displaying the additionally searched foods, differentiated from the other icons.

The controller searches recipe information related to the foods corresponding to the selected icons in real-time, whenever the icons are selected in real-time. The real-time searched recipe information is updated in the third region.

The controller may preferentially search and display recipe information tips using the foods having the shorter expiration dates as main materials, when searching the recipe information related to the foods.

Also, the controller may preferentially search and display recipe information tips related to the preset recipe information preferred by the user, when searching the recipe information tips including the foods.

The terminal according to the present invention may further include a wireless communication part for link with a website. Unless the recipe information having the foods is provided in the memory, the controller is linked to an external recipe providing server or website via the wireless communication part and it may display the searched recipe information.

When a door of the refrigerator is open in the state of the specific recipe information being selected, the controller controls lightings of the chambers where the actual foods are stored to be distinguished from lightings of the other chambers.

In a further aspect, a method for controlling a terminal provided inside or outside a refrigerator to provide information related to the refrigerator includes a step of displaying icons displaying foods having impending expiration dates in the refrigerator on a touch screen; a step of searching at least one recipe information tip related to the foods corresponding to the selected icons through a memory, when at least one icon is selected on the screen; and a step of displaying the searched recipe information.

In a still further aspect, a refrigerator comprising a terminal mounted in or demountable from a refrigerator cabinet to provide information related to the refrigerator, the terminal includes a touch screen to display a screen related to the refrigerator;

a memory comprising information related to the foods stored in storage chambers of the refrigerator and different recipe information related to the foods; and a controller to search and display at least one food having the impending expiration date that is within preset days from the current date on the screen related to the refrigerator and to search and display recipe information related to the food information selected from the memory, when the at least one food is selected from the food information displayed on the screen related to the refrigerator.

On the screen related to the refrigerator may be displayed at least one of current time information, weather information, food information and refrigerator state information as an icon type.

At least one of a category of the corresponding food, remaining days until the expiration date of the corresponding food and storage chamber information of the corresponding food may be set in the food information.

The controller may display an icon corresponding to at least one of the category of the corresponding food, the remaining days until the expiration date of the corresponding food and the storage chamber information of the corresponding food on the screen related to the refrigerator.

When the icon is selected, the controller may display the information displaying the refrigerator storage chamber positions of the food corresponding to the icon on the screen related to the refrigerator.

When a plurality of foods having the impending expiration dates are searched, the controller may prioritize the impending expiration dates of the searched foods and distinguishably display the priority order in the screen related to the refrigerator.

The controller may preferentially display information related to the foods having the shortest expiration dates in order.

The recipe information may include at least one of a title, an image and recipe information of the food.

Once the recipe information is selected, the controller may display recipe information of the selected recipe information.

Once the recipe information is selected, the controller searches the controller searches additional cooking materials on the foods having the short expiration dates, rather than the foods included in the recipe information. Hence, the additionally searched foods may be displayed. The controller may display icons displaying the additionally searched foods, differentiated from the other icons.

The controller searches recipe information related to the foods corresponding to the selected icons in real-time, whenever the icons are selected in real-time. The real-time searched recipe information is updated in the third region.

The controller may preferentially search and display recipe information tips using the foods having the shorter expiration dates as main materials, when searching the recipe information related to the foods.

Also, the controller may preferentially search and display recipe information tips related to the preset recipe information preferred by the user, when searching the recipe information tips including the foods.

The terminal according to the present invention may further include a wireless communication part for link with a website. Unless the recipe information having the foods is provided in the memory, the controller is linked to an external recipe providing server or website via the wireless communication part and it may display the searched recipe information.

When a door of the refrigerator is open in the state of the specific recipe information being selected, the controller controls lightings of the chambers where the actual foods are stored to be distinguished from lightings of the other chambers.

A method for controlling a refrigerator including a terminal mountable in or demountable from a refrigerator cabinet to provide information related to the refrigerator includes a step of setting and storing information related to foods stored in storage chambers, respectively;

a step of searching at least one food having an impending expiration date within preset days from a current date;

a step of displaying a screen related to the refrigerator having the searched food information on a touch screen;

a step of searching at least one recipe information tip related to the selected food information, when at least one recipe information is selected on the screen related to the refrigerator; and a step of displaying the searched recipe information.

Furthermore, s refrigerator comprising a terminal mounted in or demountable from a refrigerator cabinet to provide information related to the refrigerator, the terminal includes, a touch screen to display an image corresponding to food storage chambers in the refrigerator and a list of icons corresponding to foods in the refrigerator, respectively; and a controller to fix the position of the fixed position to a specific storage chamber, when at least one icon on the list is moved to a region corresponding to a specific storage chamber.

Detail information such as the category of the food and the remaining days to the expiration date of the food may be set in the icons.

The controller may distinguishably display the detail information such as the kind of the food set to the icon and the remaining days to the expiration date of the food on the icons.

when at least one icon out of the icons is dragged and dropped in a specific storage chamber, the controller may fix the position of the moved icon in the specific storage chamber.

When one of the icons and the specific storage chamber are multi-touched, the controller may fix the position of the icon in the specific storage chamber.

When the icons is touched in the state of being moved in the specific storage chamber, the controller may release the fixed position of the icon and move the icon to an initial position.

When the icon is touched in the state of being moved in the specific storage chamber, the controller may delete the icon in the specific storage chamber.

The icons and the storage chambers may be relatively mapped with each other based on the corresponding foods.

When a specific icon is selected on the list, the controller may distinguishably display the storage chamber mapped with the icon from the storage chambers.

When at least one icon is selected on the list, the controller may display the information that induces the user to move the selected icon to the meat storage chamber mapped with the selected icon.

When at least one icon is moved to the storage chamber on the list, the controller When the at least one icon is moved to the storage chamber, the controller may calculate a ratio of a display region of the moved icon to a display region of the storage chamber and display the information displaying the calculated ratio.

When the calculated ratio is over a preset ratio, the controller display information notifying the excess of the adequate storage capacity possessed by the meat storage chamber.

When the calculated ratio is over the preset ratio, the controller may shut off the moving and position fixing of the second icon additionally moved to the meat storage chamber.

When the calculated ratio is over the preset ratio, the controller detects another storage chamber similar to the storage chamber and displays an information tip inducing the user to move the icon to the detected storage chamber.

When the door of the refrigerator is open in the state of the position of the icon being fixed in the specific storage chamber, the controller controls lightings of the chambers where the actual foods are stored to be distinguished from lightings of the other chambers.

A method for controlling a refrigerator comprising a terminal mounted in or demountable from a refrigerator cabinet to provide information related to the refrigerator, the method includes a step of displaying an image of storage chambers in the refrigerator and a list of icons corresponding to foods on the touch screen;

a step of detecting touch of at least one icon on the list; and a step of fixing the position of the icon moved to a specific storage chamber, when the at least one icon is moved to a specific storage chamber on the list based on the result of the detection.

A refrigerator comprising a terminal mounted in or demountable from a refrigerator cabinet to provide information related to the refrigerator, the terminal includes a touch screen to display at least one content related to the refrigerator on a screen; and a controller to delete the content on the screen, when a distance between first and second points is within a preset distance in a state of multi-touching first and second points on the content.

At this time, the controller displays the content to disappear with gradually being crumpled based on the reduced distance between the multi-touched points, when the maintained distance of the multi-touch is within the preset distance, and the controller deletes the content.

When the multi-touch on the crumpled-paper imaged content is released in the state of the maintained distance of the multi-touch being within a preset distance, the controller deletes the crumpled-paper-imaged contents.

When the maintained distance of the multi-touch is within the preset distance, the controller may display the contents in the gradually crumpled image.

The controller may gradually increase a crumpled degree of the content as the distance between the two multi-touched points is gradually reduced.

When the maintained distance of the multi-touch is over the preset distance, the controller may change and display the crumpled imaged content into the initial image content.

The controller may reduce the crumpled degree of the content according to the increased distance of the multi-touch, to display the content as the initial image.

When the maintained distance of the multi-touch is within a preset first distance, the controller displays a recycle bin imaged icon for deleting the crumpled paper imaged content on the screen. Hence, the content is dragged and dropped to the recycle bin icon and the controller 280 then deletes the content.

Once the recycle bin icon is selected, the controller displays at least one content deleted via the recycle bin icon.

When the content is selected, the controller may re-display the content on the initial position on the screen.

When the maintained distance of the multi-touch is within the preset first distance, the controller displays the contents as a gradually crumpled paper image. When the multi-touch on the crumpled-paper imaged content is released in the state of displaying the content as the crumpled paper image, the controller displays a recycle bin icon for deleting the crumpled-paper-imaged content. When the content is dragged and dropped to the recycle bin icon, the controller may delete the content.

A method for controlling a refrigerator comprising a terminal mountable in or demountable from a refrigerator cabinet to provide contents related to the refrigerator, the method includes a step of displaying at least one content related to the refrigerator on a touch screen; a step of checking whether a maintained distance of multi-touch between first and second points is within a preset distance in a state of multi-touching first and second points on the content; and wherein a controller is provided to delete the content on the screen when the maintained distance of the multi-touch is within the preset distance based on the result of the checking.

Advantageous Effects

The embodiments have following advantageous effects. According to the embodiments of the invention, the actual power consumption (or the actual electric charge) is compared with the reference power consumption (or the reference electric charge) in real-time and the result of the comparison may be visually displayed. Accordingly, the user may recognize such the result of the comparison easily.

Furthermore, the reference value may be the first reference value set based on the average of the other houses or the second reference value that is a kind of a target value. Accordingly, the user can compare the electric consumption pattern in the house with an average power consumption pattern in the other houses. Also, the user may recognize that the target power consumption (or the target electric charge) set by himself or herself is complied appropriately.

Still further, the user may adjust the target temperature of the refrigerator or freezer compartment in the refrigerator according to the intention.

Especially, it is not complicated to set such the target temperature but the target temperature may be set by touching and dragging the control icon. Accordingly, the user may be provided with convenience.

The user can recognize the expected power consumption and the condition of each component part at a glance by the operation of the control icon, to provide the user with visual convenience.

Meanwhile, the user's schedule management may be implemented via the terminal for the refrigerator smoothly.

Specifically, the calendar may be provided on the touch screen of the terminal and specific schedules are displayed as icons in the calendar, with brief comments. Accordingly, the user may recognize and detect schedules in a predetermined period at a glance.

Meanwhile, when moving the calendar, the touch and drag method is used for changing the calendar. If seeing a schedule on another date, the current date can be changed into another date smoothly.

Still further, the enlarged frame is provided to locate a week the current date belongs to or a desired week the user see in the enlarged frame. The week located in the enlarged frame may be provided with the schedule icon and brief comments related to the schedule. That will be a big help in managing the schedules.

Meanwhile, the user may receive a new message or information via the terminal of the refrigerator from outside, only to enhance user convenience.

In addition, the message displayed on the terminal is moved to the storage folder for each person and contents of the message may be transmitted to the person or moved to a schedule board or memo board for each person. Accordingly, rapid message transportation may be enabled and each person can store the transmitted message or information independently.

Meanwhile, the refrigerator according to the present invention may be self-checked to check whether the preservation ability of the refrigerator is in error. Unless the refrigerator reaches the error, the preservation ability might be deteriorated. In this instance, the reason of the deterioration may be displayed to the user easily.

Accordingly when the ability of the refrigerator is deteriorated even without the error, the service application may be enabled and the error may be prevented.

Also, when the service is applied due to the error or the ability deterioration, the terminal attached to the refrigerator enables the user to make a reservation after seeing the schedules of the repairmen belonging to the near service centers. Accordingly, the user's time and efforts can be reduced advantageously.

Even when the error of the refrigerator is for recall service via communication between the terminal and the service center, the recall application and the on-site service application may be enabled rapidly.

When the refrigerator is connected with other electric appliances on a home network, the terminal of the refrigerator may perform monitoring for normal operation of the electric appliances and may perform service application based on the result of the monitoring.

According to the present invention, the expiration dates of the foods stored in the refrigerator may be checked. The recipe information for the foods having the impending expiration dates may be provided to the user.

The expiration dates of the foods stored in the refrigerator currently may be recognized and the user may be guided to consume the foods having the impending expiration dates in reference to the recipe information.

Still further, the user may set the icons corresponding to the foods which will be stored in the refrigerator and the expiration date to the corresponding icons. The user may arrange the icons in the region corresponding to the inner refrigerator storage chamber image.

Without substantially opening the door of the refrigerator, the user may see the positions of the icons corresponding to the foods and recognize which foods are stored in the storage chambers of the refrigerator currently.

In addition, the contents displayed on the current screen may be deleted or restored by the user's multi-touch.

BRIEF DESCRIPTION OF THE DRAWINGS

FIGS. 40 to 43 are screen state views illustrating the process of setting the food expiration date and the refrigerator storage chamber position of the food on the terminal for the refrigerator;

FIGS. 45 and 46 are screen state diagrams illustrating the first embodiment of the process providing the food recipe information on the foods having the short expiration date;

FIGS. 48 and 49 are screen state diagrams illustrating the second embodiment of the process providing the food recipe information on the foods having the short expiration date;

FIGS. 57 to 67 are screen state diagrams illustrating the virtual food storage process of the terminal for the refrigerator according to the invention;

BEST MODE

A refrigerator and a terminal for a refrigerator that is mounted or demounted in or from such a refrigerator according to the invention will be described in detail in reference to the accompanying drawings.

The appearances of such phrases in various places in the specification are not necessarily all referring to the same embodiment. Further, when a module and a part are described in connection with any embodiment, it is submitted that such module and part are used only for convenient explanation of the specification and that they are not used meant differently.

A terminal 200 described throughout in the specification may be a portable terminal such as mobile phone, a smart phone, a laptop computer, a terminal for digital broadcasting, a personal digital assistant (PDA) or a navigation.

Figure 1:
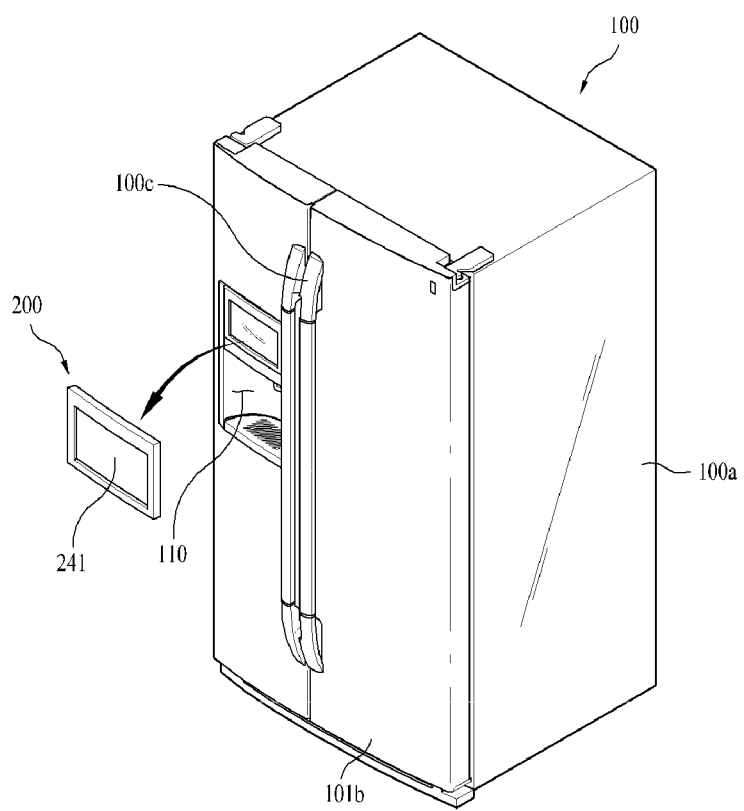
FIG. 1 is a perspective view illustrating a refrigerator according to the invention.

As shown in FIG. 1, a refrigerator 100 according to the invention includes a cabinet 100a, a door 101b coupled to a front of the cabinet and a handle 100c mounted on the door.

In the door 101b are provided a dispenser 110 to dispense cold water or ice and a terminal 200 to display information on operational states and the electric charge or power consumption.

The terminal 200 may include a display module 241 that is able to display specific information and have a command inputted thereto by touch.

The display module 241 may be a touch screen that is able to realize input and display simultaneously. However, it may be a conventional display module that has only a display function and a button type input device provided independently from the display module.

The terminal 200 may be fixed to a front surface of the door or demountable from the front surface, such that a user can mount or demount the terminal 200 to or from the refrigerator when necessary.

Figure 2:
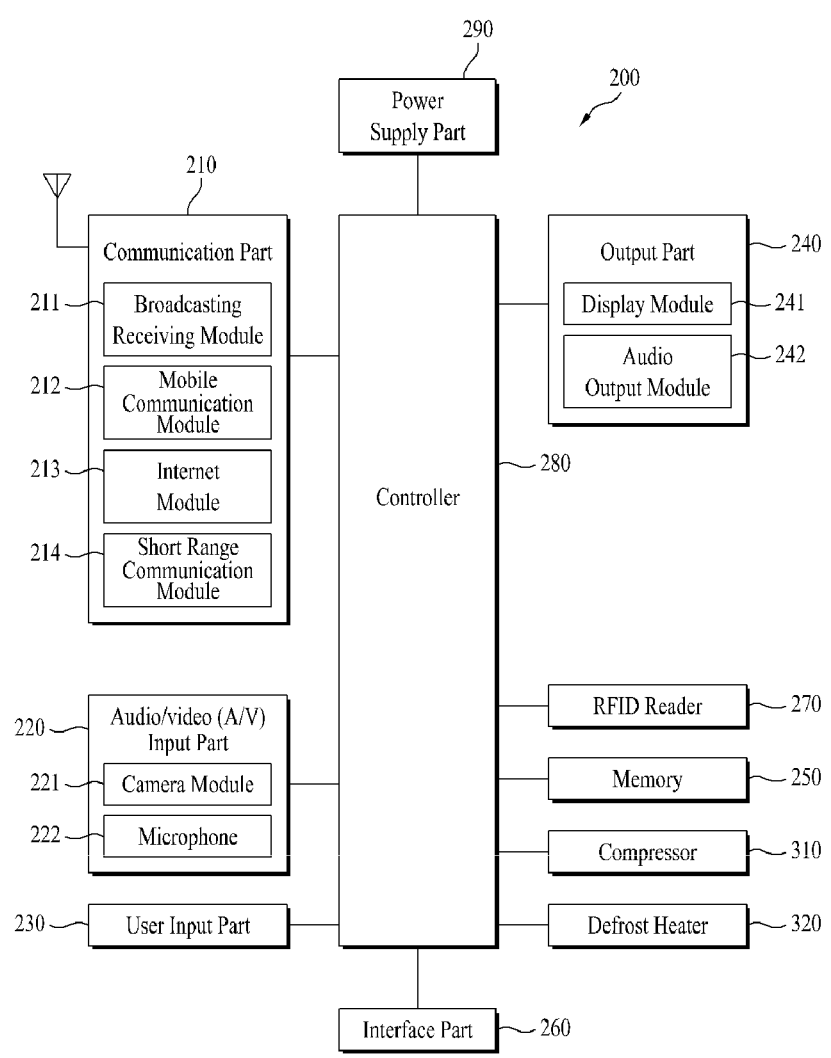
FIG. 2 is a control block diagram illustrating the refrigerator according to the invention.

In reference to FIG. 2, the terminal 200 for the refrigerator according to the invention includes a communication part 210, an audio/video (A/V) input part 220, a user input part 230, an output part 240, a memory 250, an interface part 260, a RFID reader 270, a controller 280 and a power supply part 290. The component parts shown in FIG. 1 are not necessary and more or less parts may be provided in the terminal 200 for the refrigerator.

The component parts will be described sequentially as follows.

The communication part 210 may include at least one module that enables internet usage between wire or wireless communication systems or on an internet network of the terminal for the refrigerator 200.

For example, the communication part 210 may include a broadcasting receiving module 211, a mobile communication module 212, an internet module 213 and a short range communication module 214.

The broadcasting receiving module 211 receives a broadcasting signal and/or information related to broadcasting from an external broadcasting management server and it plays the received signal or information on the display module 241.

The mobile communication module 212 transmits or receives a signal to or from at least one of a base station, an external terminal and a server, on a mobile communication network. The signal may include a voice signal, a video call signal or variety of data based on text/multimedia message transmitting and receiving.

The internet module 213 is a module for wire/wireless internet connection. Wireless LAN (WLAN, namely, Wi-Fi), Wireless broadband (Wibro), World Interoperability for Microwave Access (Wimax) or High Speed Downlink Packet Access (HSDPA) may be used as the wireless internet technology.

The short range communication module 214 may be a module for short range communication. Bluetooth, Radio Frequency Identification (RFID), infrared Data Association (IrDA), Ultra Wideband (UWB) or ZigBee may be used as the short range communication technology.

The A/V input part 220 may be for inputting an audio signal or a video signal and it may include a camera 221 and a microphone 222.

The camera 221 processes image display such as a still image or a moving picture achieved by an image sensor in a video call mode or a photograph mode. The processed image display may be displayed on the display module 241.

The image data processed in the camera 221 may be stored in the memory 250 or transmitted outside via the communication part 210. Two or more cameras 221 may be provided according to a user environment.

The microphone 222 may process an external audio signal inputted in a call mode, a record mode or a voice recognition mode into electrical voice data.

The user input part 230 generates input data for the user to control the operation of the terminal for the refrigerator 200. The user input part 130 may include a key pad, a direction key, a dome switch, a touch pad (a static pressure/a static electricity), a jog wheel and a jog switch.

The input part 240 is for generating visual or auditory input. The input part 240 may include a display module 241 and an audio output module 242.

The display module 241 may display (or output) the information processed in the terminal for the refrigerator 200.

For example, when displaying information related to the terminal for the refrigerator 200 and the refrigerator 100, the display module 241 displays User Interface (UI) or Graphic User Interface (GUI) of information related to the refrigerator 100 such as a widget or an icon.

Such the display module 241 may include at least one of a liquid crystal display (LCD), a thin film transistor-liquid crystal display (TFT LCD), an organic light-emitting diode (OLED), a flexible display and 3D display.

When the display module 241 and a sensor for sensing a touch operation (hereinafter, a touch sensor) forms a mutual layer (hereinafter, a touch screen), the display module 241 may be used as an input device as well as an output device.

The touch sensor may be a touch film, a touch sheet or a touch pad, for example.

The touch sensor may convert a pressure applied to a specific area of the display module 241 or capacitive change generated in a specific area of the display module 241 into an electrical input signal. The touch sensor may detect not only a touched point and a touched area but also a pressure applied by touch.

When the touch pressure is detected by the touch sensor, a signal or signals corresponding to the touch pressure may be transmitted to a touch controller (not shown). The touch controller processes the signal(s) and it transmits corresponding data to the controller 280. Accordingly, the controller 280 figures out which area of the display module 241 is touched.

The audio output module 242 may outputs data having audio provided in the memory 250 or a sound to notify an operation state related to the refrigerator 100. Such the audio output module 152 may include a receiver, speaker and a buzzer.

The memory 250 may store programs for process and control of the controller 280 therein and information related to the operation of the refrigerator.

In addition, the memory 250 may store the schedule information input by the user therein or received real-time electricity information therein.

A memory 250 according to another embodiment may store received external messages or information therein and the memory 250 may include a storage folder for each family member which will be described later.

In this instance, the electricity information includes information related to change in the electric charges classified by time and a first reference power consumption a first reference electric charge based on time in a common house, which are provided by an electric company or an electricity service company.

Such electricity information may be acquired by the communication part 210 via an external service server or a web server or by the interface part 260 from an external device.

Also, in the memory 250 may be stored graphic data therein which will be provided to the user with various visual effects.

In the memory 250 may be stored information including the kinds, the expiration dates and storage positions of the foods that are set by the user, information on various recipes using the foods and information on preferred recipes set by the user.

In this instance, the recipe information may be default-stored in the memory or acquired by the wireless communication part 210 via an external service server or a web server or by the interface part 260 from an external device.

Also, the in the memory 250 may be stored the graphic data which will provide the kinds and the expiration dates of the foods and the recipe information to the user, with the various visual effects.

In the memory 250 may be stored graphic data that simulates a process of cooking the selected foods when the foods are selected based on the recipe information.

In the memory 250 may be stored icons have shapes showing the kinds of the foods and an image identical to an inner appearance of the refrigerator 100 or expressing storage chambers in the refrigerator 100.

In this instance, the shapes of the icons may be identical or similar to the shapes of the foods and titles of the foods may be marked in or near the icons.

The icons may be downloaded on a web via the wireless communication part 210 or defaulted in the memory 250. Also, the icons may be acquired via the interface part 250 from an external device.

Such the memory 250 may include at least one storage type of a flash memory type, a hard disk type, a multimedia card micro type, a card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory, a magnetic memory, a magnetic disk and an optical disk.

The interface part 260 may be a passage to all of external devices connected to the terminal for the refrigerator 200. The interface part 260 may receive data from the external device or transmit the received electric power to each component part of the terminal for the refrigerator 200 or data of the terminal 200 to the external device. For example, the interface part 260 may include a wire/wireless headset port, an external charger port, a wire/wireless data port, a memory card port, a port for connecting a device including an identification module and an earphone port.

The RFID reader 270 receives information contained in a RFID tag attached to the food and reads to output the received information to the controller 280.

In this instance, information in the RFID tag may include detail information of the corresponding food such as the kind, the price, the purchase place, the expiration date.

The controller 280 controls an overall operation of the terminal 200 for the refrigerator 200. At this time, the controller 280 may be a microprocessor in the refrigerator 100.

The electric power supply part 290 receives the electric power of the refrigerator 100 or an external electric power applied thereto via the interface part 260, to supply a necessary electric power for the operation of each component part.

The various embodiments described herewith may be realized in a record media that is readable by a computer or a similar device, using a software, hardware or combination of them, for example.

According to the hardware realization, the embodiments may be realized by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and other electrical units for implementing functions. Some of the embodiments described in the specification may be realized as the controller 280 itself.

According to the software realization, the embodiments of the processes and functions described in the specification may be realized as independent software modules. Each of the software modules may implement at least one function and operation described in the specification. The software code may be realized by a software application written in an appropriate program language. The software code may be stored in the memory 250 and it may be implemented by the controller 280.

The controller 280 may be connected with a compressor 310 or a defrost heater 320 provided in the refrigerator cabinet. The compressor 310 and the defrost heater 320 may be operated based on a command transmitted by the controller 320. The controller 280 may track or compute the power consumption of the refrigerator consumed by the component parts and the electric bill charged according to the power consumption.

Figure 3:
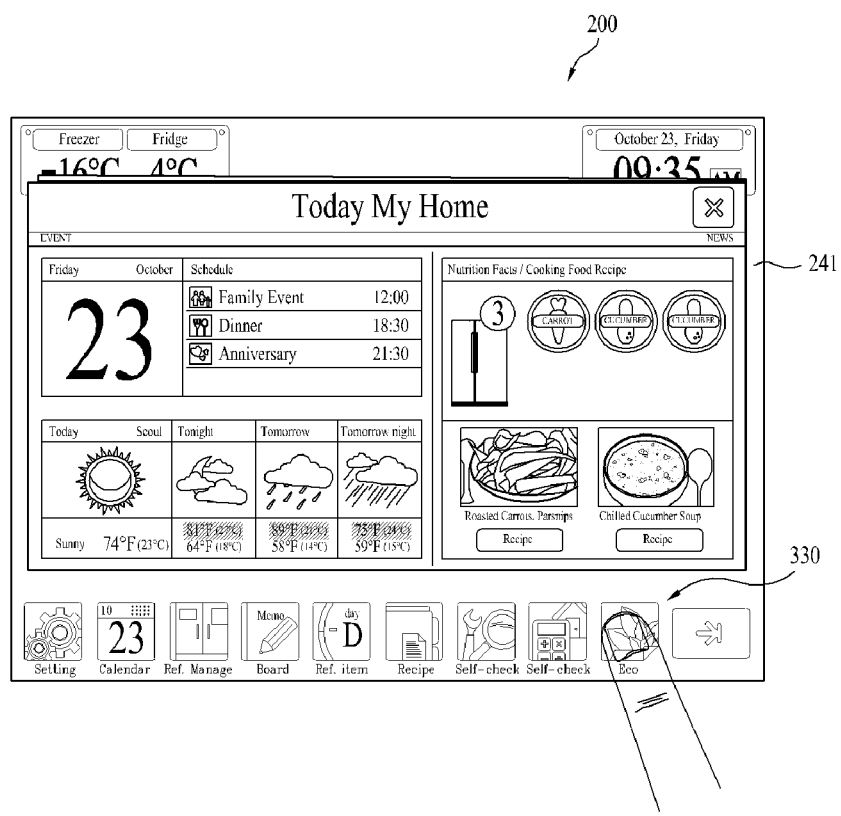
FIG. 3 is an initial screen of a terminal provided in the refrigerator according to the invention.

FIG. 3 is an initial screen displayed on the terminal according to the invention. Assuming that the display module 241 is realized as a touch screen, the embodiment will be described.

On an initial screen may be displayed a current date, family schedules and a current weather. Storage states of the current stored goods in the refrigerator are displayed on the right of such information.

Menu icons 330 displaying various menus are arranged on a lower area of the screen of the display module 241 constituting the terminal 200. When the user touches one of the menu icons 330, information related to the touched menu will be displayed on the screen.

The user uses such the menu icons 330 in selecting various menus such as memo board management, electric bill management, electricity information management and schedule management.

Figure 4:
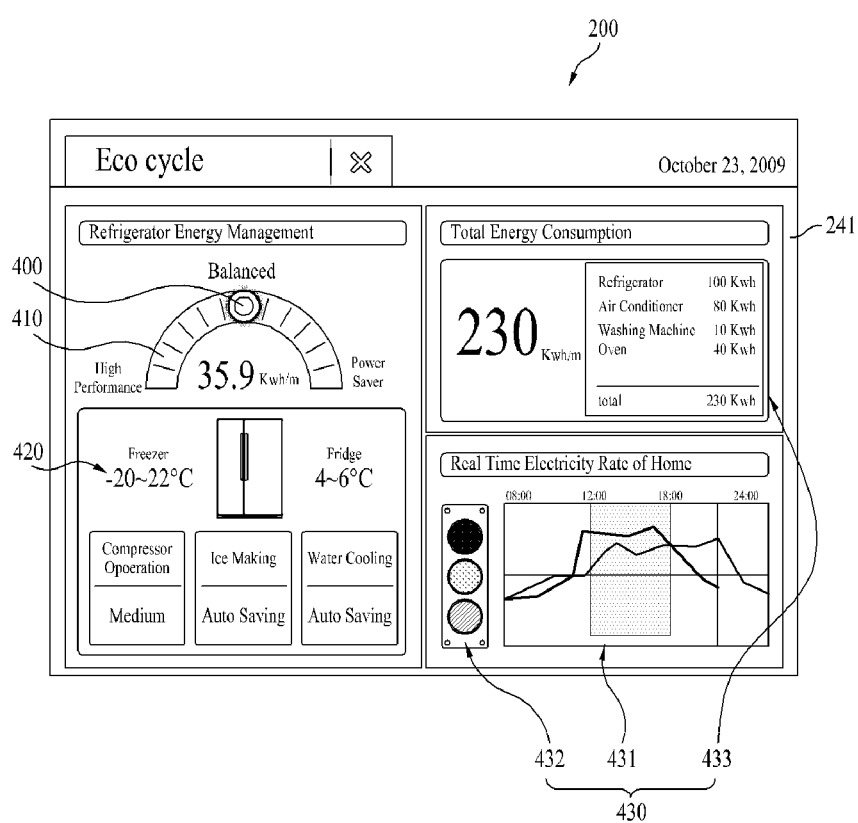
FIG. 4 is a diagram illustrating an operational state and information that are displayed on a terminal of the refrigerator according to the invention.

According to this embodiment, when the user pushed a menu icon displaying "Eco", a screen shown in FIG. 4 is displayed. In this instance, the icon displaying "Eco" is related to energy usage information of the refrigerator.

FIG. 4 illustrates a state displaying power consumption of the refrigerator and the other electric appliances, the sum total, electric charge information and an operational state of the refrigerator.

In this instance, a preset control icon 400 that is predeterminedly draggable to control the operational state of the refrigerator may be provided on an upper left area of the screen. The control icon 400 may be movable along a moving passage 410 provided to guide the movement of the control icon 400.

An end of the moving passage 410 refers to Power Saver of the refrigerator and the other end refers to High Performance.

Figure 5:
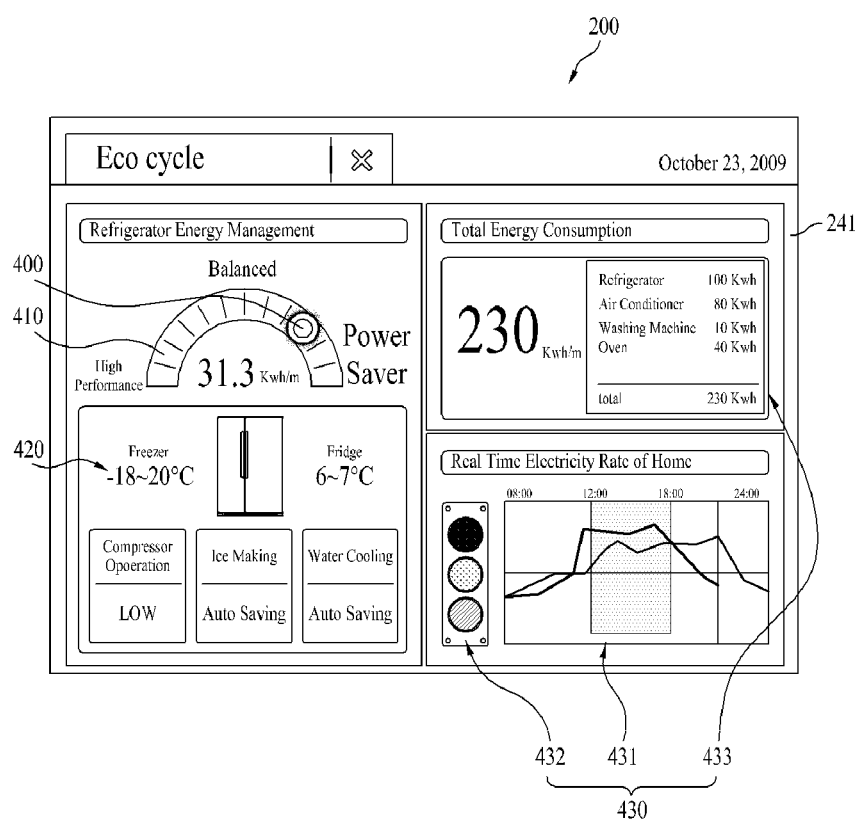
FIG. 5 is a diagram illustrating a screen state of the terminal in a power consumption decreasing operation mode (or a refrigerating/freezing ability decreasing operation mode) of the refrigerator according to the invention.

As shown in FIG. 5, when the user moves the control icon 400 to the end of the moving passage 410 by touch and drag, the refrigerator is operated to lower the power consumption of the refrigerator.

Accordingly, a target temperature of the storage compartments (the freezer and refrigerator compartments) displayed lower than the control icon and the moving passage on the state displaying window 420 of the refrigerator may be increased than before.

To achieve such a target temperature, an operation factor of the compressor (310, see FIG. 2) is lowered than before or an operation frequency thereof is decreased.

Figure 6:
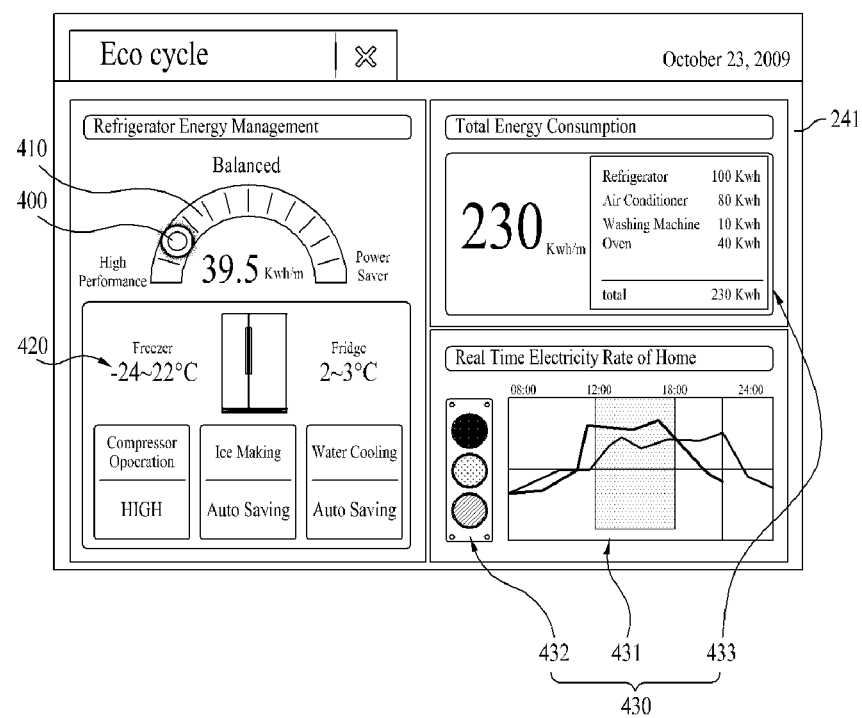
FIG. 6 is a diagram illustrating a screen state of the terminal in a power consumption increasing operation mode (or refrigerating/freezing ability increasing operation mode) of the refrigerator according to the invention.

As shown in FIG. 6, when the user moves the control icon 400 to the other end of the moving passage 410 by touch and drag, the refrigerator is operated to increase the power consumption and a target temperature of the storage compartments (the refrigerator and freezer compartments) displayed on the state display window 420 of the refrigerator is lowered than before.

To achieve such a target temperature, an operation factor or an operation factor of the compressor (310, see FIG. 2) is increased.

A current state of the compressor is displayed on the state display window 420 and operation state change of the compressor generated by the operation of the control icon 410 is displayed on the state display window 420.

An electricity information display window 430 is provided on a predetermined lower area of the state display window 420. The electricity information display window 430 includes a graph display part 431 displaying change in the electric charge in a graph, a color display window 432 and a power consumption display window 433 displaying the entire power consumption of the house and the power consumption of each electric appliance.

Figure 7:
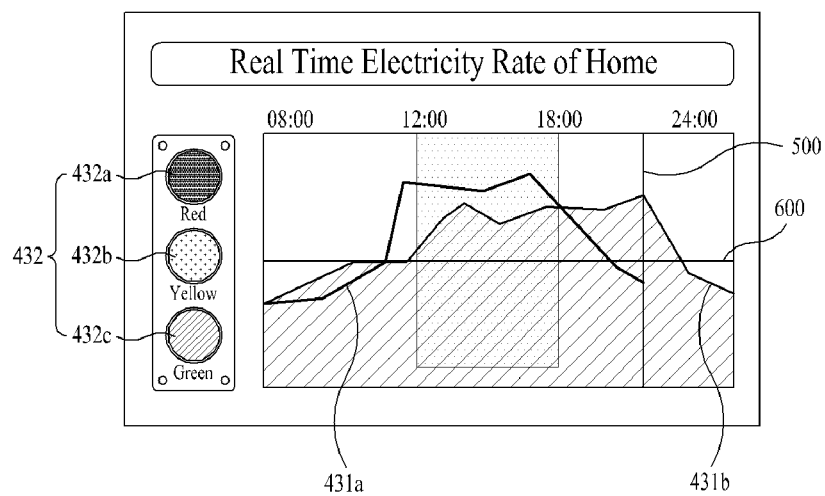
FIG. 7 is a graph illustrating change in the electric charge displayed on the terminal of the refrigerator according to the refrigerator.

As shown in FIG. 7, a change graph 431a of the actual power consumption (or the actual electric charge) of the house is displayed on the graph display part 431. A graph 431b showing change in an average value of the electric power consumed by the houses supplied the electric power by an electric power company or an electric service company is displayed on the graph display part 431.

A vertical straight line of the graph display part 431 is a time display line 500 referring to the current time.

The change graph 431b of the average value of the electric power (or the electric charge) consumed by the houses is provided by the electric power company or the electric service company as mentioned above. Moderation of the power consumption in the house may be determined based on the average of the electric power consumed by the houses.

Accordingly, the average of the electric power consumed by the houses (or the electric charges) is referenced to as a first reference power consumption (or a first reference electric charge).

In this instance, the first reference power consumption (or the first reference electric charge) provided by the electric power company is not fixed but differentiated every day. The average reference power consumption (or the first reference electric charge) may be a value differentiated based on time according to the power demand.

On the screen of the display module (241, see FIG. 6) may be overlapped an actual power consumption (or actual electric charge) graph 431a with the first reference power consumption (or first reference electric charge) graph 431b, to enable the user to compare them with each other at a glance.

Meanwhile, a reference line 600 is horizontally provided on the graph and the reference line 600 may be a second reference power consumption (or second reference electric charge) set by the user or the electric power company. It may be defined that a higher section is a high electric bill section with respect to the reference line. In other words, the higher section is a section where the electric bill is remarkably high.

The comparison between the actual power consumption (or electric charge) and the first reference power consumption (or first reference electric charge) is relative comparison between the user's house and the other houses using the first reference power consumption (or first reference electric charge).

When comparing his or her house with the other houses, the user can recognize his or her power consumption pattern.

However, the second reference power consumption (or second reference electric charge) enables the user to set a usage target of the actual power consumption (or actual electric charge).

Accordingly, when comparing such the second reference power consumption (or second reference electric power) with the actual power consumption (or actual electric charge), the user can check his or her current electricity usage pattern and follow the target usage. If the actual power consumption is over the set reference value, the user may be motivated to reduce the excess value by his or her selecting.

In this instance, the high electric bill section is defined as a section exceeding the reference line 600. Accordingly, the reference line 600 may be a lower limit of the high electric bill section.

In other words, the first reference power consumption (or first reference electric charge) provides a kind of a relative reference and the second reference power consumption (or second reference electric charge) provides a kind of an absolute reference.

Adjacent to the graph display part 431 may be provided the color display window 432. The color display window 432 may be a streetlamp type having a red window 432a, a yellow window 432b and a green window 432c.

The reason why the streetlamp type color window is provided is to give a user a notice if the current power consumption (or electric charge) is exceeding, in the same range or not up to the first reference power consumption (or first reference electric charge).

Also, the result of the comparison between the actual power consumption (or the actual electric charge) and the second reference power consumption (or second reference electric charge0 may be displayed on the color display window 432.

Figure 8:
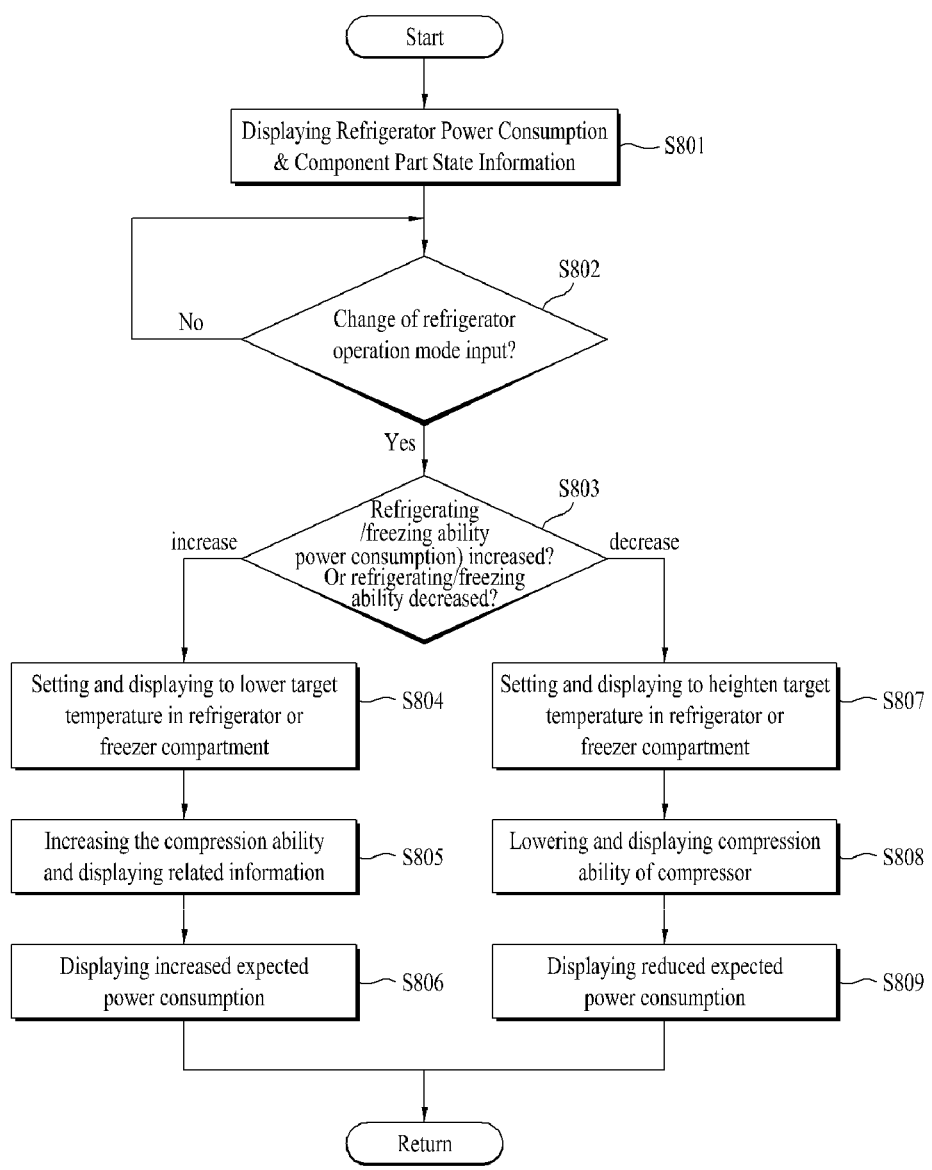
FIGS. 8 and 9 are flow charts illustrating control flow for managing the electric charge and the operation of the refrigerator according to the invention.

Under the configuration mentioned above, a flow chart of controlling the refrigerator according to the moving of the control icon will be described in reference to FIG. 8.

First of all, information on the power consumption of the refrigerator and states of the component parts (such as the compressor and an ice maker) may be displayed on the display part provided in the display module (S801).

In that state, it is determined whether there is input for changing an operation mode of the refrigerator. The input for changing the operation mode means that the user drops the touched finger after changing the position of the control icon on the moving passage by touch and drag (S802).

When it is determined that there is change in the position of the control icon to change the operation mode, it is determined that whether the change in the position of the control icon is related to the increase or decrease of the freezing and refrigerating ability (or power consumption) possessed by the refrigerator (S803).

In this instance, the change in the position of the control icon for increasing the freezing/refrigerating ability of the refrigerator is generated when the user determines that the freezing/refrigerating ability of the refrigerator is exceeding or short of his or her reference.

When the change is related to the increase of the freezing/refrigerating ability of the refrigerator based on the result of the determination, a target temperature of the refrigerator or freezer compartment is set lower. The set target temperature is displayed on the state display window of the display part provided in the display module (S804).

The compression ability such as the operation factor or the operation frequency of the compressor is increased and information related to that is displayed on the state display window (S805).

At the same time, increased expected power consumption is displayed to notify the user of the increased expected power consumption (S806).

In the step of S803, when a control command for decreasing the freezing/refrigerating ability is received, the target temperature of the freezer or refrigerator compartment is set to increase and the set target temperature is displayed on the state display window (S807).

The operation factor or operation frequency of the compressor is set to decrease and the compression ability of the compressor is set to decrease. Such the operation ability of the compressor is displayed on the state display window (S808).

Based on such the control, the power consumption expected to decrease is displayed to enable the user to recognize change in the power consumption (S809).

Meanwhile, as mentioned above, an electricity information display window (430, see FIG. 7) is provided on the display module. In reference to FIG. 9, a control method for displaying states according to change in the actual electric power (or actual electric charge) consumed in the house will be described as follows.

In this instance, the first reference power consumption (or first reference electric charge) and the second reference power consumption (or second reference electric charge) are covered by a reference power consumption (or reference electric charge).

Figure 9:
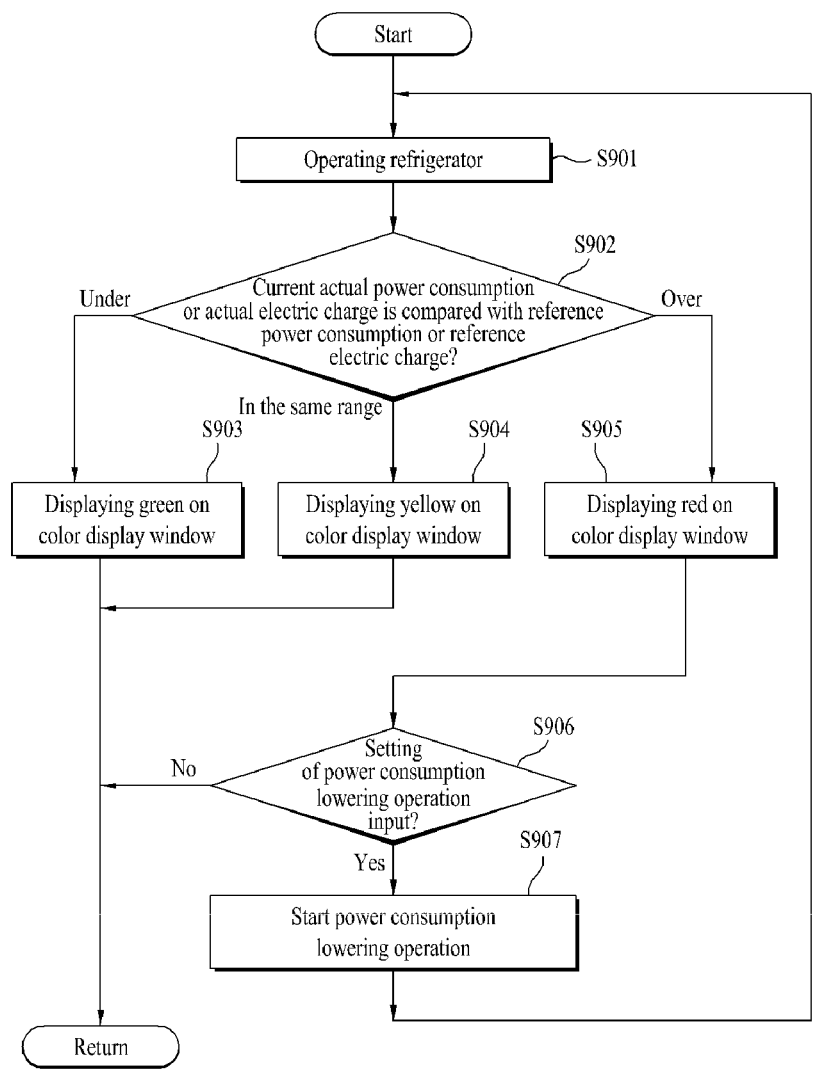

As shown in FIG. 9, the refrigerator is put into operation (S801). Once the electricity starts to be consumed after the refrigerator is put into operation, the current actual power consumption (or actual electric charge) is compared with the reference power consumption (or electric charge) and it is determined whether the actual power consumption is under or in the same range or over the reference power consumption (S802).

If the actual power consumption is under the reference power consumption based on the result of the determination, the green window (432c, see FIG. 7) provided in the color display window (432, see FIG. 7) is luminous and a green light is emitted outside (S903).

That green light makes the user smoothly recognize that the electricity or the electric charge consumed in his or her house is low, compared with the other houses.

Meanwhile, when the actual power consumption is in the same range based on the result of the determination in S802, the yellow window (432b, see FIG. 7) of the color display window (432, see FIG. 7) is luminous and a yellow light is noticeable outside (S904).

The same range may be defined to be approximately 95~100% of the reference power consumption (or reference electric charge) and the embodiment is not limited thereto. The range may be changeable according to a situation.

Accordingly, when the actual power consumption of the house is in a range of 95~100% with respect to the reference power consumption (or reference electric charge), the light is luminous on the yellow window to provide a kind of warning to the user.

Meanwhile, when the actual power consumption (or actual electric charge) of the house is over the reference power consumption (or reference electric charge) based on the result of the determination performed in S902, a light is luminous from a red window (432a, see FIG. 7) of the color display window (432, see FIG. 7) and a red light is emitted outside (S905) to notify the user of the excess state (S905).

Accordingly, the user can smoothly recognize that the current electric power consumption state is out of the common electric power consumption.

Meanwhile, when the refrigerator is operated in the power consumption excess state having the red light displayed on the color display window, it is determined whether a power consumption decreasing operation is set based on an electric power management program provided by the electric power company (or electric power service company) to lower the electric bill according to the user's selection (S906).

When the power consumption decreasing operation for the refrigerator is set based on the result of the determination, a command for decreasing the operation factor or operation frequency of the compressor is implemented or a command for decreasing the power consumption when the defrost heater performs a defrosting operation is implemented (S907).

When the power consumption decreasing for the other electric appliances rather than the refrigerator is set based on the result of the determination, each of the other electric appliances is controlled to decrease the current power consumption based on the setting.

In that state, the current actual power consumption (or actual electric charge) is compared with the reference power consumption (or reference electric charge) and the result of the comparison is displayed by the corresponding color light mentioned above.

Meanwhile, an embodiment enabling the user to manage schedules will be described as follows.

Figure 10:
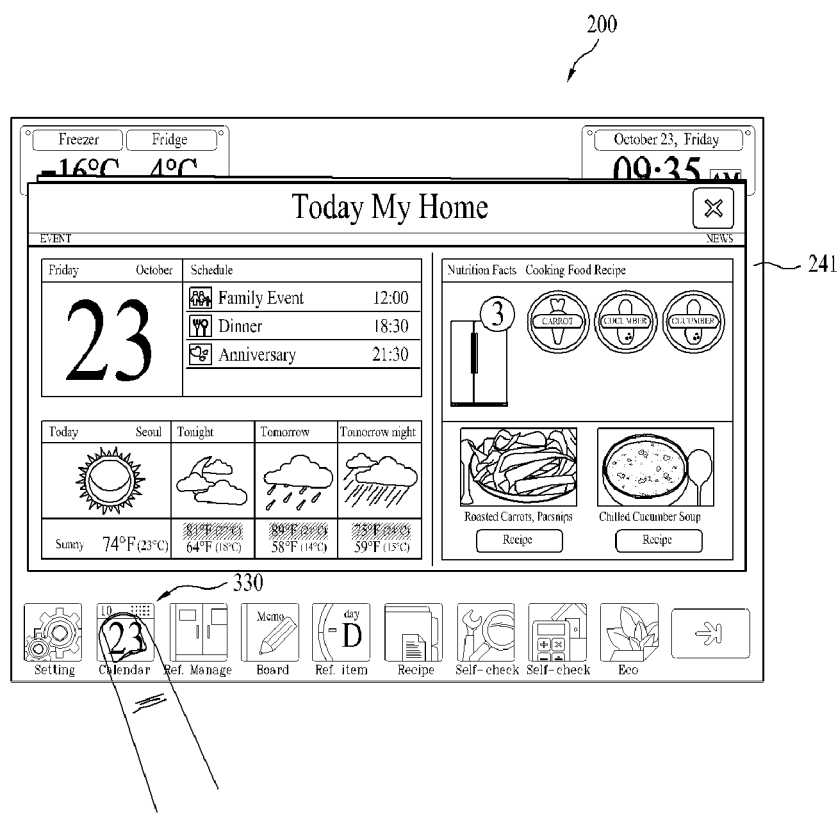
FIG. 10 is a diagram illustrating an icon related to the schedule touched on the initial screen displayed on the terminal of the refrigerator.
Figure 11:
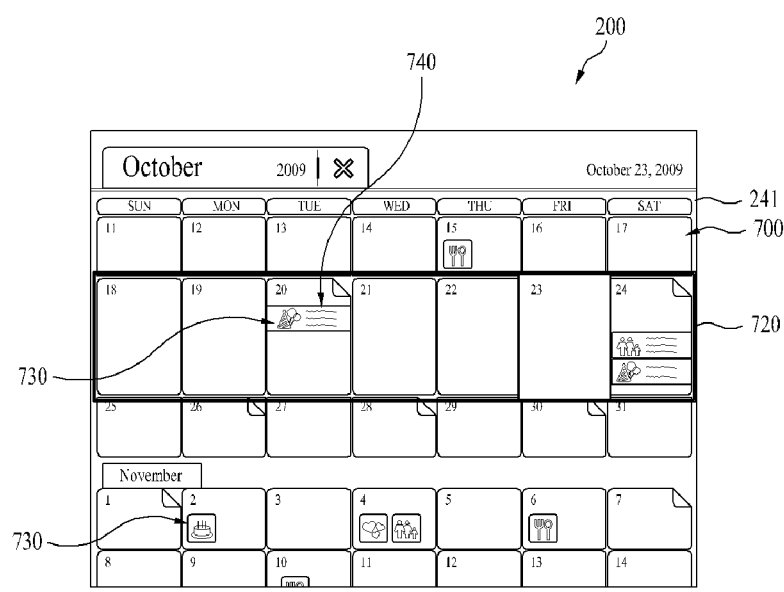
FIG. 11 is a diagram illustrating a calendar displayed on the terminal of the refrigerator according to the invention.

As shown in FIG. 10, when the user pushes an icon displaying "Calendar", a calendar 700 is displayed as shown in FIG. 11.

In the calendar 700, each week forms a single line and approximately 4~5 weeks may be displayed such that the user may recognize schedules or occasions of approximately one month at a glance.

In this instance, an enlarged frame 720 is displayed on the display module 241 to and display a specific week enlarged in comparison with the other weeks. The enlarged frame 720 may be characterized to be fixed to the corresponding position.

Compared with the enlarged frame 720 having the fixed position, the calendar 700 may be movable horizontally.

When the user touches a specific point and drags the touched point upward or downward, the calendar 700 may be moving along the dragged direction.

According to such drag, a week belonging to the enlarged frame 720 may be changed into another week. The week in the enlarged frame 20 may be enlarged, compared with the other week.

In this instance, when a specific week is displayed in the enlarged frame 720, the week before the specific week is displayed above the enlarged frame 720 and the week after the specific week is displayed under the enlarged frame 720.

A week the current date belongs to may be displayed on the week displayed in the enlarged frame 720 and the current date may be displayed larger than the other dates of the current week or it may be displayed in a different color.

On the calendar 700 may be displayed schedule icons 730 displaying specific schedules or events.

Brief explanation 740 may be displayed next to the schedule icon 730 on the date belonging to the week displayed in the enlarged frame 720.

In contrast, such explanation is hidden on the dates outside the enlarged frame 720 and only the schedule icon 730 may be displayed on the dates outside the enlarged frame 720.

Figure 12:
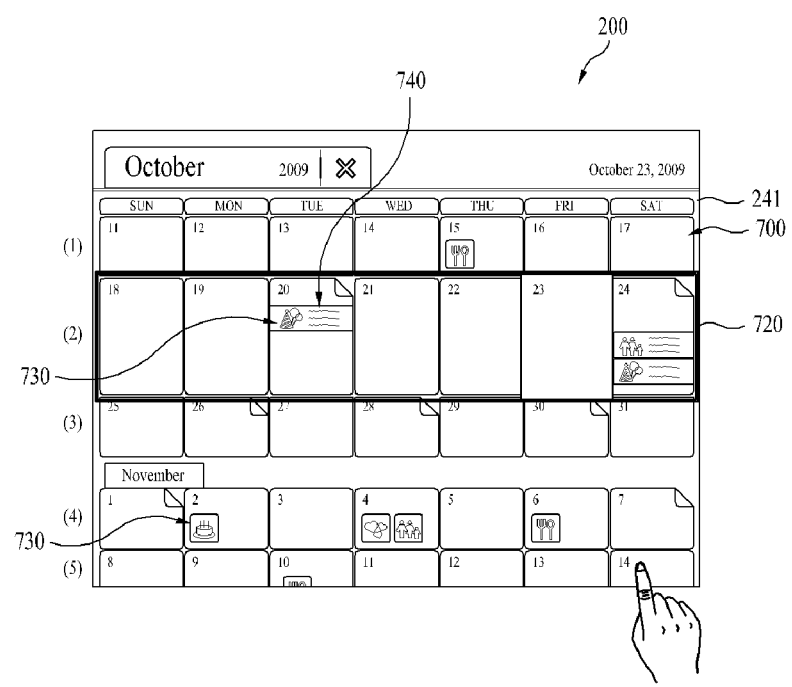
FIGS. 12 and 13 are diagrams illustrating a process of moving the calendar displayed on the terminal of the refrigerator according to the invention.

As shown in FIG. 12, the specific week (the (2)nd week in the drawing) is displayed in the enlarged frame 720.

In this instance, the user can drag the touched finger to the enlarged frame 720 in a state of touching another week (the (5)th week in the drawing).

Figure 13:
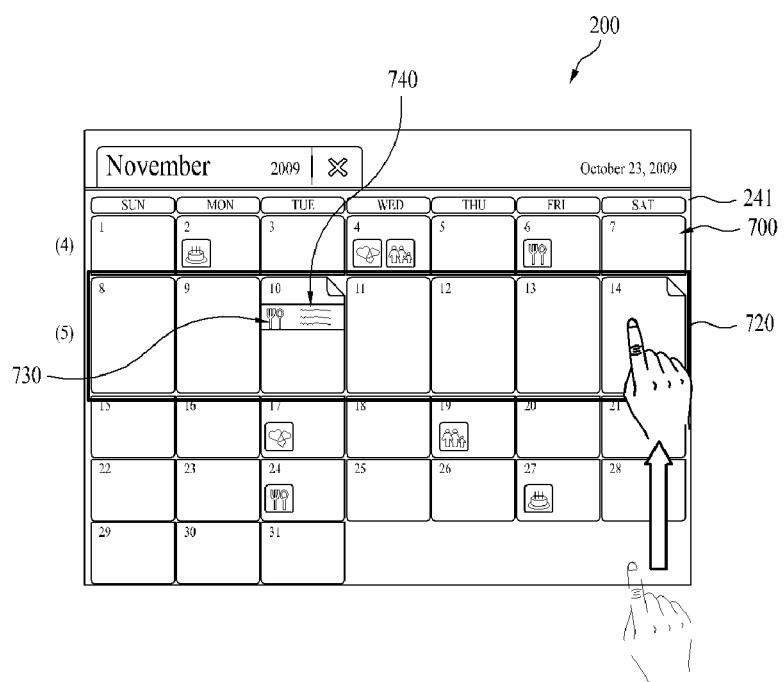

After that, as shown in FIG. 13, the week touched by the finger initially is displayed on the enlarged frame 720 along the finger movement.

At the same time, the week on the enlarged frame 720 may be moved above the enlarged frame 720 and the size of the week is lessened or disappears from the display module 241.

Brief explanation 740 of a hidden event is displayed on a specific date belonging to a new week in the enlarged frame 720, next to a schedule icon 730 displaying a specific event.

Such movement may be identically applied when the user drags a touched point downward.

Meanwhile, when the user touches a specific point and drags the touched point upward or downward, the week before or after the specific week displayed on the enlarged frame 720 may be displayed on the enlarged frame 720 sequentially, regardless of the dragged distance.

In other words, in description related to FIGS. 12 and 13, when the user drags a touched point to the enlarged frame 720 in a state of touching a specific week with the finger, the specific week touched by the finger is moved to the enlarged frame 720 along a locus of the drag.

However, when the user lifts the touched point up or down even slightly, the entire of the calendar 700 is moved and the week in the enlarged frame 720 can be changed.

Figure 14:
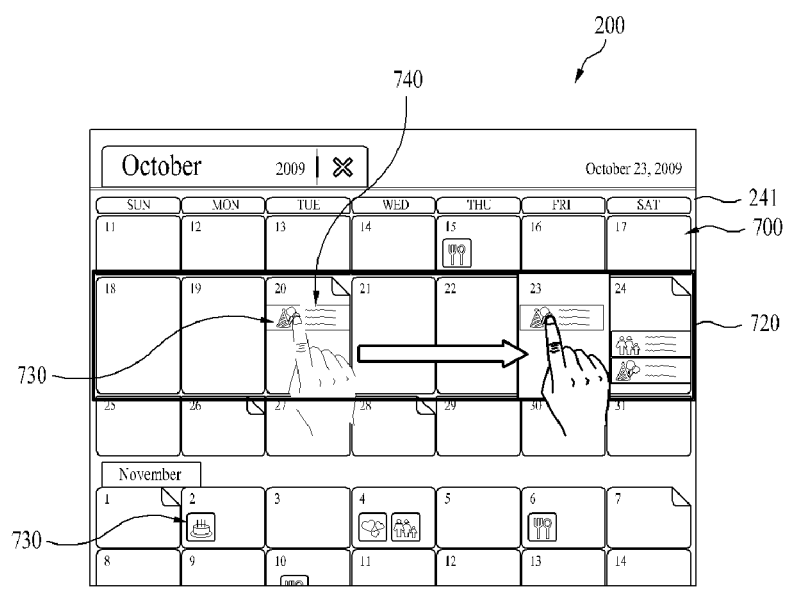
FIG. 14 is a diagram illustrating a process of changing the date of a specific schedule into another date in the calendar displayed on the terminal of the refrigerator according to the invention.

As shown in FIG. 14, the user may change the schedule planned on a specific date into on another date. Such schedule changing work may be enabled by the user's drag and drop operation smoothly.

Specifically, when changing the schedule planned on October 20 into on October 23, the user drags the schedule icon 730 displayed on October 23 to October 23 in a state of touching it.

The finger is dropped from the dragged schedule icon 730 after moved to October 23, and then the schedule planned on the $20^{th}$ date is changed into on the 23th date. The changed state is stored.

A situation of the user inputting a new schedule will be described as follows.

Figure 15:
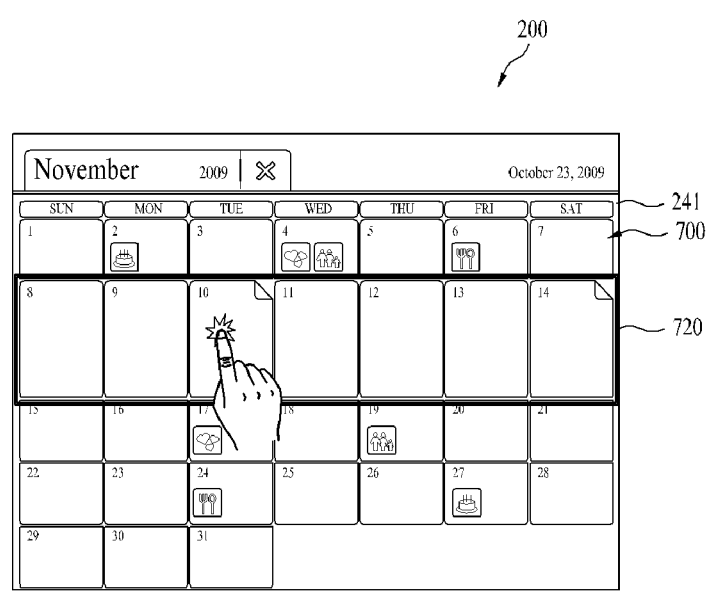
FIGS. 15 to 18 are diagrams illustrating a process of inputting a new schedule to the terminal of the refrigerator according to the invention.

First of all, as shown in FIG. 15, the user double touches a desired date.

Figure 16:
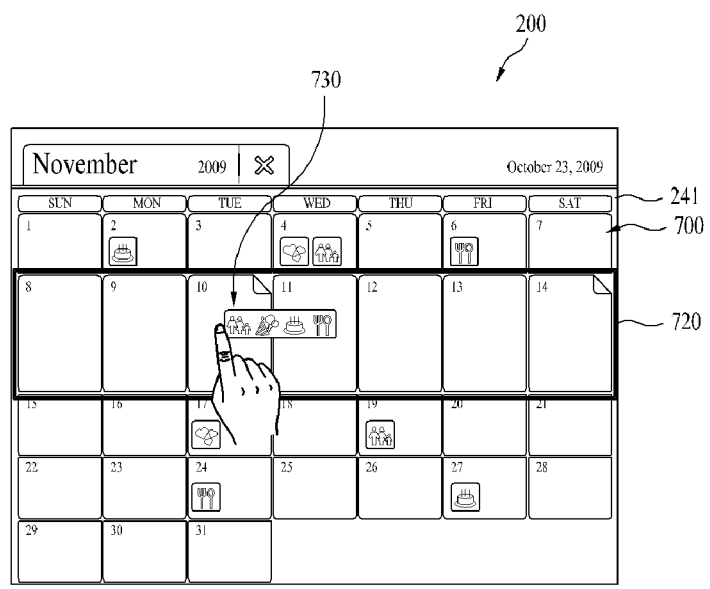

After that, pluralities of schedule icons 730 are unfolded to display specific schedules, as shown in FIG. 16.

Figure 17:
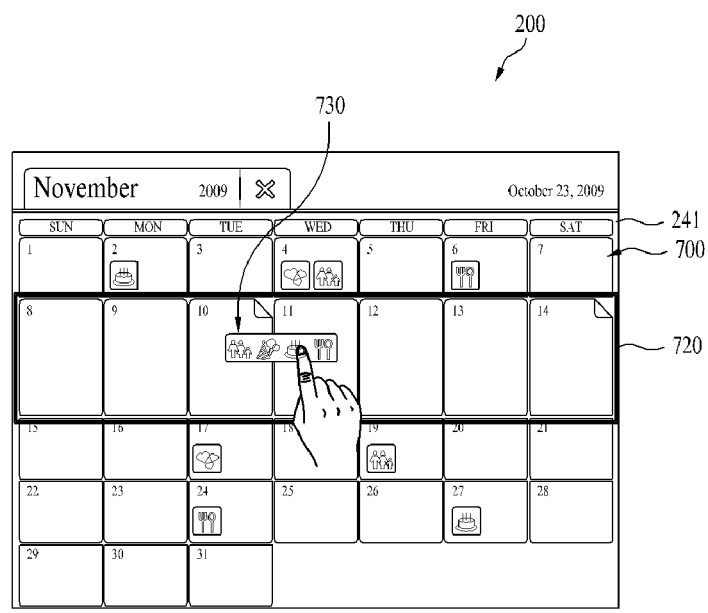

As shown in FIG. 17, a specific one of the schedule icons 730 is touched and selected.

Figure 18:
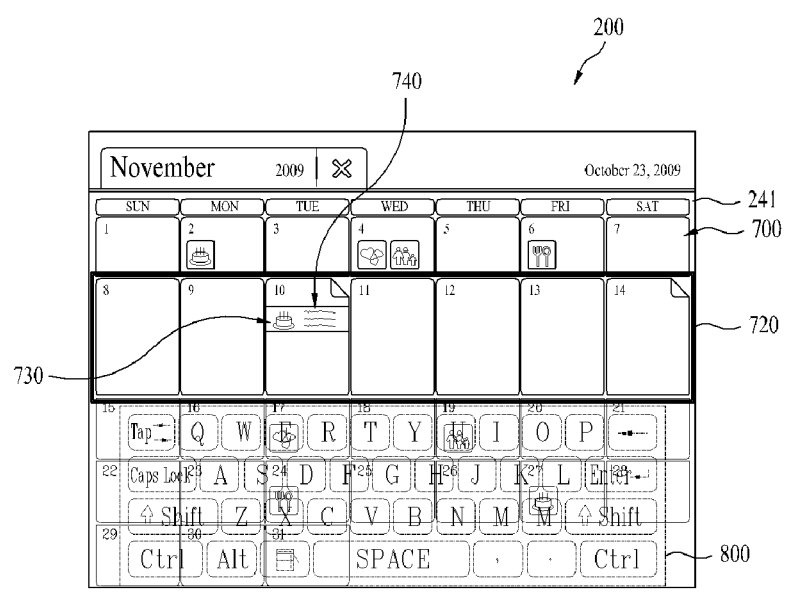

When the specific schedule icon is touched and selected, a touch key board 800 is popped up on the display module 241 to enable the user to record brief comments related to the schedule of the schedule icon 730 as shown in FIG. 18.

The touch key board 800 may be located above the calendar 700.

In other words, even when touch is input during the input using the touch key board 800, the calendar 700 may not be affected.

Accordingly, the user can input brief comments related to the corresponding schedule, using the touch key board 800. The input comments are displayed on the selected date, together with the selected schedule icon 730.

The comments displayed as mentioned above may be displayed outside when they are in the enlarged frame 720. When they are out of the enlarged frame 720 by the user's calendar drag, the comments are hidden.

In reference to FIG. 19, the control for the schedule management in the terminal mentioned above will be described comprehensively as follows.

Figure 19:
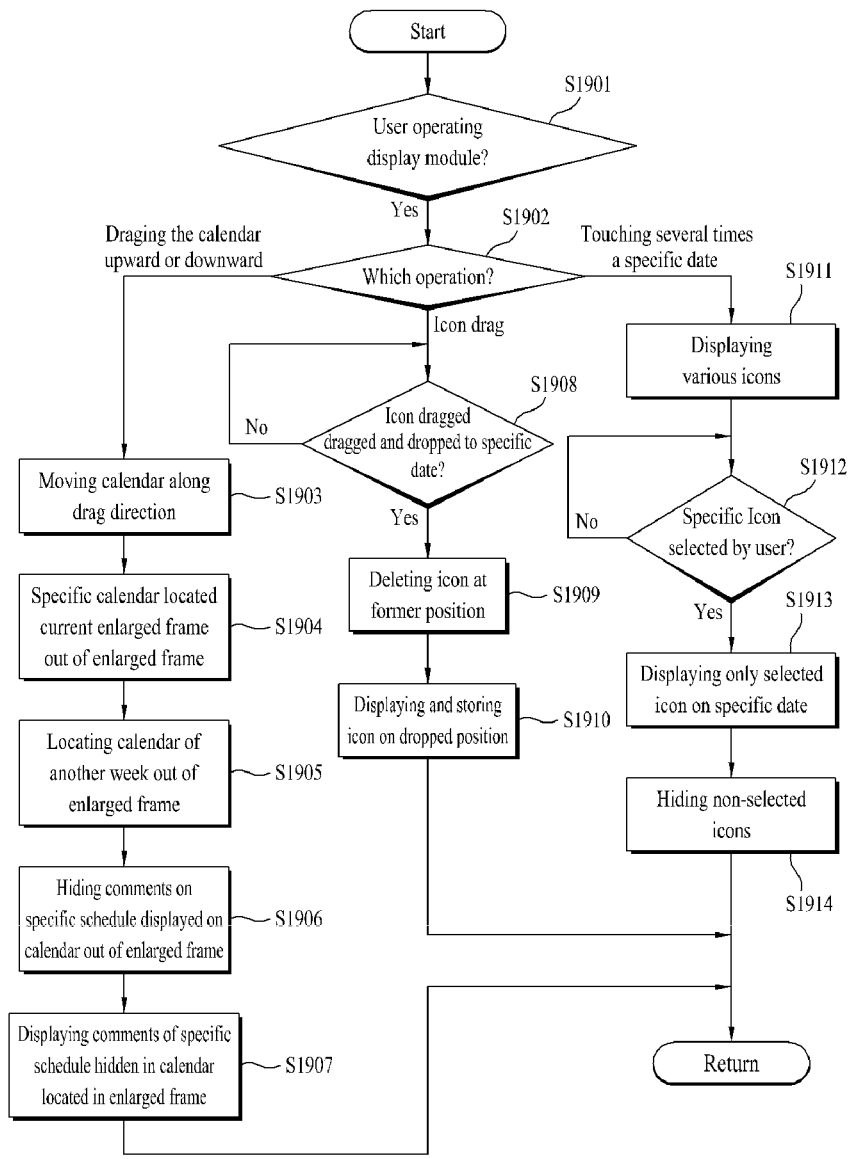
FIG. 19 is a flow chart illustrating control flow for schedule management in the refrigerator according to the invention.

As shown in FIG. 19, it is determined whether the user operates the display module configured of the touch screen (S1901). If the user operates the display module based on the result of the determination, it is determined which kind of the operation is made by the user (S1902).

If the user drags the touched calendar upward or downward after touching the calendar displayed on the touch screen, the calendar is moved along the drag direction (S1903).

Such movement makes a specific week of the calendar in the current enlarged frame be out of the enlarged frame (S1904). Another week of the calendar located out of the enlarged frame is located in the enlarged frame (S1905).

Meanwhile, the position change of the calendar with respect to the enlarged frame hides the comments on a specific schedule displayed on the calendar out of the enlarged frame (S1906).

The comments related to a specific schedule that is hidden before are displayed outside on the calendar located in the enlarged frame (S1907).

In S1902, when it is determined that the user's operation is dragging icon related to a specific schedule displayed on a specific date, it is determined whether an icon dragged to another date by the user is dropped (S1908).

When the icon is dropped on a completely different date based on the result of the determination, the icon and comments displayed on the former location are deleted (S1909) and an icon. Comments related to the icon are displayed on the dropped date and the displayed comments are stored (S1910).

Meanwhile, in S1902, when the user touches several times (multi-touches) a specific date at preset intervals, a plurality of different icons are displayed on a specific date (S1911).

When the user selects a specific one of the icons by touch, only the selected icon is displayed on the corresponding date and the other icons not selected by the user are controlled to be hidden (S1913, S1914).

When the user selects to record comments related to the selected icon, the touch key board is displayed on the display part of the touch screen to enable the user to record desired comments.

FIGS. 20 to 26 are diagrams according to a third embodiment related to information transmission/reception and personal schedule management.

Figure 20:
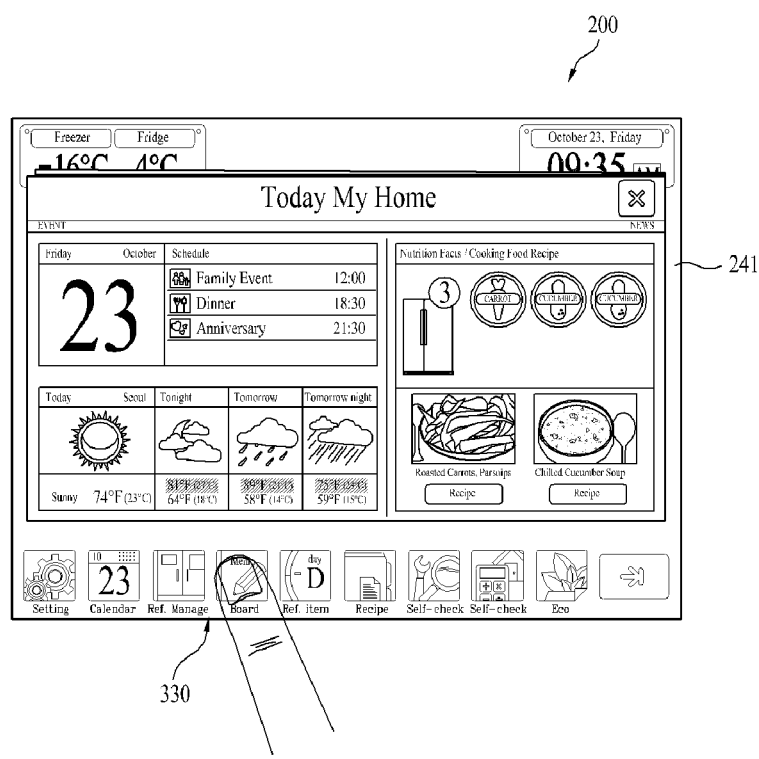
FIG. 20 is an initial screen displayed on the terminal of the refrigerator according to the invention.

FIG. 20 is a diagram of an initial screen displayed on the terminal 200 according to the invention.

As shown in FIG. 20, on the initial screen may be displayed the current date, family schedules and the current weather. On the right of them may be displayed storage states of the current foods preserved in the refrigerator.

Menu icons 330 displaying various menus are displayed on a lower area of touch screen 210 in the terminal. When the user touches one of the menu icons 330, information related to the selected menu is popped up on the screen.

Figure 21:
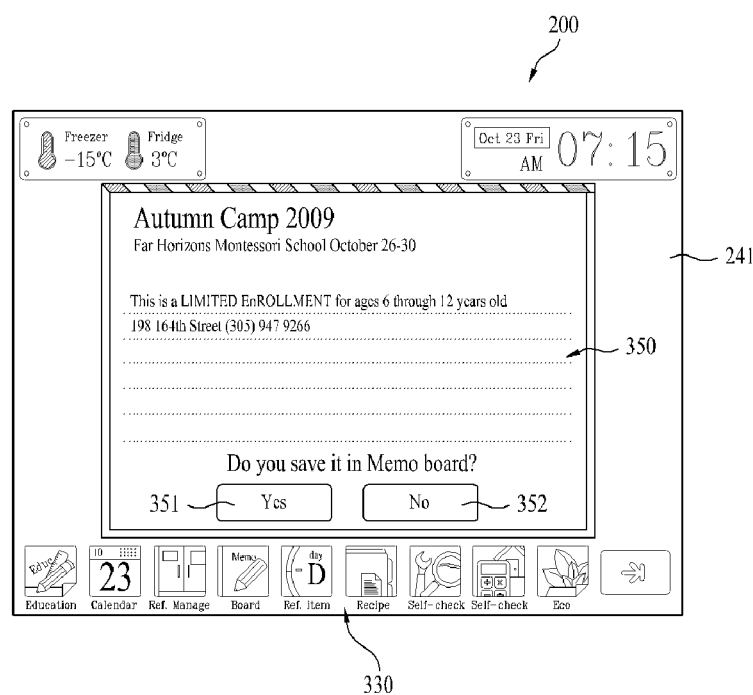
FIG. 21 is a diagram illustrating a new message displaying screen displayed on the terminal of the refrigerator according to the invention.
Figure 22:
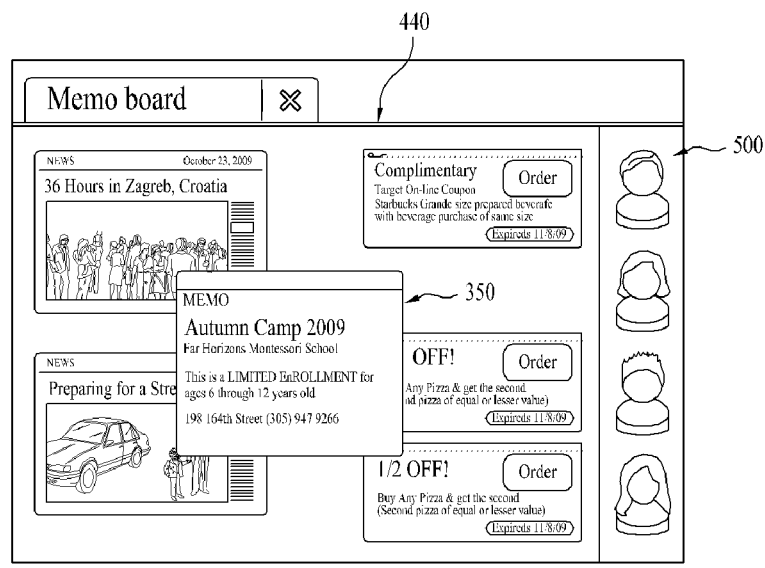
FIG. 22 is a diagram illustrating a memo board displayed on the terminal of the refrigerator according to the invention.

According to this embodiment, when the user pushes a menu icon displaying "Memo Board" to open a memo board to store various information and messages, a screen is popped up as shown in FIG. 21.

The menu icon displaying "Memo Board" may display various information provided outside and provide a passage to provide the displayed information to each of the component parts.

As shown in FIG. 21, when the icon displaying "Memo Board" is pushed, a new message 350 provided outside is displayed on the display module 241.

A "Yes" key 351 and "No" key 352 are popped up on the new message to enable the user to select whether to store the new message 350 in the memo board.

When the user touches "Yes" key 351, the new message 350 is stored in the memo board 440 and the storing is displayed.

To enable the user to recognize the new message 350 smoothly, the new message 350 may be displayed before a former message displayed on the memo board 440.

Meanwhile, the user touches and drags a specific message displayed on the memo board 440 and move the position of the message. After that, the user releases (or drops) the touch state and the message is still at a finally moved position. Accordingly, the initial position of the message may be changed into another position.

A storage folder 500 assigned to each family member may be provided adjacent to the memo board 440. The storage folders 500 may be realized as figures of family members, respectively.

Figure 23:
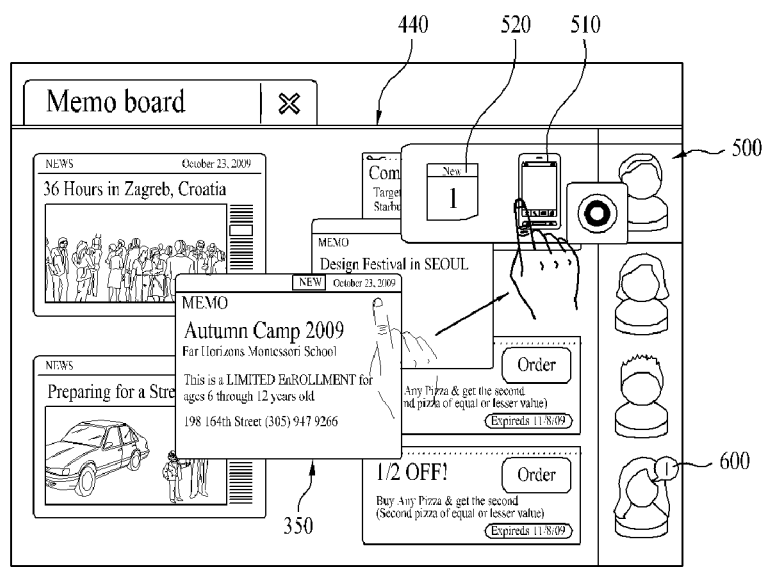
FIG. 23 is a diagram illustrating a message that is dragged and dropped to an icon of a storage folder on the terminal of the refrigerator according to the invention.

As shown in FIG. 23, each storage folder 500 includes a communication device icon 510 displaying a communication device and a schedule icon 520 displaying a schedule for each family member.

The icons 510 and 520 are hidden in the storage folder 500. When the user touches and drags a message on the memo board 440 near the storage folder 500, the storage folder 500 is open and the icons 510 and 520 are displayed.

When the user touches the storage folder 500 plural times with his or her finger, the icons 510 and 520 may be open aside. That is because the user has to check contents stored in his or her storage folder 500.

According to the third embodiment, only the communication device icon 510 and the schedule icon 520 are provided in the storage folder 500 and the invention is not limited thereto. Icons having other functions may be provided.

The user drags a message or information provided on the memo board 440 to the communication device icon 520. After that, the user drops the dragged message or information. That situation will be described as follows.

Figure 24:
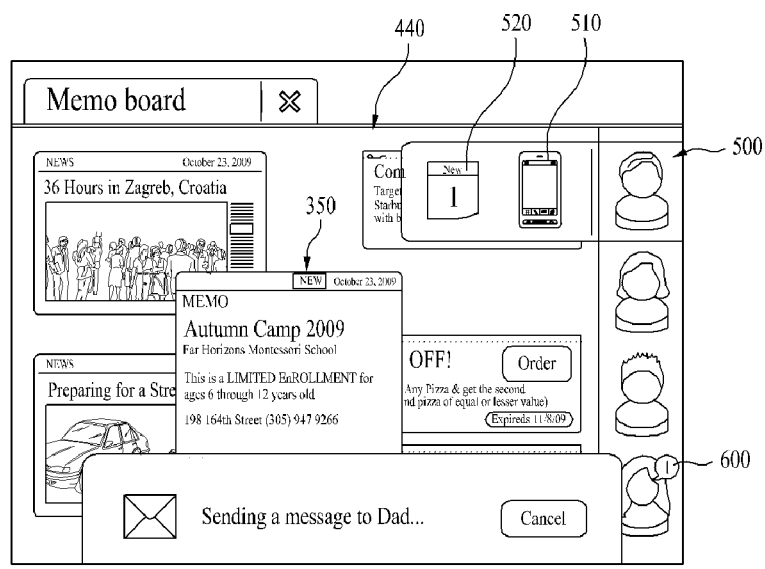
FIG. 24 is a diagram illustrating a message that is transmitted to a personal communication device from the terminal of the refrigerator according to the invention.

As shown in FIG. 24, the message or information dropped by the communication part is transmitted to a communication device, for example, a mobile phone possessed by a family member corresponding to the storage folder 500.

In other words, such the message as SMS is transmitted to the mobile phone by the communication part and the transmitted message is displayed on a screen of the mobile phone possessed by the corresponding family member.

Meanwhile, a specific message of the storage folder 500 is moved and dropped to the communication icon 510, to be transmitted to a specific communication device, or dropped to the schedule icon 520 to be stored in the schedule board.

In this instance, a new message display window 600 is generated on the storage folder 500 and the number of the message dropped to the storage folder 500 is displayed on the new message display window 600.

If a message on the memo board 440 is dragged and dropped to the schedule icon 520 on the screen shown in FIG. 23, a corresponding message is input to a schedule board for a corresponding family member.

The schedule board may be specified to be the same as a schedule list or calendar.

Figure 25:
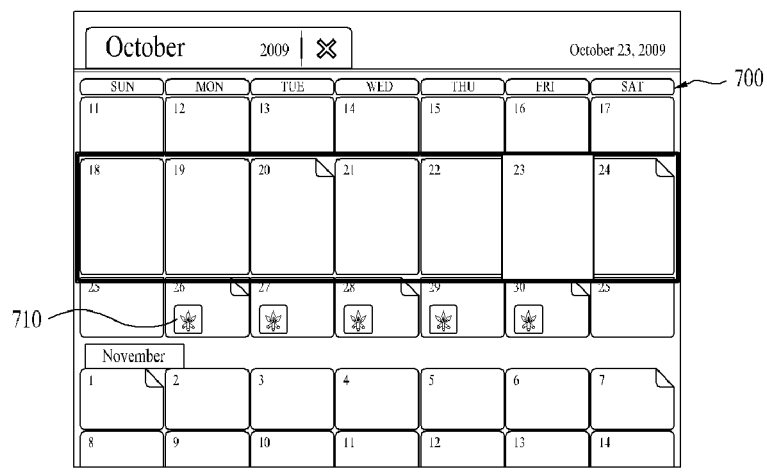
FIG. 25 is a diagram illustrating a schedule related message that is displayed on a schedule calendar as a schedule board on the terminal of the refrigerator according to the invention.

FIG. 25 illustrates a schedule calendar. When the message dragged and dropped to the schedule icon 520 is related to a specific schedule, a specific schedule may be input to the schedule calendar.

The input schedule may be input as an icon 710 or a simple memo to enable the user to recognize easily.

Figure 26:
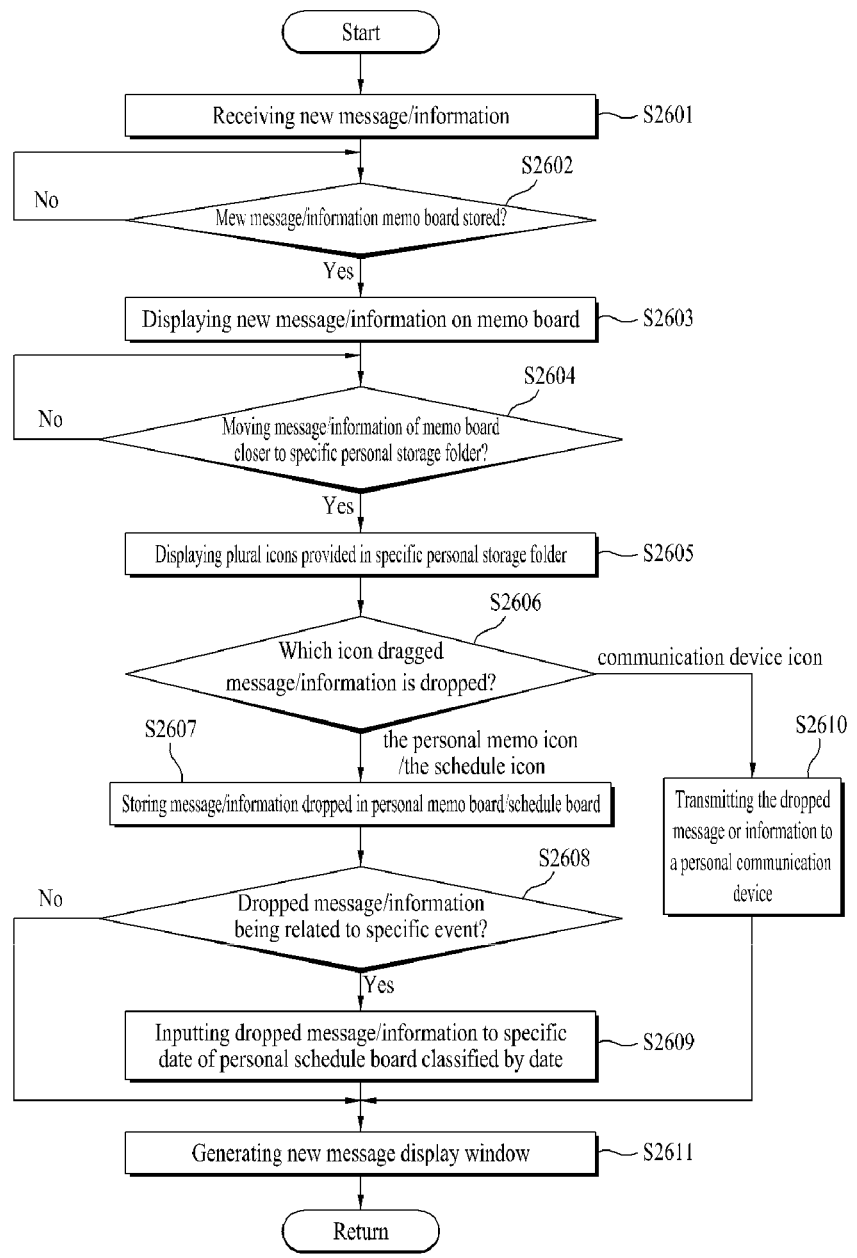
FIG. 26 is a flow chart illustrating control related to information management in the refrigerator according to the invention.

In reference to FIG. 26, the overall control operation of the invention will be described as follows.

First of all, when receiving a new message or new information via the communication part (S2601), the controller determines whether the user inputs a command of storing such a new message or information in a memo board (S2602).

When the storing command is input based on the result of the determination, the controller controls the new message or information to be displayed on the memo board (S2603).

As mentioned above, a currently new message or information may be displayed in the very front as shown in FIG. 5.

Meanwhile, it is determined whether the message or information displayed on the memo boar is approached to the storage folder assigned to a specific person (S2604).

In this instance, a plurality of icons provided in the storage folder for the specific person may be open and displayed (S2605).

In this instance, the icons include the communication device icon 510 or the schedule icon 520 as shown in FIG. 23. The icons may be personal memo icon or other icons.

It is determined which icon the dragged message or information is dropped to (S2606).

When the dropped icon is the personal memo icon or the schedule icon, the message or information dropped to the personal memo or the schedule board (the schedule list or the schedule calendar) may be stored.

It is determined whether the dropped message or information is related to a specific schedule (S2608).

When it is related to the specific schedule, contents related to the dropped message or information are input to a specific date of the personal schedule board (the schedule list or the schedule calendar) categorized into the dates.

A date or contents written in the message or information may be searched and the contents may be written on the corresponding date on the schedule board (S2609).

Meanwhile, when the dragged message or information is dropped to the communication device icon in S2606, the dropped message or information is transmitted to a corresponding personal communication device and the corresponding user may recognize the contents of the message (S2610).

After the S2609 or S2610, a new message display window is displayed to notice that the new message or information is dropped to a corresponding storage folder and written in the schedule board or personal memo board or it is transmitted to the communication device (S2611).

Through that process, each user recognizes that the new message or information arrives.

Figure 27:
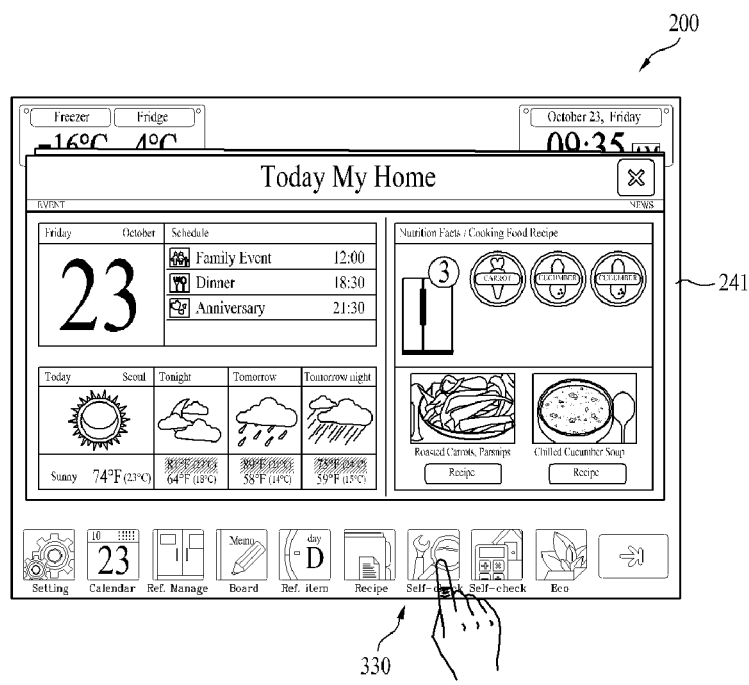
FIG. 27 is an initial screen displayed on the terminal of the refrigerator according to the invention.
Figure 28:
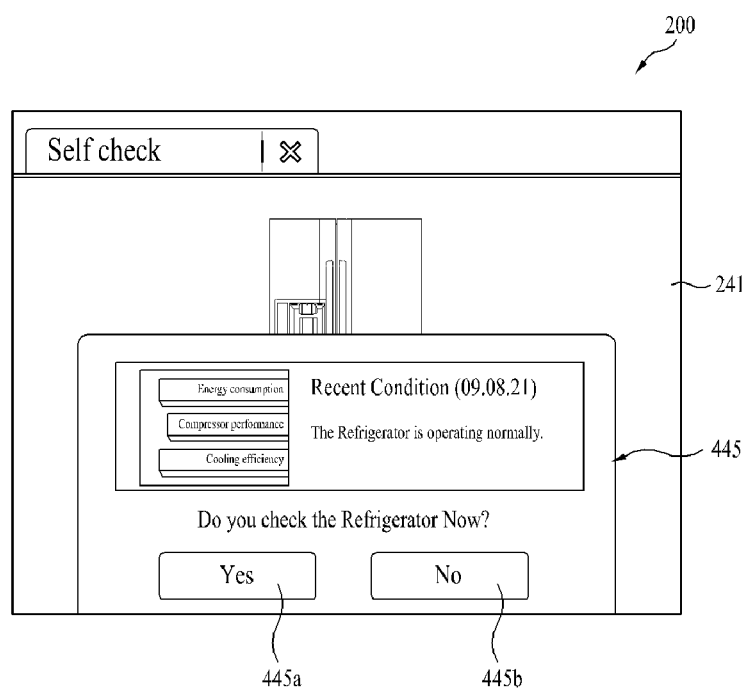
FIG. 28 is a diagram illustrating an operational state displaying window displayed on the terminal of the refrigerator according to the invention.

Meanwhile, the user touches a button of "Self-check" out of the menu icons 330 shown in FIG. 27 to check a normal operation of the refrigerator, a screen shown in FIG. 28 is popped up.

As shown in FIG. 28, an operation state display window is displayed on the display module 241 to display a current state of the refrigerator.

On the operation state display window 445 may be displayed a bar graph to simply display energy consumption, compressor performance and cooling efficiency that are deducted by self check before.

It is easily figured out from the length of the bar graph whether the energy consumption, the compressor performance and the cooling efficiency are normal, exceeding or short.

The last self check date (Aug. 21, 2009 in this embodiment) is displayed on the operation state display window 445.

On a lower area of the operation state display window 445 is displayed a message displaying "Do you check the refrigerator now?" and under the message are displayed a Yes key 445a and a No key 445b, such that the self check may be implemented by the user's selecting.

Figure 29:
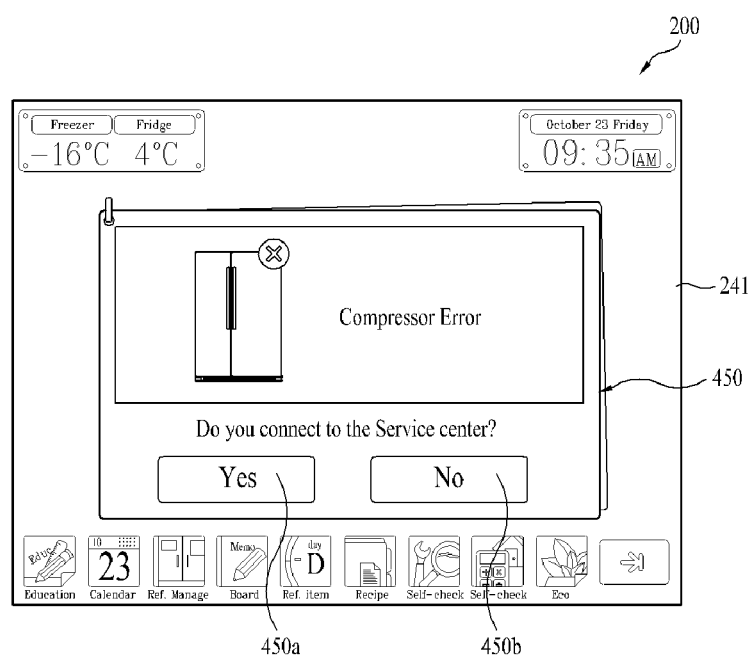
FIG. 29 is a diagram illustrating a diagnosis result window displayed on the terminal of the refrigerator according to the invention.
Figure 30:
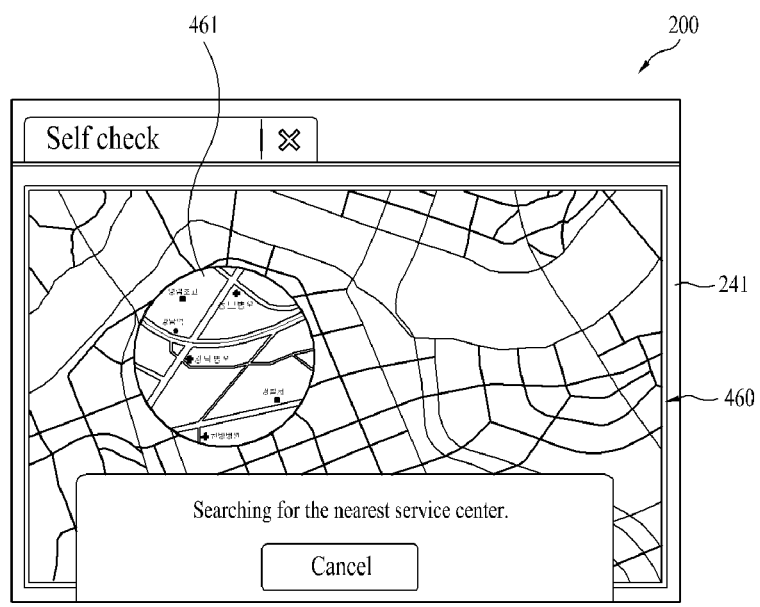
FIG. 30 is a diagram illustrating a map as a service center search result displayed on the terminal of the refrigerator according to the invention.

When the Yes key 445a is pushed on the operation state display window 400, a check result window 450 is displayed as shown in FIG. 29.

When they are operated normally, a message displaying that the component parts are operated normally is popped up.

However, when some of the component parts are in error or deteriorated, an error message or deterioration message like what is shown in FIG. 29 is displayed on the check result window 450.

In this instance, the component part determined to be in error or to have an abnormal ability is displayed on the check result window 450 to enable the user to recognize easily and a graph showing the position of the component is displayed.

On the check result window 450 shown in FIG. 29 may be displayed a message of "Compressor Error" and "X" to show the compressor is located in an upper portion of the refrigerator.

When the state of the refrigerator is abnormal mentioned above, a message asking whether to connect to the service center to get the repair service is displayed and "Yes" key 450a and "No" key 450b are displayed under the message.

When the Yes key 450a is touched, the nearest service center from the current location is searched on a map 460.

At this time, an enlarged display window 461 is displayed on the map 460 to enlarge and display geographic information near the corresponding service center to notify the user of the location of the service center definitely.

Figure 31:
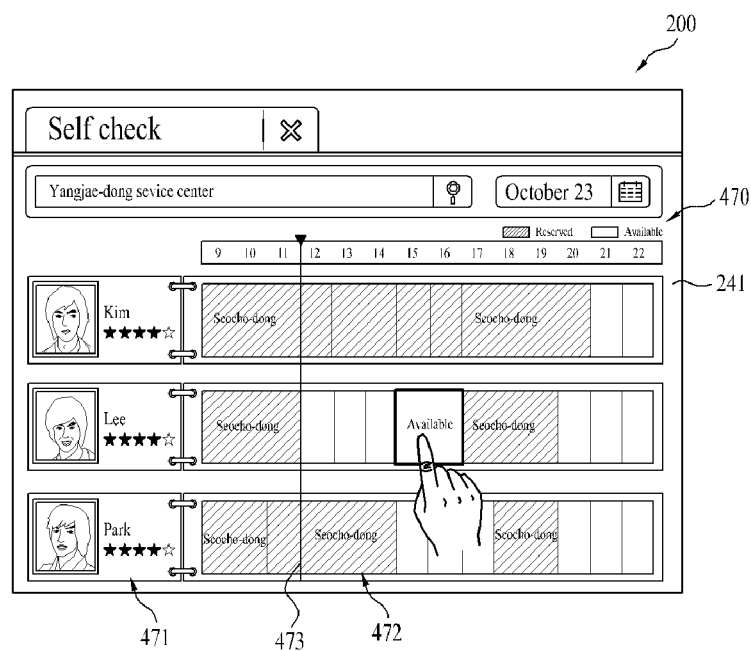
FIG. 31 is a diagram illustrating a servicemen list displayed on the terminal of the refrigerator according to the invention.

When the nearest service center is searched through the searching process, a repairman list 470 of the nearest service center is displayed as shown in FIG. 31.

On the repairman list 470 are displayed a personal data display window 471 displaying photographs, names and evaluation grades and a schedule display window 472 displaying service schedules of the repairmen.

On the schedule display window 472 are displayed current reservation states of each repairman classified by time and reservation available time (displayed as "Available").

A numeral reference of 473 is a current time displaying line and the user can make reservation of on-site service, in reference to the current time displaying line 473 and the available reservation time of each repairman.

In that state, the user touches a repairman having no service schedule at the desired time on the display module 241 to make a service reservation simply.

In other words, the current time is 11:30 AM and the user desires to have an on-site service about 3:00 PM. In this instance, the user touches an available time (2:30 PM~4:40 PM) on the schedule display window 432 of the repairman having not service schedules at that time.

Figure 32:
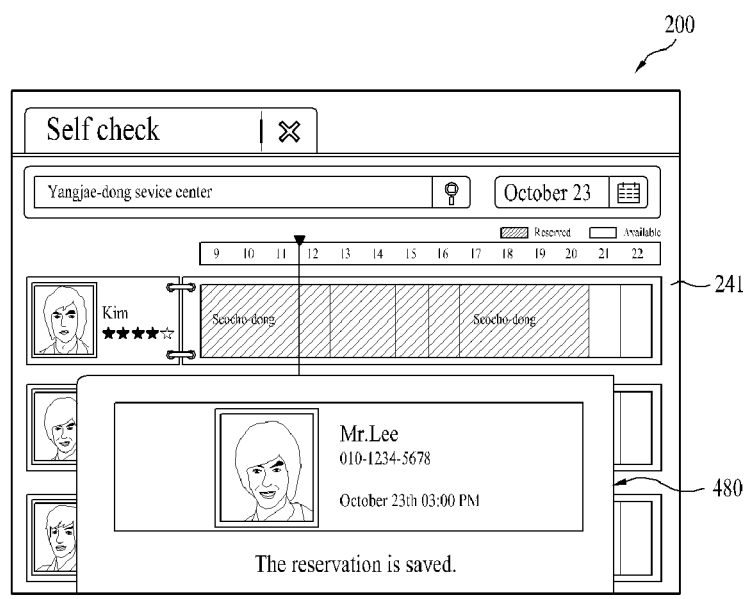
FIG. 32 is a diagram illustrating a reservation display window displayed on the terminal of the refrigerator according to the invention.

As shown in FIG. 32, a reservation window 480 displaying a personal data and a service reservation time of the reserved repairman is displayed together with a message displaying completion of D-reservation.

In reference to the accompanying drawings, overall control flow of the invention related to the self check and the call for the service will be described as follows.

As shown in FIG. 23, the user touches to input a command for the self check and the self check starts (S3301). After that, it is checked whether the refrigerator is operated normally (S3302).

Based on such the self check, it is determined whether the refrigerator is in error or abnormal operation (S3303).

When the refrigerator is in error or abnormal operation based on the result of the determination, a message of such error or abnormal operation is displayed (S3304) and the name and position of the portion or component causing the reason of the error or abnormal operation are displayed (S3305).

It is determined whether the user inputs a service requesting button in that error or abnormal state (S3306).

In this instance, the near or nearest service center is searched and the near or nearest service center is marked on the map displayed on the display module (S3307).

When more than two service centers are marked based on the result of the searching, the user may select one of the service centers (S3308). When the nearest service center is marked based on the result of the searching, such a selecting process may be omitted.

Figure 34:
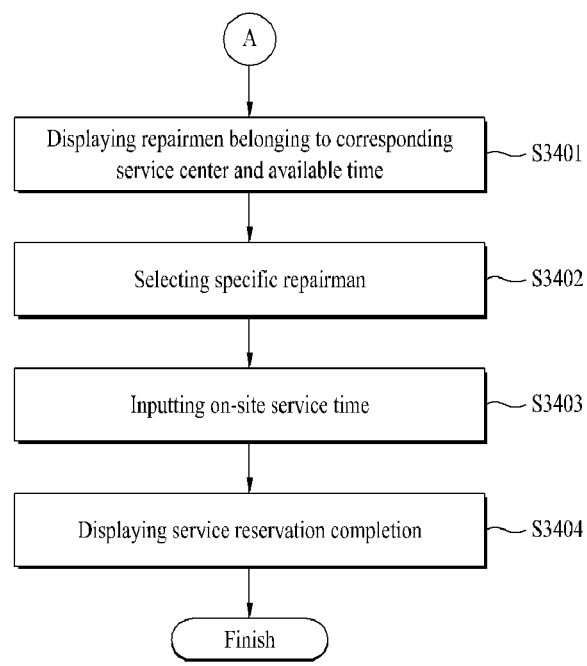

As shown in FIG. 34, a list and available on-site service times of repairmen are displayed (S3401).

Once the user inputs a specific repairman and a corresponding available on-site service time (S3402, S3403), a message of service reservation completion is displayed on the display module (S3404).

Figure 35:
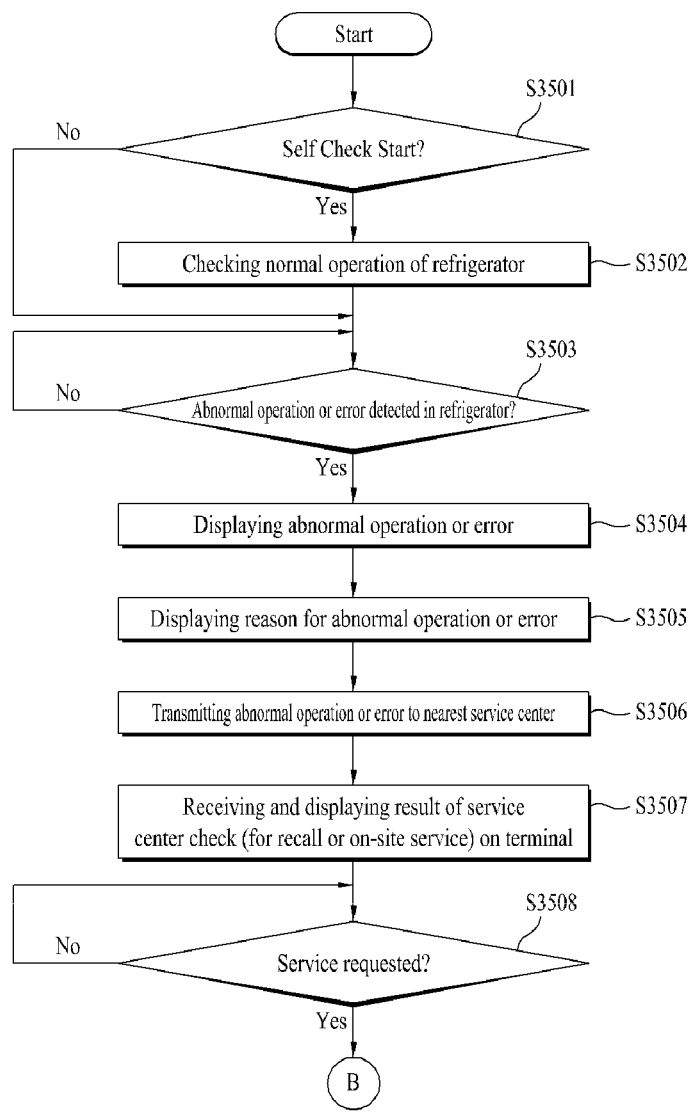

FIG. 35 illustrates another embodiment of the control method according to the invention. A self check starts by the user's touch-inputting a command of self check (S3501). In this instance, it is checked whether the refrigerator is in normal operation (S3502).

It is checked whether the refrigerator is in abnormal operation or in error (S3503) during the self check process (s3503) and if the error or abnormal operation is checked, the message of that state is displayed (S3504).

Figure 33:
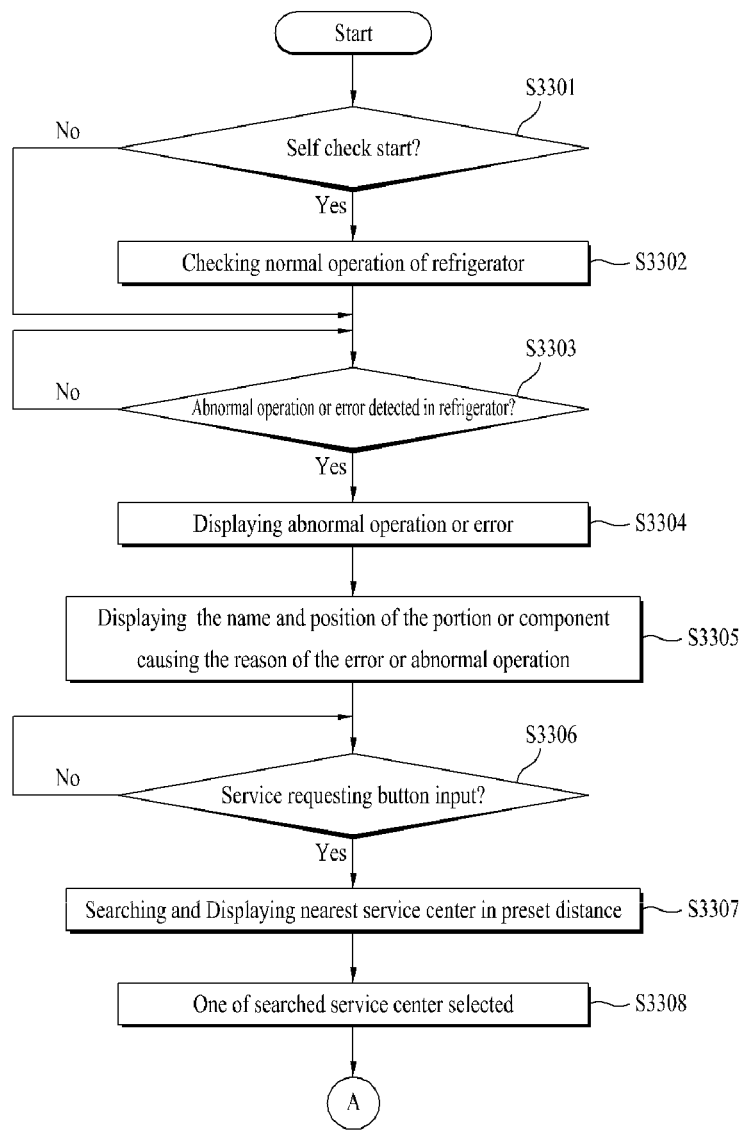
FIGS. 33 to 36 are control flow charts of the refrigerator including the terminal according to the invention.

The name and location of the portion or component part that is the reason of the abnormal operation may be displayed (S3505), which is the same as the control method shown in FIG. 33.

In that state, the abnormal operation or error of the refrigerator is transmitted to the nearest service center, regardless of the user input (SS3506).

Such a transmission and reception process may be implemented via wire and wireless internet communication.

The nearest service center receives and examines the abnormal operation or error of the refrigerator. After that, it determines whether the abnormal operation or error requests a recall service or an on-site service.

The result of that determination is re-transmitted to the terminal of the refrigerator by that service center and it is received by the terminal of the refrigerator. Contents of the reception are displayed on the terminal (S3507).

Figure 36:
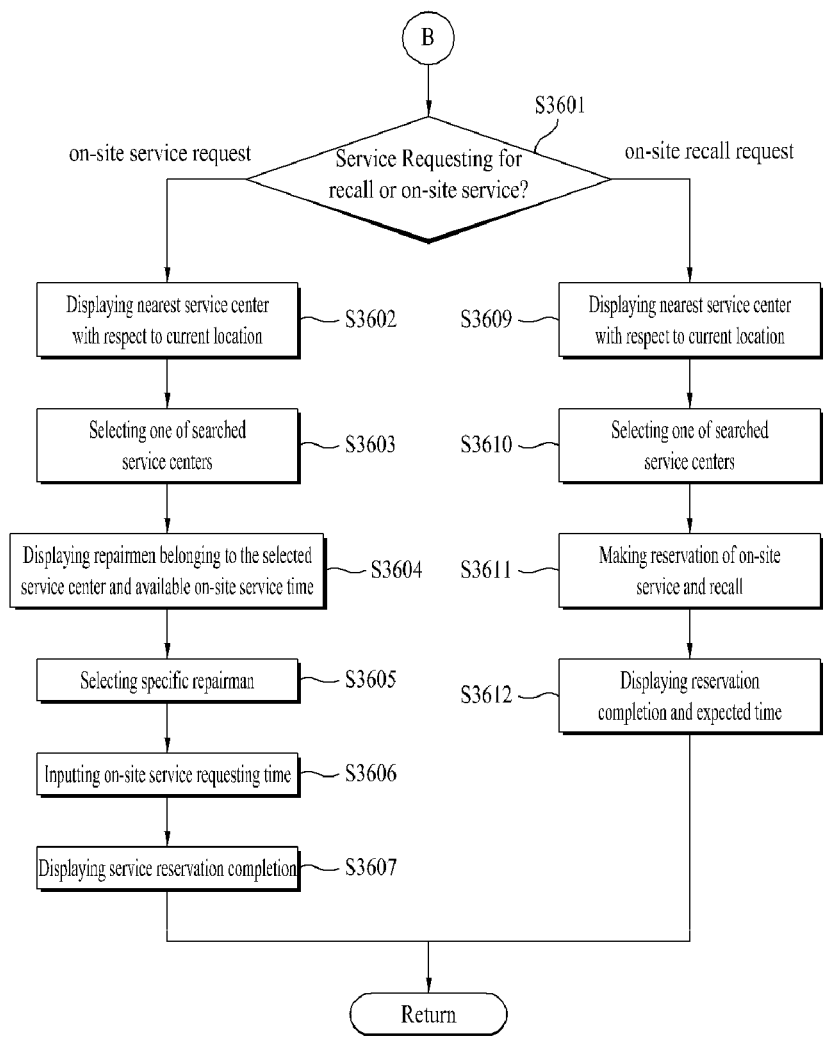

Based on the displayed contents, the user determines whether a service request is made to the service center (S3508). As shown in FIG. 36, the service request is an on-site service request or a recall request (S3601).

The user's on-site service request or recall request is made based on the result of the determination transmitted from the service center.

When the service requested in S3601 is the on-site service request, near service centers or the nearest service center are searched and the result of the searching is displayed on a map of the display module (S3602).

When two or more service centers are searched and marked, the user may select one of the service centers (S3603). When the nearest service center is searched and marked, such a selecting process may be omitted.

Repairmen belonging to a corresponding service center and available on-site times of the repairmen are displayed (S3604). When the user inputs a specific repairman and a corresponding available on-site time (S3605, S3606), a service completion message is displayed on the display module of the terminal (S3607).

Meanwhile, even when the user makes the recall request in S3601, the near service centers or the nearest service center based on the user's present location may be marked on the map of the display module (S3609).

When two or more service centers are searched and marked, the user may select one of two or more service centers (S3610). When the nearest service center is searched and marked, such a selecting process may be omitted.

A corresponding service center is called and a recall reservation is made to take the refrigerator for the recall service (S3611).

Once such a recall reservation step is completed, recall reservation completion and an expected time of the recall may be displayed on the display module of the terminal (S3612).

There will be described an embodiment for managing information on short expiration dates of the foods stored in the refrigerator and recipe information related to the foods as follows.

Figure 37:
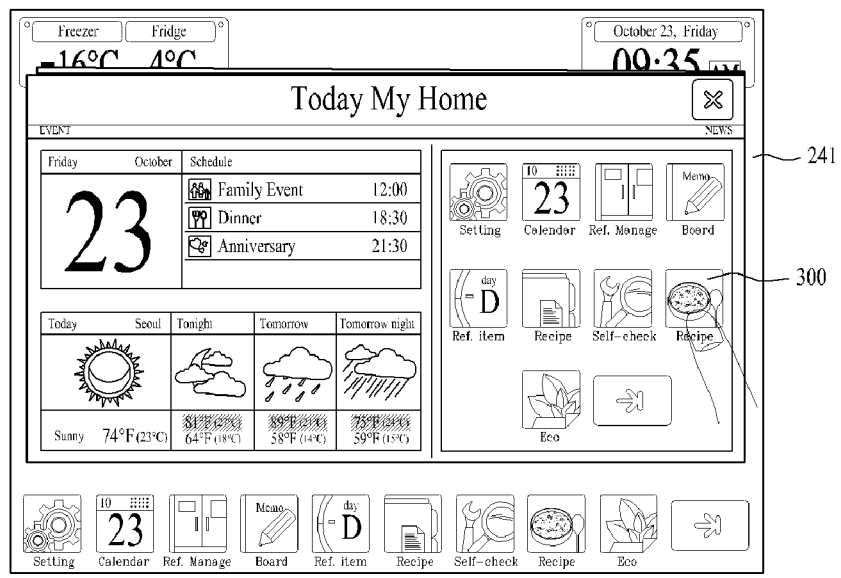
FIG. 37 is a diagram illustrating a screen state according to a first embodiment related to food information and recipe information.
Figure 38:
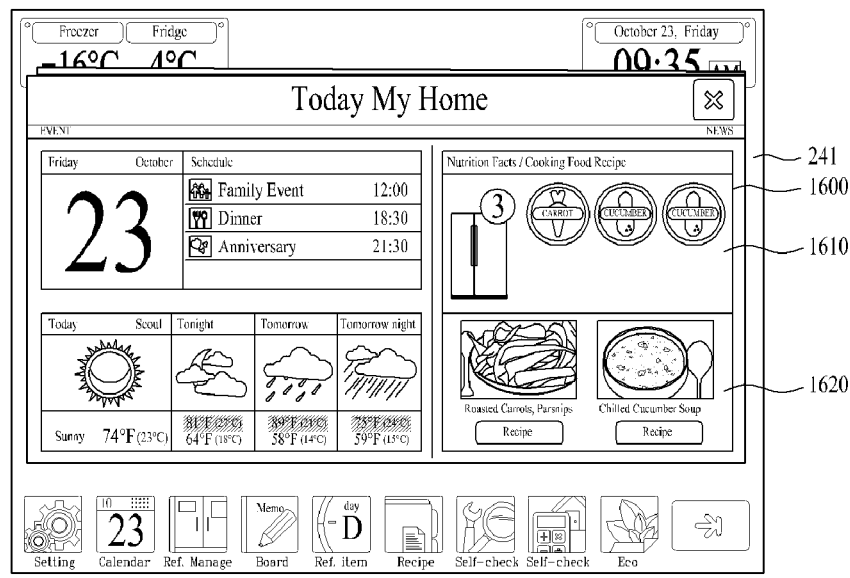
FIG. 38 is a diagram illustrating a screen state according to a second embodiment related to food information and recipe information.

In reference to FIGS. 37 and 38, on an initial screen (or a standby screen) of the terminal 200 may be displayed widget information displaying a current date, schedules of family members and a current weather.

Also, on the initial screen may be displayed a plurality of menu icons used for operating various functions of the refrigerator 100.

When the user selects a corresponding menu icon from a user input part 230 or a touch screen type display module 241, a menu screen related to the icon is displayed on a touch screen.

Figure 46:
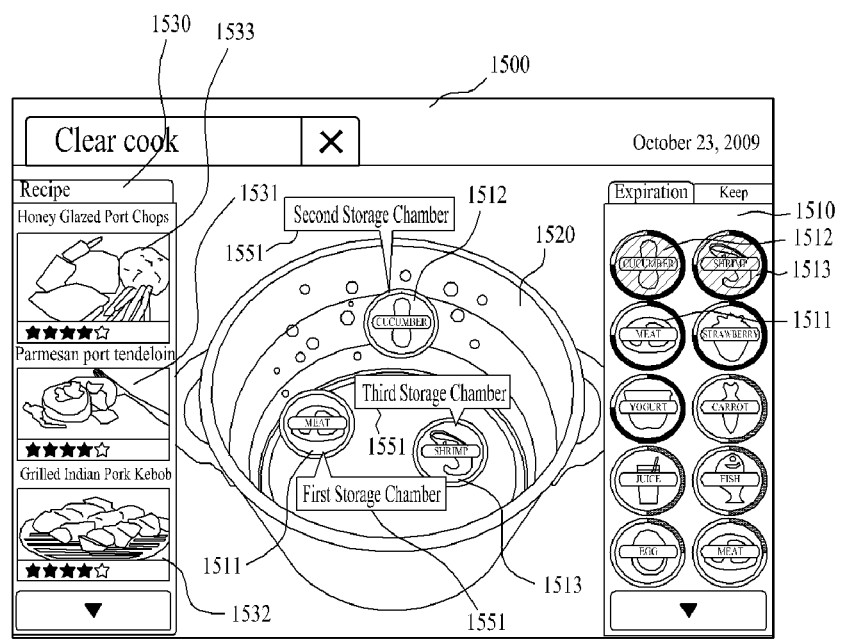

As shown in FIG. 37, when the user selects a recipe menu icon 300 according to a first embodiment of the invention, the initial screen is changed into a food recipe providing screen (1500, see FIGS. 45 and 46).

Foods having short expiring dates are searched and marked on the recipe providing screen 1500. When the searched foods are selected, recipe information having the selected foods may be provided to the user.

According to an embodiment of the invention shown in FIG. 38, different from the embodiment shown in FIG. 37, the recipe information screen 1600 is displayed on the initial screen, without changing of the initial screen.

In other words, the display module 241 of the terminal 200 is driven and an initial screen of the refrigerator 100 is displayed. After that, the foods 1610 having the short expiration dates and the cooking food recipe information 1620 including the foods 1610 may be displayed on the initial screen.

Figure 39:
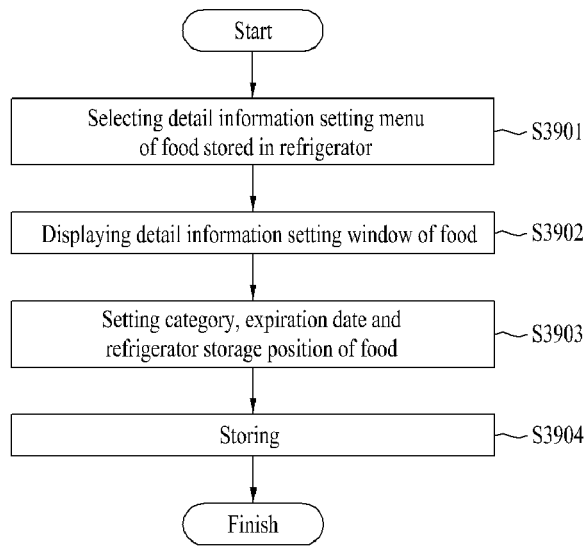
FIG. 39 is a flow chart illustrating a process of setting the food expiration date and a refrigerator storage chamber position of the food on a terminal for the refrigerator.
Figure 43:
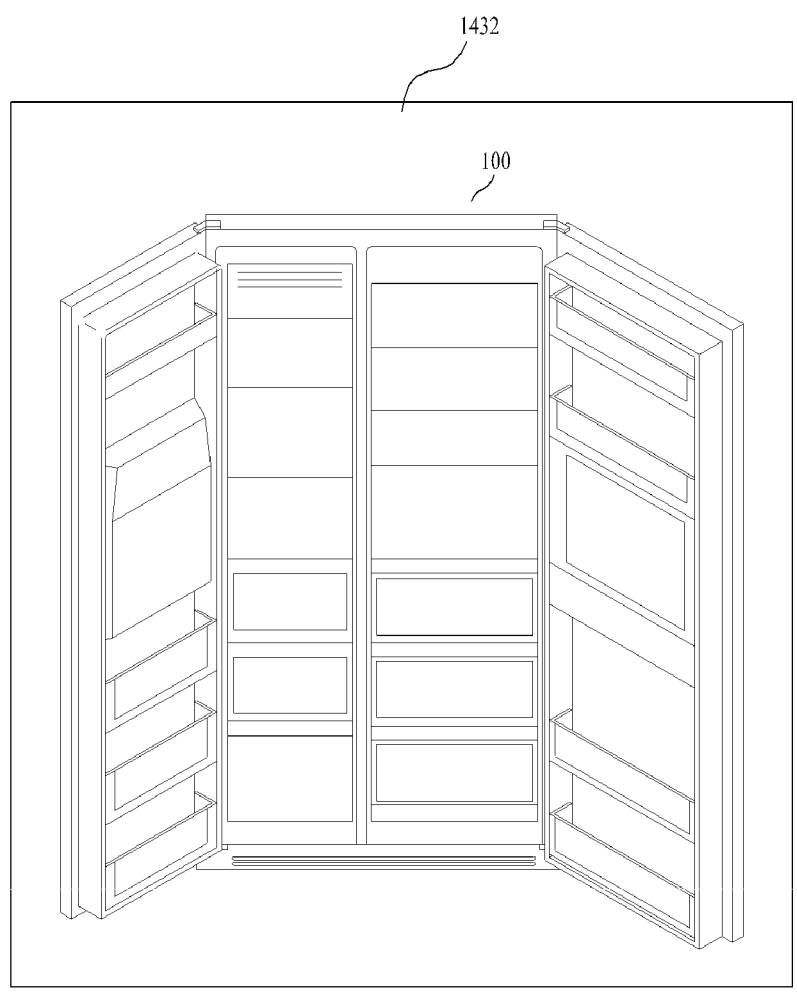

In FIGS. 39 and 43 may be described a process of setting detail food information such as the kinds, the expiration dates and the storage locations of the foods stored in the refrigerator 100.

When RFID tags storing detail food information such as the kinds, the prices, the purchase places and expiration dates of the foods are attached to the foods, a process which will be described in reference to FIGS. 39 to 43 can be omitted.

FIG. 39 is a flow chart illustrating a process of setting the expiration dates of the foods and refrigerator compartment position of the foods on the terminal of the refrigerator according to the invention.

FIGS. 40 to 43 are screen state diagrams illustrating a process of setting the expiration dates of the foods and refrigerator compartment position of the foods on the terminal of the refrigerator according to the invention.

In reference to FIGS. 39 to 43, the controller 280 of the terminal 200 transmits a control command for displaying a plurality of menu icons related to the functions of the refrigerator 100 on the touch screen.

When the user selects one of the menu icons to set detail information such as the kinds, the expiration dates and the storage positions of the foods which will be stored in the refrigerator from the user input part 230 or the touch screen (S3901), a setting window 1400 for setting detail information of the foods may be displayed on the setting window 1400 to set detail information of the foods (S3902).

In other words, the user sets the detail information including the kinds, the expiration dates and the storage positions of the foods which will be stored in the refrigerator 100 via the setting window 1400, before storing the foods in the refrigerator 100.

Figure 40:
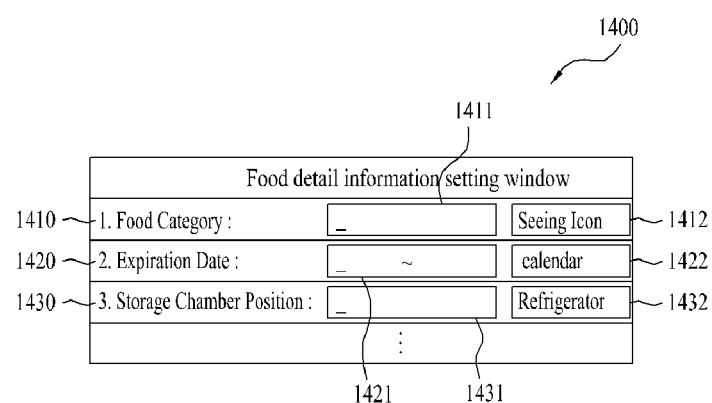

As shown in FIG. 40, the food detail information setting window 1400 includes a food kind setting window 1410, a food expiration date 1420 and a food refrigerator storing position setting window 1430.

Of course, to the food detail information setting window 1400 may be additionally set other information as well as the information on the kinds, the expiration dates and the storing positions of the food by the user operation.

For example, purchase places and prices of the foods may be additionally set.

Also, the food detail information setting window 1400 may include setting windows 1411, 1421 and 1431 for setting the kinds, the expiration dates and the storing positions of the foods as texts and setting windows 1412, 1422 and 1432 for setting the kinds, the expiration dates and the storing positions of the foods as icons.

In other words, when the user selects the text setting windows 1411, 1421 and 1431, the controller 280 displays a keypad for inputting texts on the screen of the display module 241.

When texts corresponding to the kinds, the expiration dates and the storing positions of the foods are input via the displayed keypad, input texts are stored in the memory 250.

Figure 41:
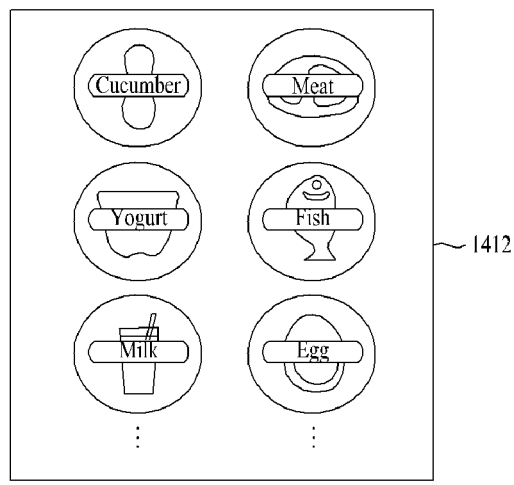

Also, when the user selects the icon type food kind setting window 1412, the controller 280 displays icons displaying the kinds of the foods, respectively, that are provided in the memory 250 as shown in FIG. 41.

When the user selects one of the icons corresponding to the kind of the food which will be stored in the refrigerator, a selected icon may be recognized as the kind of the corresponding food.

When the user selects the icon type food expiration date setting window 1422, the controller 280 displays the calendar provided in the memory 250 as shown in FIG. 42.

When the expiration date of the food is set via the calendar, the date selected on the calendar may be recognized as the expiration date of the food.

When the user selects the icon type food storing position setting window 1432, the controller 280 displays an image of the refrigerator 100 in the memory 250.

A specific one of the compartments is selected in the image of the refrigerator and the selected compartment is recognized as the compartment where the food will be stored.

When the user sets detail information such as the kind, the expiration date and the storage position of the corresponding food via the food detail information setting window 1400, the controller 280 stores the set detail information in the memory 250.

When the recipe menu icon 300 is selected from the initial screen shown in FIG. 37, the food detail information set based on the processes of FIGS. 39 to 43 may be used for providing foods having short expiration dates and recipe information of the foods.

Such processes will be described in detail as follows.

The embodiment of the process shown in FIGS. 39 to 43 will be referenced to as a first embodiment related to the food storage and recipe providing.

Figure 44:
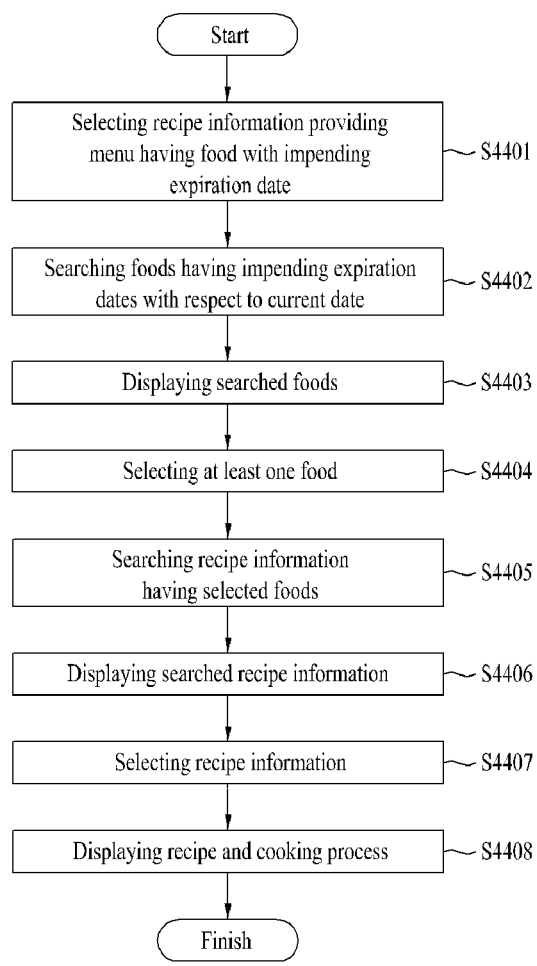
FIG. 44 is a flow chart illustrating a first embodiment of a process providing food recipe information on the foods having the short expiration date.

FIG. 44 is a flow chart illustrating the first embodiment of a process providing the recipe information of the foods having the short expiration dates according to the invention.

FIGS. 45 and 46 are screen state diagrams illustrating the first embodiment of the process providing the recipe information of the foods having the short expiration dates according to the invention.

In reference to FIGS. 44 to 46, the controller 280 converts the initial screen shown in FIG. 37 into a food recipe providing screen 1500, when a recipe icon 300 is selected from the initial screen (S4401).

Foods having the shortest expiration dates with respect to the current date are searched out of the food detail information set to the process shown in FIGS. 39 to 43 or RFID tags attached to the foods (S4402).

The reference with respect to the short expiration date in S4402 may be set or changeable by the user.

For example, when the user sets 3 days as the reference with respect to the short expiration date, the controller 280 searches the foods having 3 or less expiration days with respect to the current date out of the food detail information set to the process shown in FIGS. 39 to 43 or the RFID tags attached to the foods.

Meanwhile, as shown in FIGS. 45 and 46, the recipe providing screen 1500 of S4402 includes a first region 1510 displaying icons of the foods having the short expiration dates searched by the controller 280, a second region 1520 to which the food icons are dragged and dropped and a third region 1530 displaying recipe information having the foods dragged and dropped to the second region 1520.

The second region 1520 is displayed in a shape of a cooking container where actual foods are cooked such as a saucepan or frying pan.

Once searching the foods having the short expiration dates with respect to the current date through the detail food information set in the process of FIGS. 39 to 43 or the RFID tags attached to the foods (S4402), the controller 280 displays icons displaying the searched foods, respectively, on the first region 1510 (S4403).

As shown in FIGS. 45 and 46, the controller 280 may display information 1514 displaying the remaining days until the expiration dates of the foods in the icons.

In other words, the user may visually recognize how many days are remaining until the expiration date of the food corresponding to a current icon from the information 1514 displayed in the icon.

Also, the controller 280 may indirectly guide the user to preferentially consume the foods having the shorter expiration dates corresponding to the icons in S4403.

For that, the remaining days with respect to the icons are prioritized and the icons are aligned and displayed in the first region 1510 based on the order of the priority of the remaining days until to the expiration dates.

The controller 280 figures out the priority order of the remaining days until the expiration dates with respect to the icons in S4403 and it aligns and display the icons according to the priority order in the first region 1510.

When one of the icons displayed on the first region 1510 is selected, the controller 280 may display the detail information such as the kind of the food set to the icon, the remaining days to the expiration date of the food and the storage position of the food on the recipe providing screen 500.

Meanwhile, when at least one icon is selected on the first region 1510 (S4404), the controller 280 may search at least one recipe including the food corresponding to the selected icon through the recipe information provided in the memory 250 (S4405) and it may display the searched recipe information on the third region 1530 (S4406).

In other words, as shown in FIG. 45 (*a*), the controller 280 searches recipe information tips 1531 and 1532 including "Meat" foods dragged and dropped through the memory 250, when "Meat" icon 1511 of the first region 1510 is dragged and dropped to the second region 1520, and it displays the searched tips 1531 and 1532 on the third region 1530.

As shown in FIG. 45 (*b*), "Cucumber" icon 1512 and "Shrimp" icon 1513 may be additionally dragged and dropped in the second region 1520 in the state of "Meat" icon 1511 dragged and dropped in the second region 1520.

In this instance, the recipe information tips 1531, 1532 and 1533 including "Meat" and "Shrimp" of the memory 250 are displayed on the third region 1530.

In other words, the controller 280 searches recipe information related to the foods corresponding to the selected icons in real-time, whenever the icons of the first region 1510 are selected in real-time. The real-time searched recipe information is updated in the third region 1530.

When the icons in the first region 1510 are dragged and dropped in the cooking-container-shaped second region 1520, the controller 280 generates a graphic effect providing simulation of filling and mixing the foods corresponding to the icons in the cooking container 1520 of the second region 1520 to provide reality of cooking to the user.

Also, when the icons are dragged and dropped in the second region 1520, the controller 280 detects storage positions of the foods corresponding to the dragged and dropped icons in the refrigerator.

As shown in FIG. 46, an information tip 1551 displaying the detected storage position may be displayed.

Also, the controller 280 may output the detected storage positions of the foods via the audio output module 242 as a sound.

Meanwhile, the controller 280 may indirectly guide the user to preferentially consume the foods having the short expiration dates when he or she searches the recipe information including the foods corresponding to the icons in S4405.

For that, recipe information tips having the foods having the shorter expiration dates as main materials may be preferentially searched and displayed.

Also, the controller 280 may preferentially search and display recipe information tips related to the preset recipe information preferred by the user, when searching the recipe information tips including the foods in S4405.

Unless the recipe information having the foods is provided in the memory 250 in S4405, the controller 280 is linked to an external recipe providing server or website via the wireless communication part 210.

The controller 280 searches recipe information tips having the foods on the recipe providing server or website and it downloads the searched recipe information tips in the memory 250. After that, the controller 280 may display the downloaded information on the third region 1530.

Meanwhile, the recipe information tips 1531, 1532 and 1533 may be displayed as icons combined with titles and images of the foods.

When one of the recipe information tips 1531, 1532 and 1533 displayed on the first region 1530 is selected (S4407), details of the recipe information and a cooking process according to the recipe are displayed (S4408).

At this time, the cooking process may be displayed as a text, an image, a moving picture and an animation.

When a specific recipe information tip is selected in S4407, the controller 280 searches additional cooking materials on the foods having the short expiration dates, rather than the foods included in the recipe information.

Hence, the additionally searched foods may be displayed.

The controller 280 may display icons displaying the additionally searched foods, differentiated from the other icons.

When the door 101b of the refrigerator is open in the state of the specific recipe information being selected in S4407, the controller 280 controls lightings of the chambers where the actual foods are stored to be distinguished from lightings of the other chambers.

For example, the lightings of the compartments where the actual foods are stored may be relatively bright and the lightings of the other chambers are less bright to distinguish the former from the latter.

The first embodiment related to the food information and recipe providing according to the invention is described above in reference to FIGS. 44 to 46.

In reference to FIGS. 47 to 49, a second embodiment related to food information and recipe providing according to the invention will be described in detail as follows.

Figure 47:
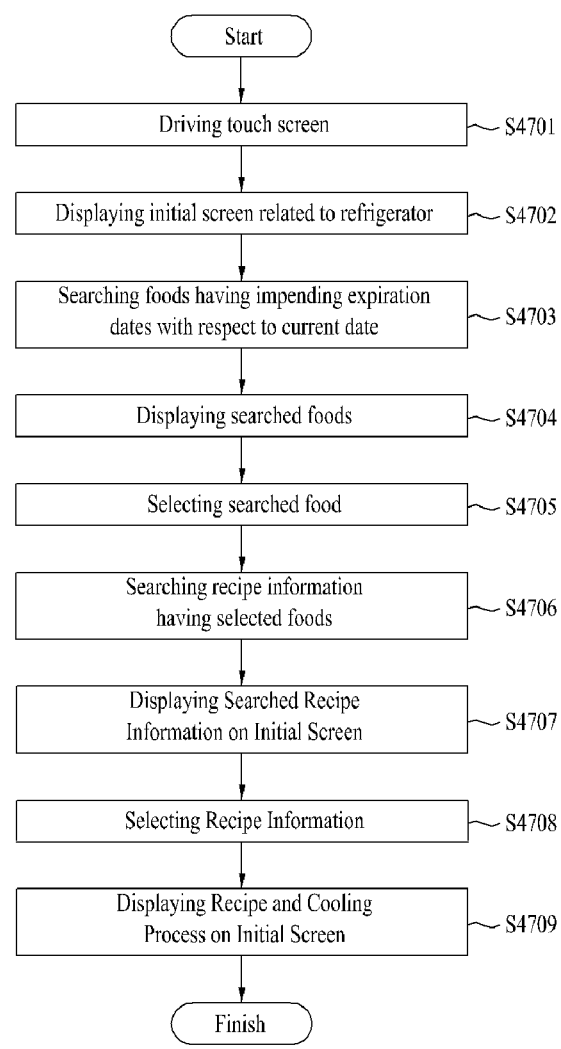
FIG. 47 is a flow chart illustrating a second embodiment of a process providing food recipe information on the foods having the short expiration date.

FIG. 47 is a flow chart illustrating the second embodiment of a process providing the recipe information of the foods having the short expiration dates according to the invention.

Figure 49:
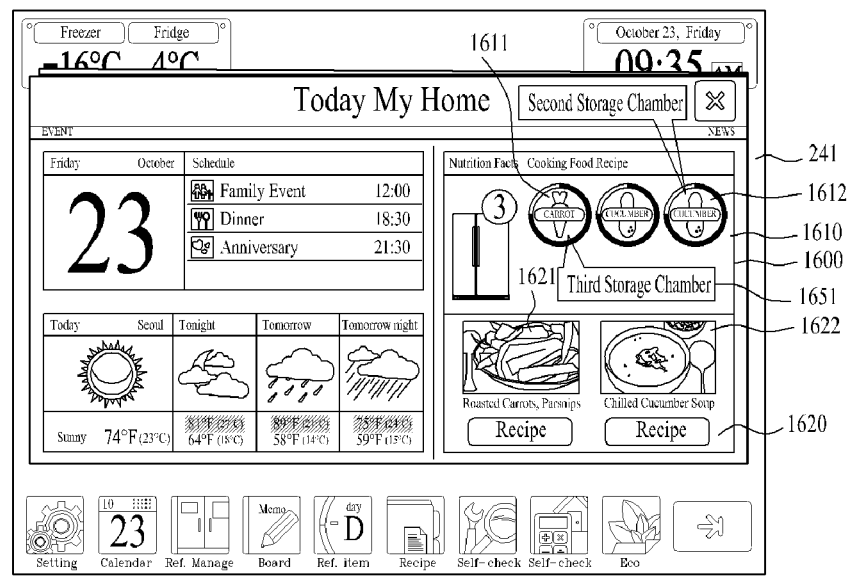

FIGS. 48 and 49 are screen state diagrams illustrating the second embodiment of the process providing the recipe information of the foods having the short expiration dates according to the invention.

In reference to FIGS. 47 to 49, the second embodiment will be described as follows.

As shown in FIG. 48, once the display module 241 is driven (S4701), the controller 280 displays an initial screen displaying a widget information including a current time, a current weather, a current state of the refrigerator and schedules of family members on the display module 241 (S4702).

Foods having the shortest expiration dates with respect to the current date are searched out of the food detail information set to the process shown in FIGS. 39 to 43 or RFID tags attached to the foods (S4703).

The reference with respect to the short expiration date in S4703 may be set or changeable by the user.

For example, when the user sets 3 days as the reference with respect to the short expiration date, the controller 280 searches the foods having 3 or less expiration days with respect to the current date out of the food detail information set to the process shown in FIGS. 39 to 43 or the RFID tags attached to the foods.

Meanwhile, as shown in FIGS. 48 and 49, the recipe providing screen 1600 of S4402 displayed on the initial screen of S4703 may be divided into several regions.

More specifically, the recipe providing screen 1600 includes a first region 1610 displaying icons of the foods having the short expiration dates searched by the controller 280, a second region 1520 to which the food icons are dragged and dropped and a third region 1530 displaying recipe information having the foods dragged and dropped to the second region 1620.

Once searching the foods having the short expiration dates with respect to the current date through the detail food information set in the process of FIGS. 39 to 43 or the RFID tags attached to the foods (S4703), the controller 280 displays icons displaying the searched foods, respectively, on the first region 1510 (S4704).

As shown in FIGS. 48 and 49, the controller 280 may display information 1614 displaying the remaining days until the expiration dates of the foods in the icons.

In other words, the user may visually recognize how many days are remaining until the expiration date of the food corresponding to a current icon from the information 1614 displayed in the icon.

To guide the user to preferentially consume the foods having the shorter expiration dates corresponding to the icons out of the icons in S4704, the controller 280 may prioritize the remaining days with respect to the icons Also, the controller 280 may align and display the icons in the first region 1610 based on the order of the priority of the remaining days until to the expiration dates.

The controller 280 figures out the priority order of the remaining days until the expiration dates with respect to the icons in S4704 and it aligns and display the icons according to the priority order in the first region 1610.

Meanwhile, once at least one icon is selected in the first region 1610, the controller 280 may search at least one recipe information tip having the food corresponding to the selected icon out of the recipe information tips provided in the memory 250 (S4706).

The controller 280 displays the searched recipe information tips in the second region 1610 (S4707).

In other words, as shown in FIG. 48 (*a*), the user selects "Carrot" icon 1611 and "Cucumber" icon 1612 in the first region 1610 and then the controller 280 searches recipe information tips 1621 and 1622 having the selected "Carrot" and "Cucumber" foods in the memory 250.

As shown in FIG. 48 (*b*), the controller 280 displays the searched recipe information tips 1621 and 1620 in the second region 1620.

At this time, when the Carrot" icon 1611 and the "Cucumber" icon 1612 are touched or dragged and dropped to the second region 1620, the controller 280 may search recipe information tips 1621 and 1622 having the "Carrot" and "Cucumber" foods through the memory 250 and it may display the searched information tips in the second region 1620.

Although not shown in FIGS. 47 to 49, the controller may display recipe information tips in the second region 1620 without the selection process of the icons displayed in the first region 1610.

In other words, the controller 280 searches foods having the shorter expiration dates with respect to the current date and displays the icons corresponding to the searched foods in the first region 1610. The controller 280 directly displays the recipe information tips having the foods searched through the memory 250 in the second region 1620.

Meanwhile, once the icons 1611 and 1612 are selected, the controller 280 detects refrigerator storage positions of the foods corresponding to the selected icons. After that, as shown in FIG. 49, the controller 280 displays an information tip 1651 displaying the detected storage position.

Also, the controller 280 may output the detected storage positions of the foods via the audio output module 242 as a sound.

Meanwhile, the controller 280 may indirectly guide the user to preferentially consume the foods having the short expiration dates when he or she searches the recipe information including the foods corresponding to the icons in S4706.

For that, recipe information tips having the foods having the shorter expiration dates as main materials may be preferentially searched and displayed.

Also, the controller 280 may preferentially search and display recipe information tips related to the preset recipe information preferred by the user, when searching the recipe information tips including the foods in S4706.

Unless the recipe information having the foods is provided in the memory 250 in S4706, the controller 280 is linked to an external recipe providing server or website via the wireless communication part 210.

The controller 280 searches recipe information tips having the foods on the recipe providing server or website and it downloads the searched recipe information tips in the memory 250. After that, the controller 280 may display the downloaded information on the second region 1620.

Meanwhile, the recipe information tips 1621 and 1622 may be displayed as icons combined with titles and images of the foods.

When one of the recipe information tips 1621 and 1622 displayed on the second region 1620 is selected (S4708), details of the recipe information and a cooking process according to the recipe are displayed (S4709).

At this time, the cooking process may be displayed as a text, an image, a moving picture and an animation.

When a specific recipe information tip is selected in S4708, the controller 280 searches additional cooking materials on the foods having the short expiration dates, rather than the foods included in the recipe information.

Hence, the additionally searched foods may be displayed.

The controller 280 may display icons displaying the additionally searched foods, differentiated from the other icons.

When the door 101*b* of the refrigerator is open in the state of the specific recipe information being selected in S4708, the controller 280 enables the user to figure out the positions of the chambers where actual foods related to the selected recipe are stored in the refrigerator 100 easily.

For that, the controller 280 controls lightings of the chambers where the actual foods are stored to be distinguished from lightings of the other chambers.

For example, the lightings of the compartments where the actual foods are stored may be relatively bright and the lightings of the other chambers are less bright to distinguish the former from the latter.

The first embodiment related to the food information and recipe providing according to the invention is described above in reference to FIGS. 47 to 49.

An embodiment related to information management having the food storage position information will be described as follows.

Figure 50:
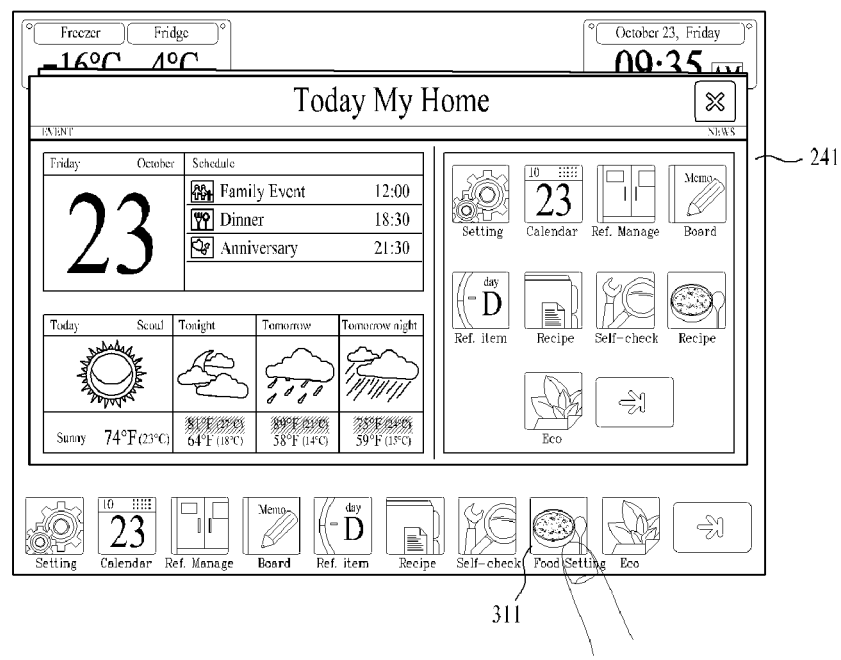
FIG. 50 is a screen state diagram illustrating a display screen of information related to the refrigerator that is displayed on the terminal of the refrigerator according to the invention.

In reference to FIG. 50, on an initial screen (or a standby screen) of the terminal 200 may be displayed widget information displaying a current date, schedules of family members and a current weather.

Also, on the initial screen may be displayed a plurality of menu icons used for operating various functions of the refrigerator 100.

When the user selects a corresponding menu icon from a user input part 230 or a touch screen type display module 241, a menu screen related to the icon is displayed on a touch screen.

An icon displaying the kind of the corresponding food may be displayed on an inner space shaped image of the refrigerator having at least one compartment in the initial screen.

An imaginary food setting menu 311 may be further provided to imaginarily arrange the corresponding food in the compartment in the refrigerator inner space.

The imaginary setting menu 311 is connected with an expiration date setting menu (not shown) enabling the user to set an expiration date and details of the food corresponding to the icon displaying the kind of each food and an inner space shaped image (not shown) of the refrigerator having icons set via the expiration date setting menu connected thereto.

Accordingly, the corresponding food may form the imaginary food setting menu that can be virtually arranged in the inner compartment of the refrigerator.

In reference to FIGS. 51 to 55 there will be described in detail a process of setting the kind and the expiration date of the food to various icons by selecting the expiration date setting menu according to the invention before initially storing foods in the actual inner compartment of the refrigerator as follows.

Figure 51:
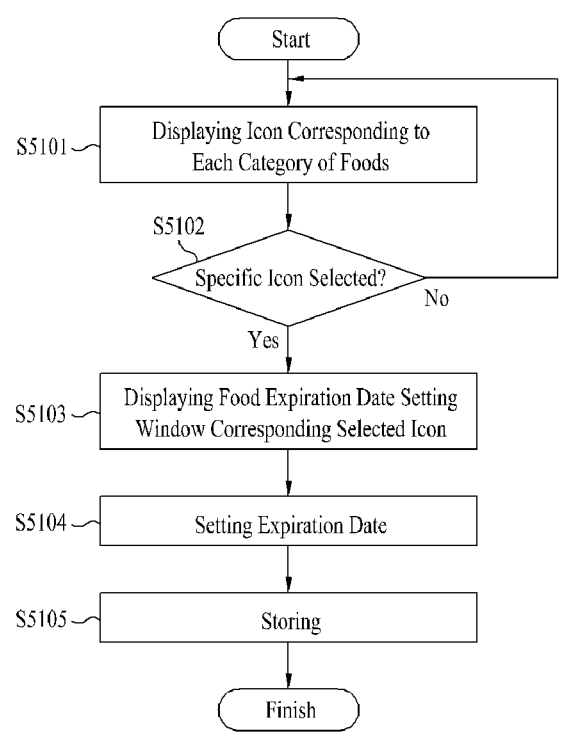
FIG. 51 is a flow chart illustrating a process of setting the expiration dates to icons referring to the types of the foods.

FIG. 51 is a flow chart illustrating a process of setting expiration dates to icons displaying the kinds of foods according to the invention.

Figure 52:
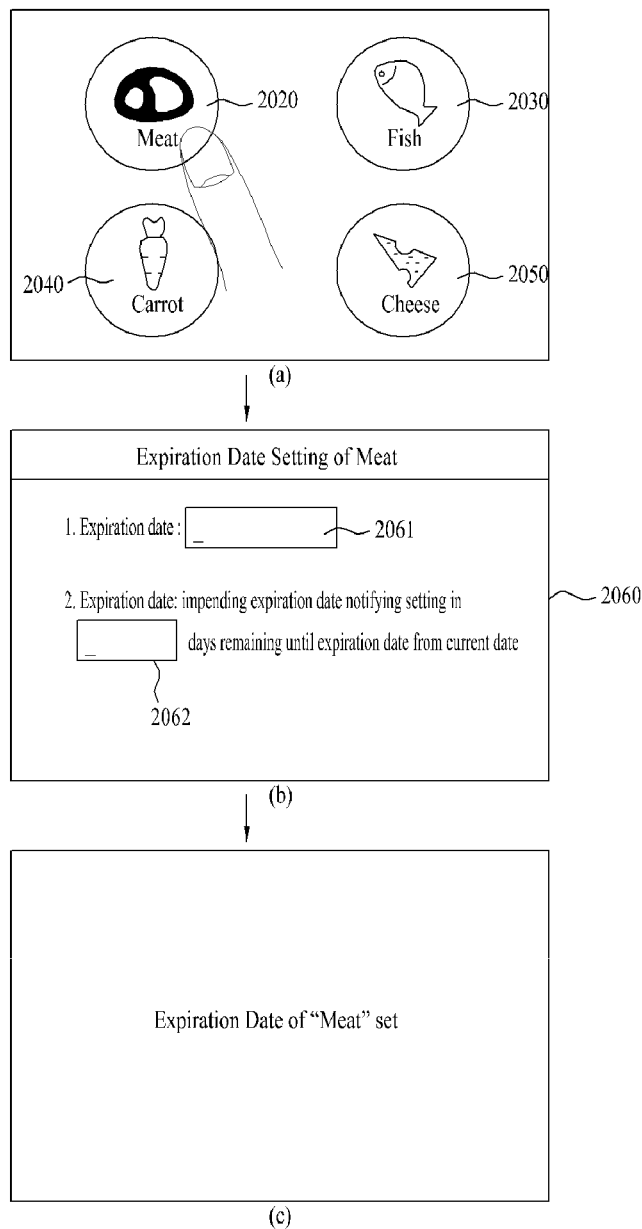
FIG. 52 is a screen state diagram illustrating the process of setting the expiration dates to the icons representing the kinds of the foods.

FIG. 52 is a screen state diagram illustrating the process of setting the expiration dates to the icons displaying the kinds of the foods according to the invention.

Figure 53:
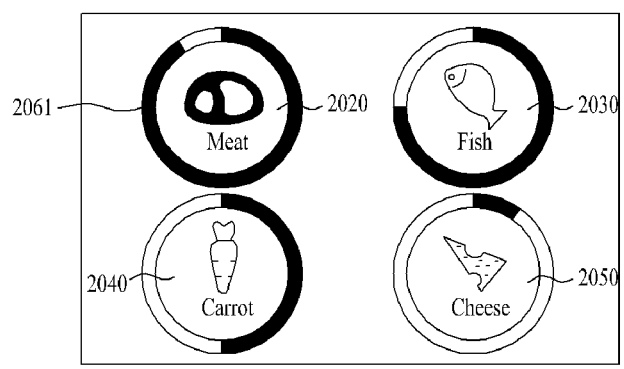
FIGS. 53 to 55 are screen state diagrams illustrating a process of displaying expiration data information to the icons representing the kinds of the foods.
Figure 54:
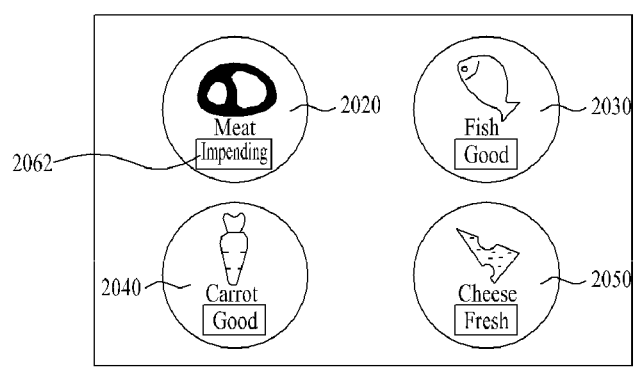
Figure 55:
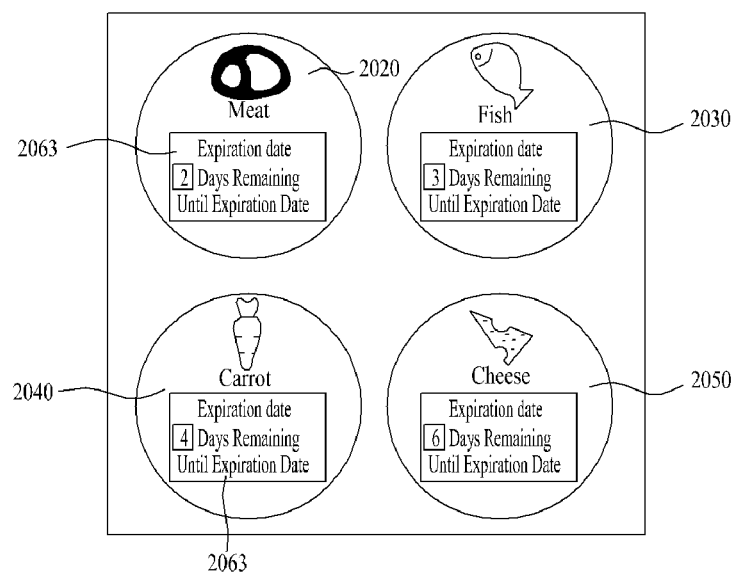

FIGS. 53 to 55 are screen state diagrams illustrating a process of displaying expiration date information on the icons displaying the kinds of the foods.

In reference to FIGS. 51 to 55, the controller 280 provided in the terminal 200 for the refrigerator displays a list of icons displaying the kinds of foods, respectively, provided in the memory 250 on a screen of the display module 241 (S5101).

The icons may have shapes identical or similar to the shapes of the foods. Names of the foods may be displayed in or near the icons, respectively.

The icons may be acquired by download on a web via the wireless communication part 210 or defaulted in the memory 250. Or the icons may be acquired from an external device via the interface part 250.

Hence, at least one specific icon is selected out of the icons (S1502) and then the controller 280 displays a window for setting the expiration date of the food corresponding to the icon (S5103).

When the expiration date of the food corresponding to the icon is set via the setting window (S5104), the controller 280 maps the expiration date information set to the selected icon to store the mapped information in the memory 250 (S5105).

In other words, the user operates the terminal 200 for the refrigerator according to the invention before storing the purchased foods in food compartments in the refrigerator, to display the icons corresponding to the foods. After that, the user sets the expiration date to each of the icons corresponding to the purchased foods.

At this time, the expiration dates of the corresponding food may be set in the icons, respectively. Although not shown in FIG. 51, detail information such as the price and the purchase place of the food corresponding to the icons may be additionally set to the icons.

Also, the icons and the storage chambers of the refrigerator 100 may be relatively mapped to each other based on the corresponding food.

For example, FIG. 52 (a) illustrates that on the display module 241 screen are displayed a first icon 2020 displaying "Meat" category, a second icon 2030 displaying "Fish" category, a third icon 2040 displaying "Carrot" category and a fourth icon 2050 displaying "Cheese" category.

Of course, the types of the icons and the categories of foods are not limited thereto.

Once the first icon 2020 is selected out of the icons 2020, 2030, 2040 and 2050 via the user input part 230 or the display module 241, the controller displays an expiration date setting window 2060 for the foods in "Meat" category corresponding to the first icon 2020 on the screen.

The setting window 2060 may consist of an expiration date input window 2061 for the "Meat" category foods and a notifying the impending expiration date input window 2062.

When the expiration dates of "Meat" category foods are set via the setting window 2060, the controller 280 maps the expiration date information to the first icon 2020 and stores the mapped information in the memory 250 as shown in FIG. 52 (c).

At this time, the expiration date information set to the first icon 2020 may be displayed as shown in FIGS. 53 to 55 as follows.

In other words, when the expiration dates are set to the icons 2020, 2030, 2040 and 2050 through the process of FIGS. 51 and 52, the controller 280 may display the impending expiration date of the corresponding food at outer circumferential surfaces of the icons 2020, 2030, 2040 and 2050 as a gage as shown in FIG. 53.

For example, in FIGS. 51 and 52, the expiration date is set to the first icon 2020 as "2010. 01. 30" and the expiration date is set in the second icon 2030 as "2010. 02. 05". Also, the expiration date is set to the third icon 2040 as "2010. 02. 10" and the expiration date is set to the fourth icon 2050 as "2010. 02. 15". The impending expiration date notifying day is set as "5 days".

As shown in FIG. 53, when the current date is "2010. 01. 20", the controller 280 controls fill-up states of the gages 2061 at the outer circumferential surfaces of the icons 2020, 2030, 2040 and 2050 in the order of shorter expiration dates with respect to the date of "2010. 01. 25" that is the day after "5 days" of the impending expiration date notifying day from the current date.

As shown in FIG. 54, the controller 280 may display information displaying expiration date states such as "Impending", "Good" and "Fresh" in the icons 20, 30, 40 and 50 in the order of the shorter expiration dates with respect to "2010. 01. 25" that is after "5 days" of the impending expiration date notifying day from the current date.

Also, as shown in FIG. 55, the controller 280 may display information 2063 displaying the remaining days to each of the expiration dates in each of the icons 2020, 2030, 2040 and 2050 with respect to "2010. 01. 25" that is after "5 days" of the impending expiration date notifying day.

In reference to FIGS. 51 to 55 is described a process of setting the categories and the expiration dates of the foods corresponding to various icons according to the expiration date setting menu as mentioned above.

In reference to FIGS. 56 to 67 will be described in detail a process of virtually arranging corresponding foods in compartments in the refrigerator after the user arranging the imaginary food setting menu and arranging icons set according to the expiration date setting menu in an inner space image of the refrigerator as follows.

Figure 56:
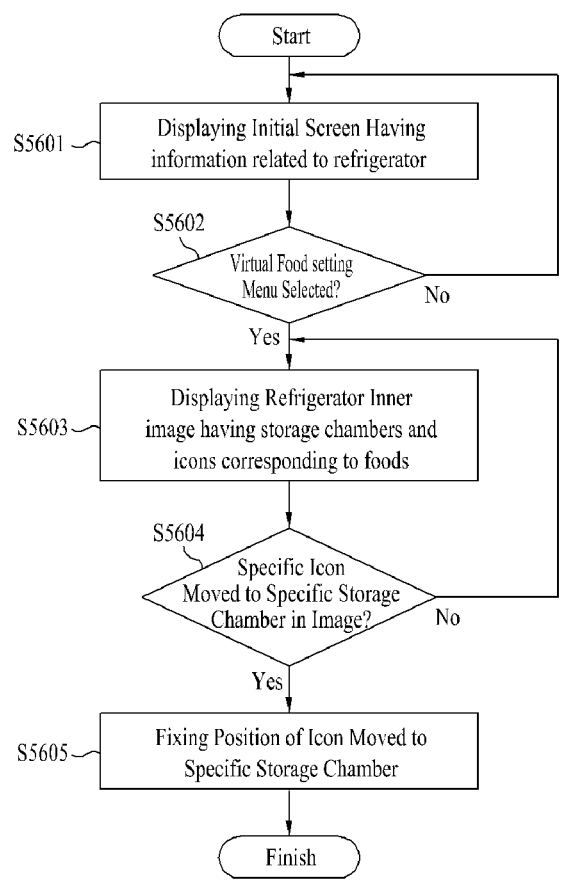
FIG. 56 is a flow chart illustrating a virtual food storage process of the terminal for the refrigerator according to the invention.

FIG. 56 is a flow chart illustrating the imaginary food storage process in the terminal for the refrigerator according to the invention.

FIGS. 57 to 67 are screen state diagrams illustrating the imaginary food storage process in the terminal for the refrigerator according to the invention.

Figure 57:
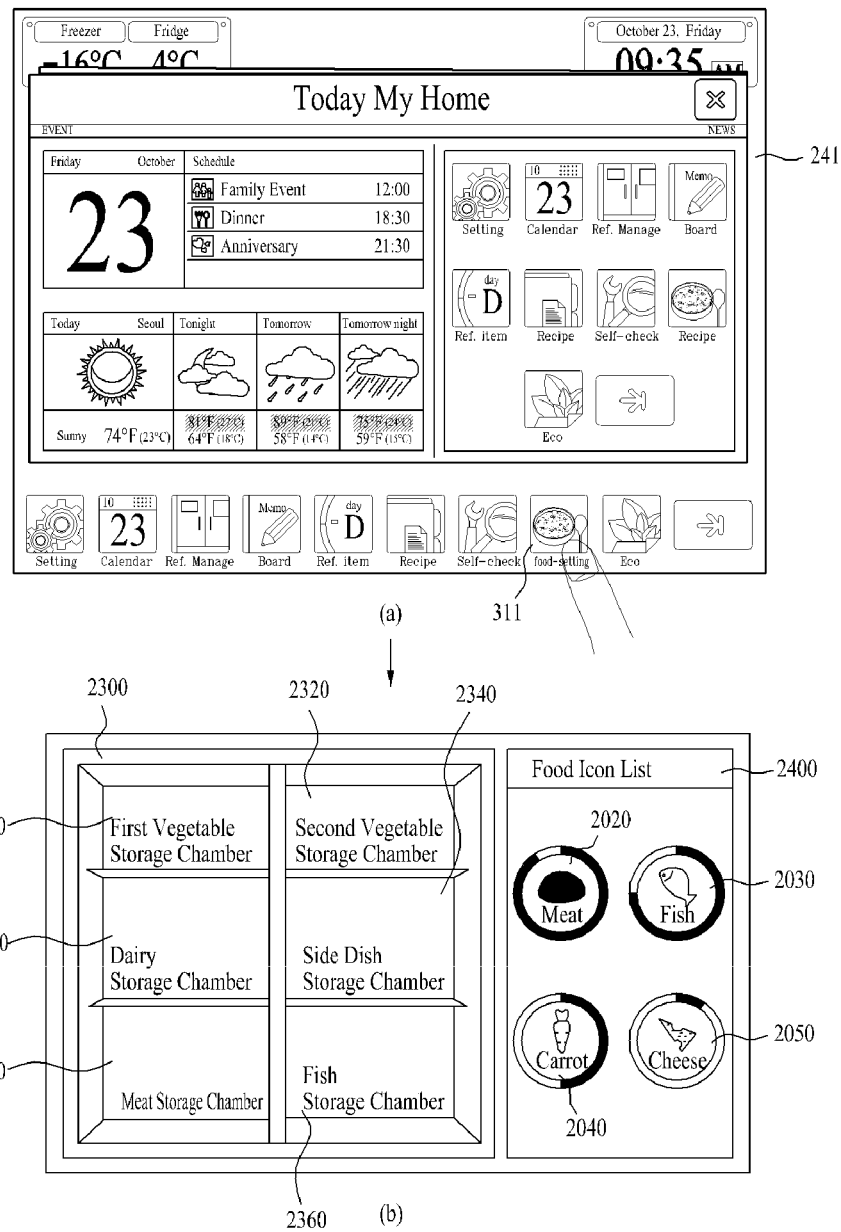

First of all, in reference to FIGS. 56 and 57, the controller displays an initial screen having various information related to the refrigerator 100 on the display module 241 (S5601). When the imaginary food setting menu 11 according to the invention provided in the initial screen is selected (S5602) (see FIG. 57 (a)), the controller 280 displays a refrigerator inner image 300 displaying food storage chambers of the refrigerator 100 that is stored in the memory 250 and a list 400 of icons set by the process of FIGS. 51 to 55 (S5603) (see FIG. 57 (b)).

The refrigerator inner image 2300 may be the same as an actual shape of the inner space of the refrigerator 100 or only the same as shapes of inner storage chambers of the refrigerator 100.

In addition, the icons 2020, 2030, 2040 and 2050 may be displayed to visually distinguish the categories, the remaining days to the expiration dates, the impending states of the expiration dates and details of the corresponding foods from each other in the process of FIGS. 51 to 55.

For example, the categories, the remaining days to the expiration dates, the impending states of the expiration dates and details of the corresponding foods may be displayed in the shapes of the icons 2020, 2030, 2040 and 2050. When the user selects a specific icon is selected, detail information on a selected icon may be further displayed.

Meanwhile, when at least one icon is moved to a region corresponding to a specific storage chamber of the refrigerator inner image 2300 by the user's touch (S5604), the controller 280 may fix the position of the moved icon in the specific storage chamber (S5605).

In other words, the user may set an icon corresponding to the food which he or she will store in the process of FIGS. 51 to 55 mentioned above and the expiration date to the icon.

Hence, the user may arrange the icons in a region corresponding to the storage chamber of the refrigerator inner image 2300.

Accordingly, without opening the refrigerator 100 substantially, the user can recognize which foods are currently stored in the storage chambers of the refrigerator 100 by seeing the refrigerator inner image 2300 displayed on the screen of the terminal 200 for the refrigerator according to the invention.

Meanwhile, once a specific icon is dragged and dropped in a region corresponding to a specific storage chamber by the user, the controller 280 may position the icon in the specific storage chamber, which will be described in reference to FIG. 58.

Figure 58:
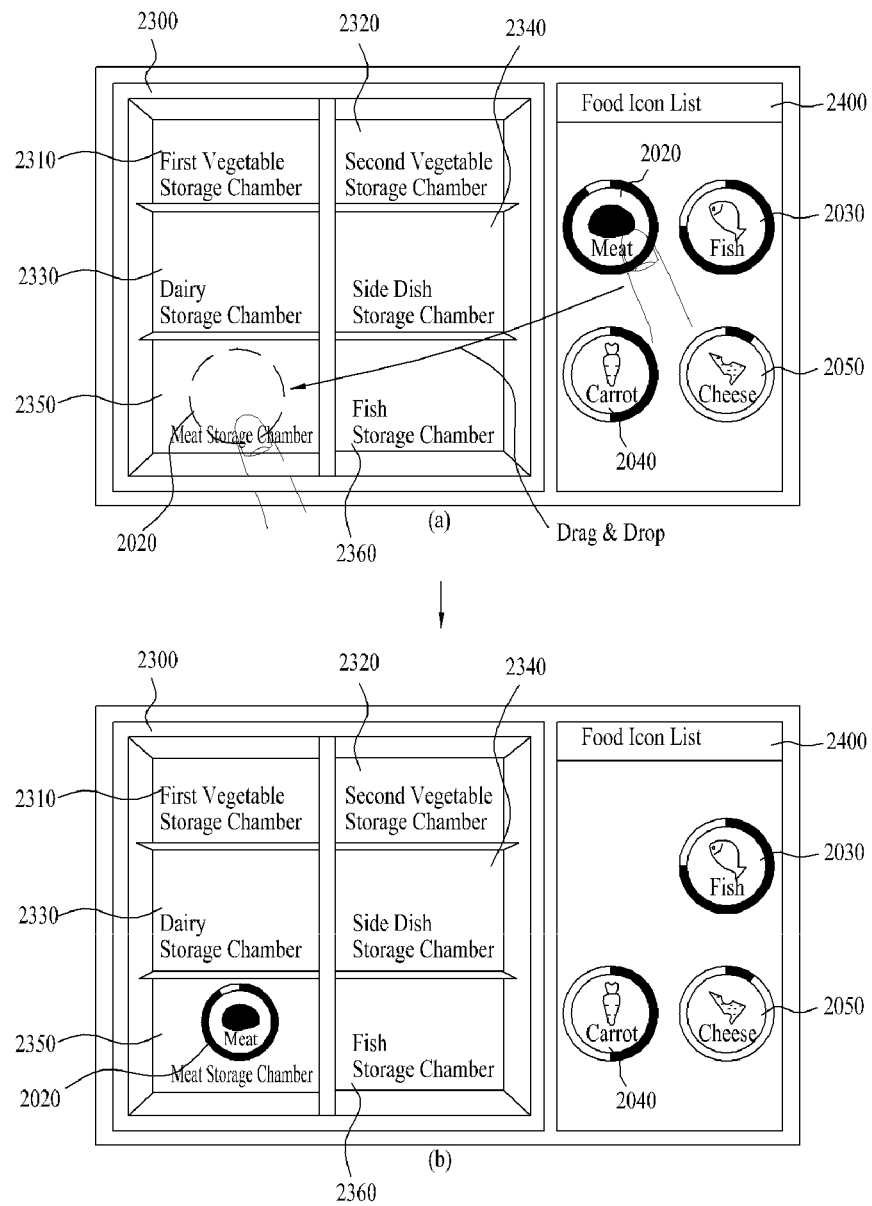

In other words, when the first icon 2020 is dragged and dropped in a meat storage chamber 2350 in the refrigerator inner image 2300 by the user's touch as shown in FIG. 58 (*a*), the controller 280 may fix the position of the dragged and dropped first icon 2020 in the meat storage chamber 2350 as shown in FIG. 58 (*b*).

Figure 59:
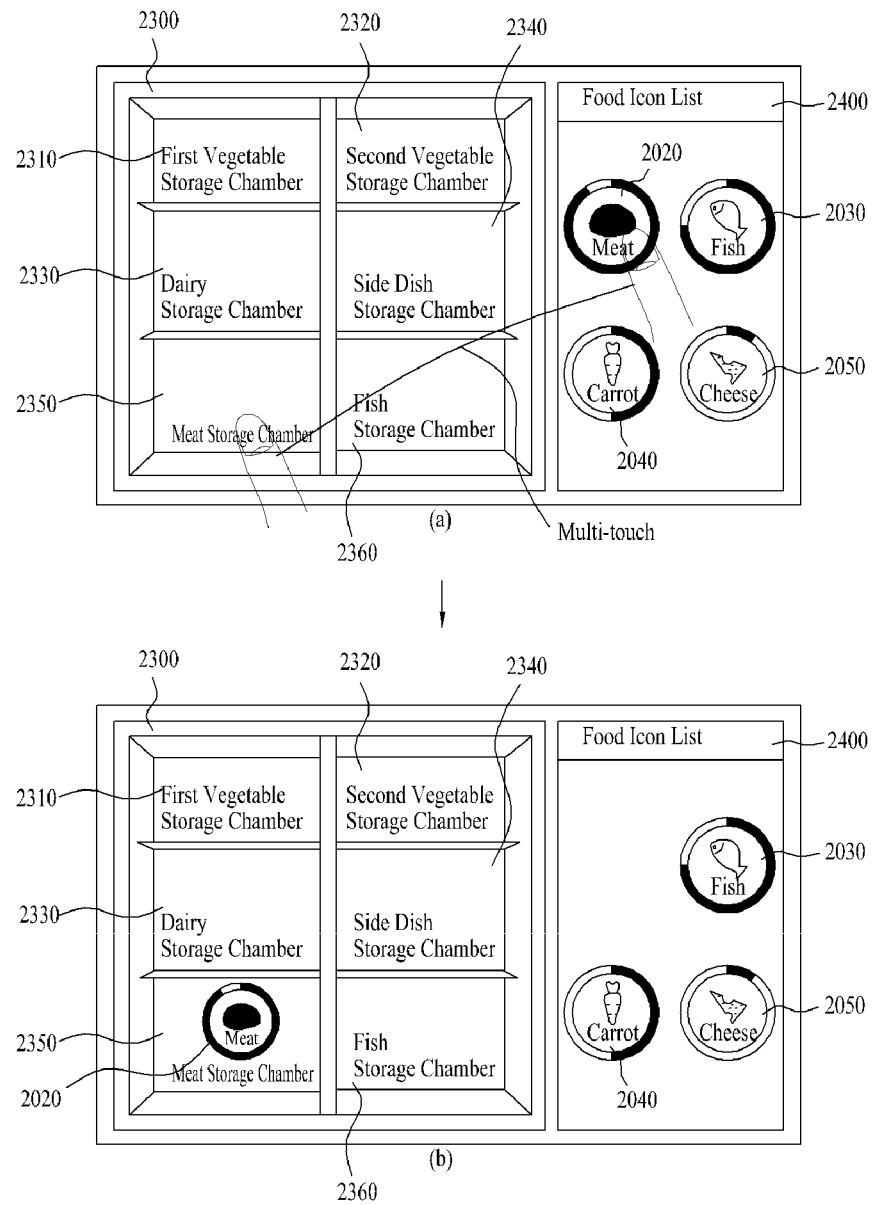

As shown in FIG. 59, when a specific icon and a region corresponding to a specific storage chamber are multi-touched by the user, the controller 280 may position the icon in the specific storage chamber.

When the first icon 2020 is dragged and dropped in the meat storage chamber 2350 in the refrigerator inner image 2300 by the user's touch as shown in FIG. 59 (*a*), the controller 280 may fix the position of the dragged and dropped first icon 2020 in the meat storage chamber 2350 as shown in FIG. 59 (*b*).

Figure 60:
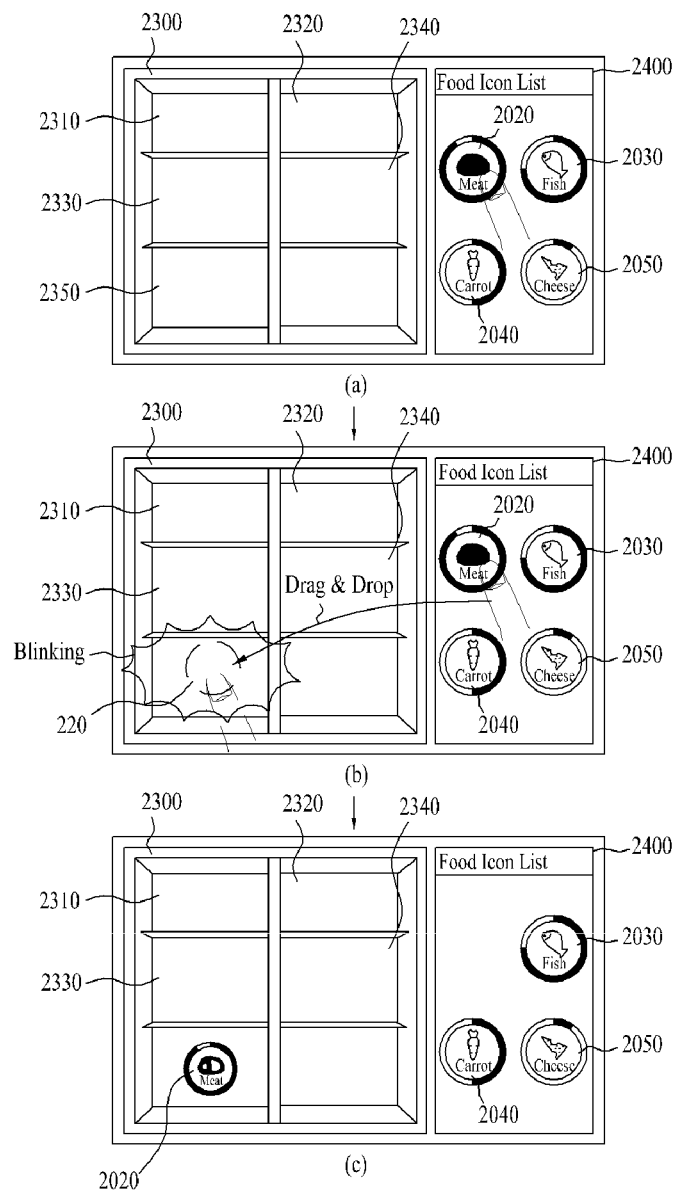
Figure 61:
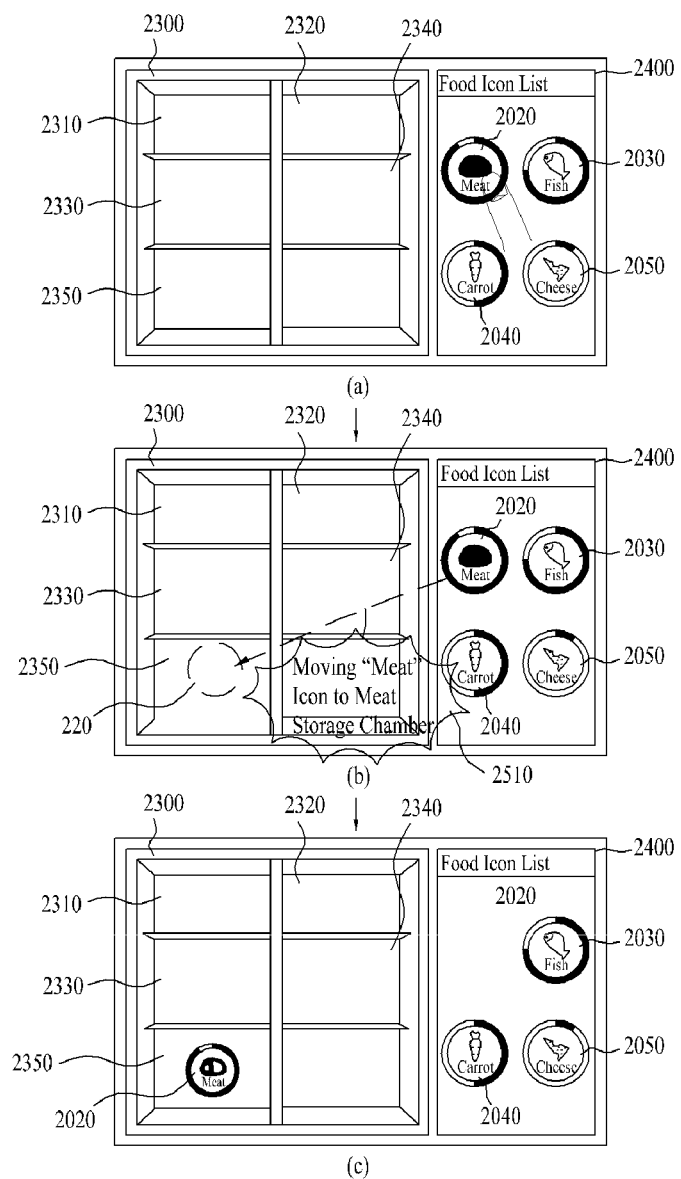

Meanwhile, as shown in FIGS. 60 and 61, storage chambers 2310, 2320, 2330, 2340, 2350 and 2360 in the refrigerator inner image 2300 and the icons 2020, 2030, 2040 and 2050 are relatively mapped to each other based on the corresponding foods.

For example, the first icon 2020 displaying the "Meat" may be mapped to a meat storage chamber 2350.

The second icon 2030 displaying "Fish" may be mapped to a fish storage chamber 2360.

The first icon 2040 displaying "Carrot" may be mapped with one of first and second vegetable storage chambers 2310 and 2320.

The fourth icon 2050 displaying "Cheese" may be mapped to a dairy good storage chamber 2330.

The storage chambers 2310, 2320, 2330, 2340, 2350 and 2360 in the refrigerator inner image 2300 and the icons 2020, 2030, 2040 and 2050 are relatively mapped to each other based on the corresponding foods. When a specific icon is selected on the list 2400 in that state, the controller 280 may distinguishably display the storage chamber mapped with the icon from the storage chambers 2310, 2320, 2330, 2340, 2350 and 2360.

In other words, when the first icon 2020 displaying "Meat" is touched as shown in FIG. 60 (*a*), the controller 280 may distinguishably display a region corresponding to the meat storage chamber 2350 mapped with the first icon 2020 from the other storage chambers 2310, 2320, 2330, 2340 and 2360 as shown in FIG. 60 (*b*).

In other words, the controller 280 may inform the user of an adequate storage chamber for the food corresponding to the icon selected by the user.

FIG. 60 (*b*) shows that the region corresponding to the meat storage chamber 2350 mapped with the first icon 2020 is blinking at preset intervals to distinguish the meat storage chamber 2350 from the other storage chambers 2310, 23020, 2330, 2340 and 2360.

The distinguishing method for the region corresponding to the meat storage chamber 2350 mapped with the first icon 2020 is not limited to the blinking method.

For example, variation of the display size, display color and highlighting of the meat storage chamber 2350 mapped with the first icon 2020 may be used for distinguishably display the meat storage chamber 2350 from the other storage chambers 2310, 2320, 2330, 230 and 2360.

The user may identify that the meat storage chamber 2350 that is the adequate storage chamber of "Meat" corresponding to the selected first icon 2020 is distinguished from the other storage chambers 2310, 2320, 2330, 2340 and 2360.

As shown in FIG. 60 (*c*), the first icon 2020 may be arranged in the meat storage chamber 2350.

When the first icon 2020 corresponding to "Meat" is touched as shown in FIG. 61 (*a*), the controller 280 may display the information 2510 that induces the user to move the first icon 2020 to the meat storage chamber 2350 mapped with the first icon 2020 as shown in FIG. 61 (*b*).

In other words, the controller 280 may inform the user of moving the selected icon to the adequate storage chamber.

The induction information 2510 may display a guide line to be distinguished by the user for inducing him or her to move the first icon 2020 to the meat storage chamber 2350 or words for inducing the first icon 2020 to the meat storage chamber 2350 as shown in FIG. 61 (*b*).

The user may arrange the first icon 2020 in the meat storage chamber 2350, with setting the induction information 2510, as shown in FIG. 61 (*c*).

Figure 62:
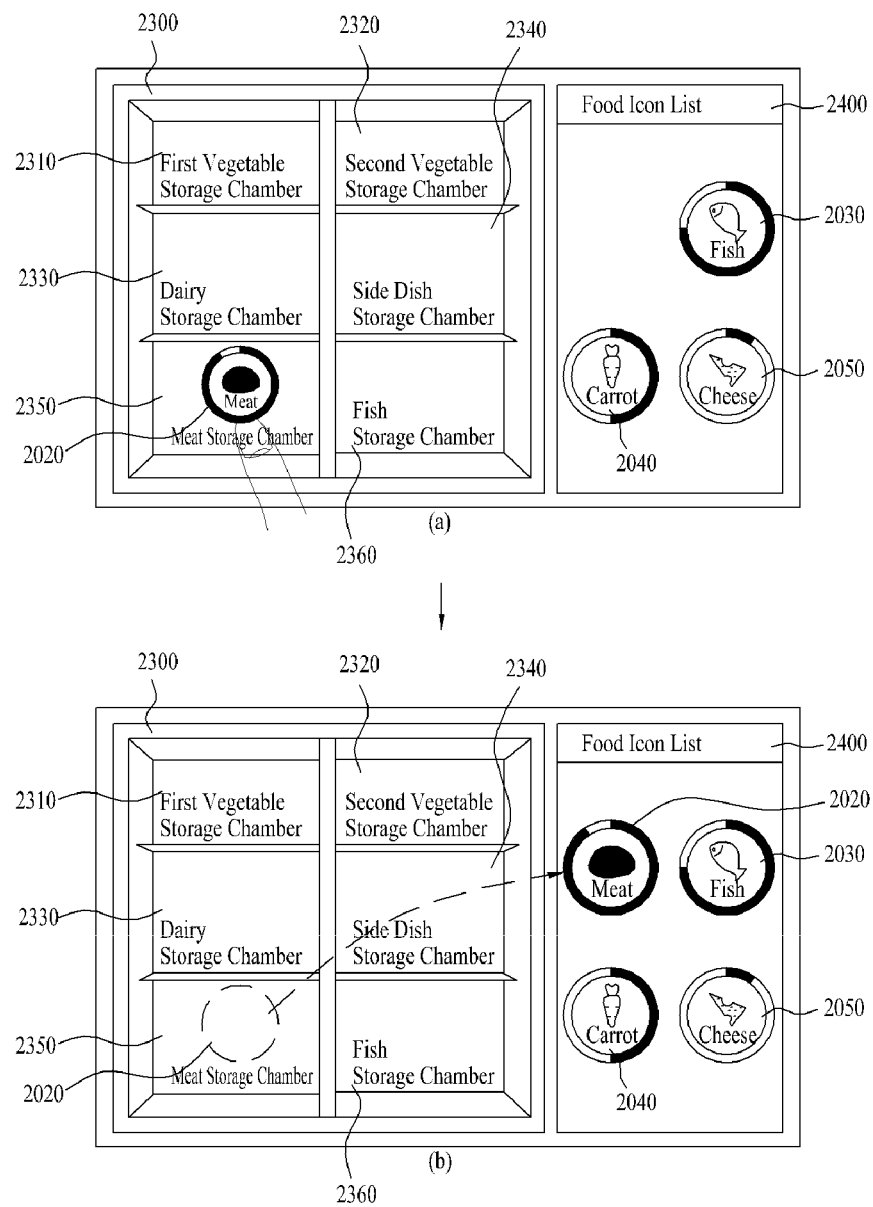

Meanwhile, in reference to FIG. 62 (*a*), when the first icon moved to the corresponding meat storage chamber 2350 is touched in the process of S5605 (see FIG. 56), the controller 280 may release the position of the first icon 2020 fixed in the meat storage chamber 2350 and restitute the first icon 2020 to the initial position on the list 2400 as shown in FIG. 62 (*b*).

Figure 63:
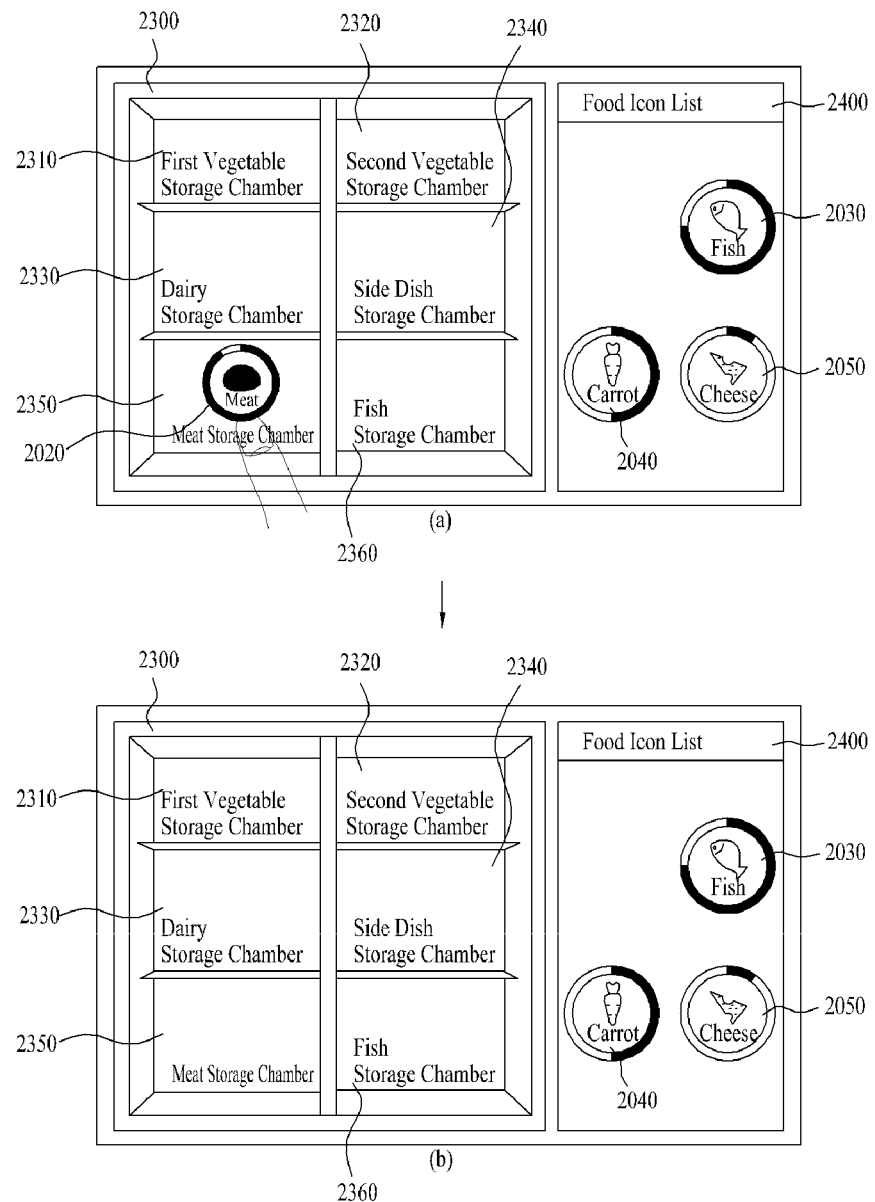

In reference to FIG. 63 (*a*), the first icon 2020 moved to the corresponding meat storage chamber 2350 in the process of S5605 (see FIG. 56) is touched. In this instance, the controller 280 may delete the first icon 2020 positioned in the meat storage chamber 2350 as shown in FIG. 63 (*b*).

Figure 64:
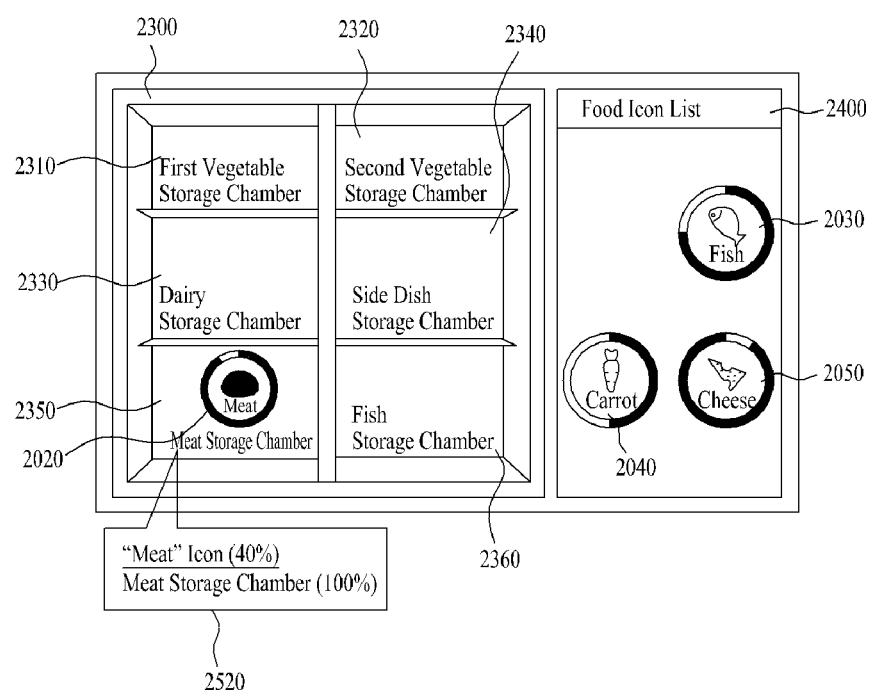

In reference to FIG. 64, the first icon 2020 is moved to the corresponding meat storage chamber 2350 in the process of S5605 (see FIG. 56). In this instance, the controller 280 may calculate a ratio of a display region of the first icon 2020 to a display region of the meat storage chamber 2350 and display information 2520 displaying the calculated ratio.

In other words, such the information 2520 may be provided to the user and the user may simulate how many foods are stored in the imaginary meat storage chamber 2350 currently.

Figure 65:
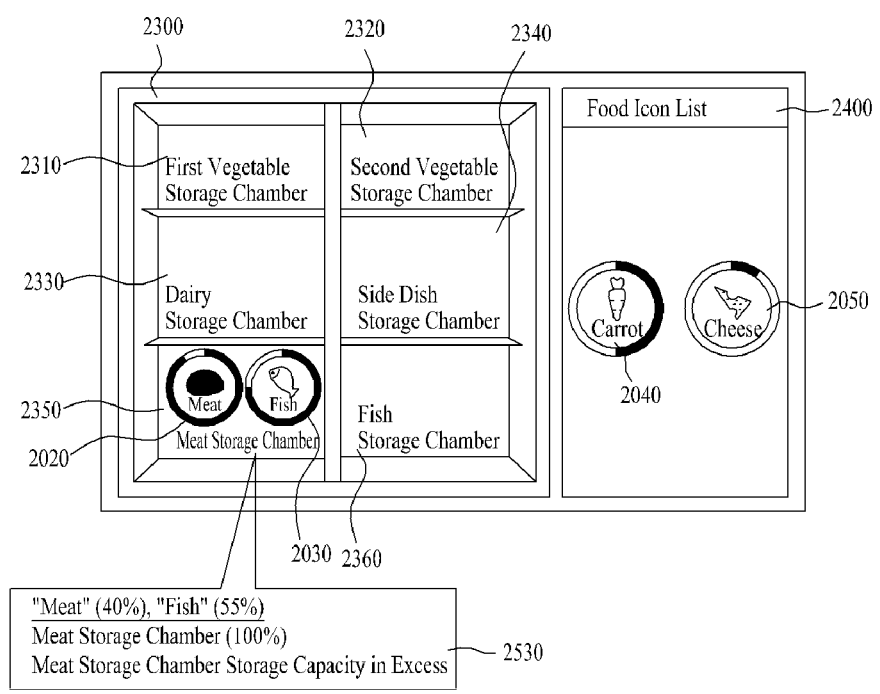

In reference to FIG. 65, the first icon 2020 is moved to the corresponding meat storage chamber 2350 in the process of FIG. 64. When the second icon 2030 is moved to the meat storage chamber 2350 additionally in this state, the controller 280 may calculate a ratio of display regions of the first and second icons 2020 and 2030 to a display region of the meat storage chamber 2350 and display information 2530 displaying the calculated ratio.

At this time, when the first and second icons 2020 and 2030 are out of the display region of the meat storage chamber 2350, the controller 280 may display information 2530 notifying the excess of the adequate storage capacity possessed by the meat storage chamber 2350.

Figure 66:
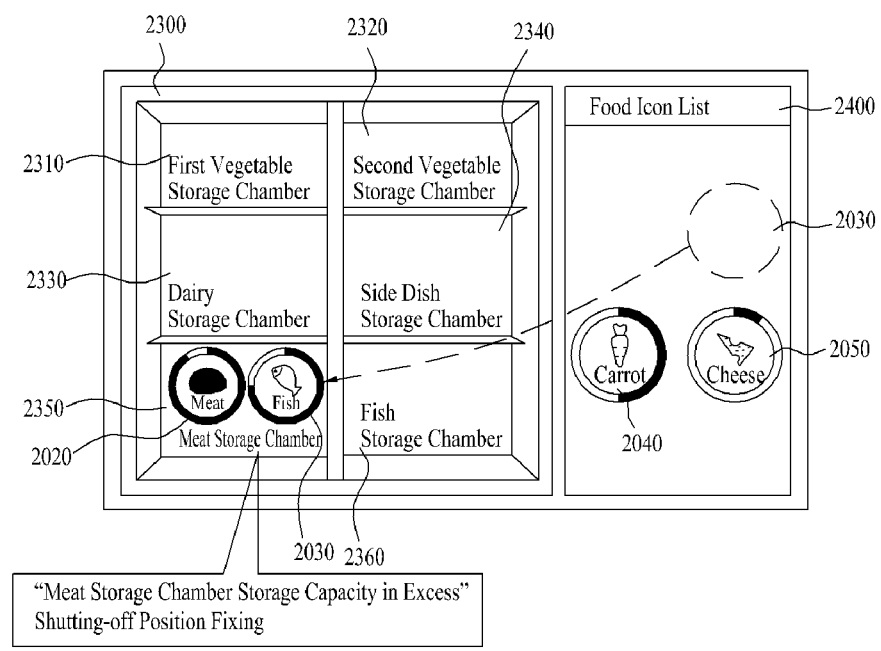

Also, in reference to FIG. 66, the first icon 2020 is moved to the corresponding meat storage chamber 2350 in the process of FIG. 64 and the second icon 2030 is additionally moved to the meat storage chamber 2350 in that state. After that, the controller 280 calculates a ratio of display regions of the first and second icons 2020 and 2030 to a display region of the meat storage chamber 2350.

When the display regions of the first and second icons 2020 and 2030 are out of the display region of the meat storage chamber 2350, the controller 280 may shut off the moving and position fixing of the second icon additionally moved to the meat storage chamber 2350.

Also, in reference to FIG. 67 (a), the first icon 2020 is moved to the corresponding meat storage chamber 2350 in the process of FIG. 64 and the second icon 2030 is additionally moved to the meat storage chamber 2350 in that state. After that, the controller 280 calculates a ratio of display regions of the first and second icons 2020 and 2030 to a display region of the meat storage chamber 2350.

At this time, when the display regions of the first and second icons 2020 and 2030 are out of the display region of the meat storage chamber 2350, the controller 280 determines the fish storage chamber 2360 as an adequate storage chamber of "Fish" corresponding to the second icon 2030 as shown in FIG. 67 (b).

The controller 280 displays information inducing the movement of the second icon 2030 to the fish storage chamber 2360.

Accordingly, the user may move the second icon 2030 to the fish storage chamber 2360.

Although not shown in the drawings, the actual door 101b of the refrigerator 100 is open once the position of the first icon 2020 is fixed in the meat storage chamber 2350. In this instance, the controller 280 may control a lighting of the meat storage chamber 2350 having the first icon 2020 fixed thereto to be distinguished from lightings of the other storage chambers inside the refrigerator 100 that are substantially open.

In other words, even when the user substantially opens the door 101b of the refrigerator 100 in a state of moving the first icon 2020 to the meat storage chamber 2350 in the virtual refrigerator inner image 2300 according to the invention, the position of "Meat" corresponding to the virtual first icon 2020 may be noticed by the user, using the lightings.

Next, an embodiment relating to a process of deleting or restoring contents displayed on a screen by the user's multi-touch.

Figure 68:
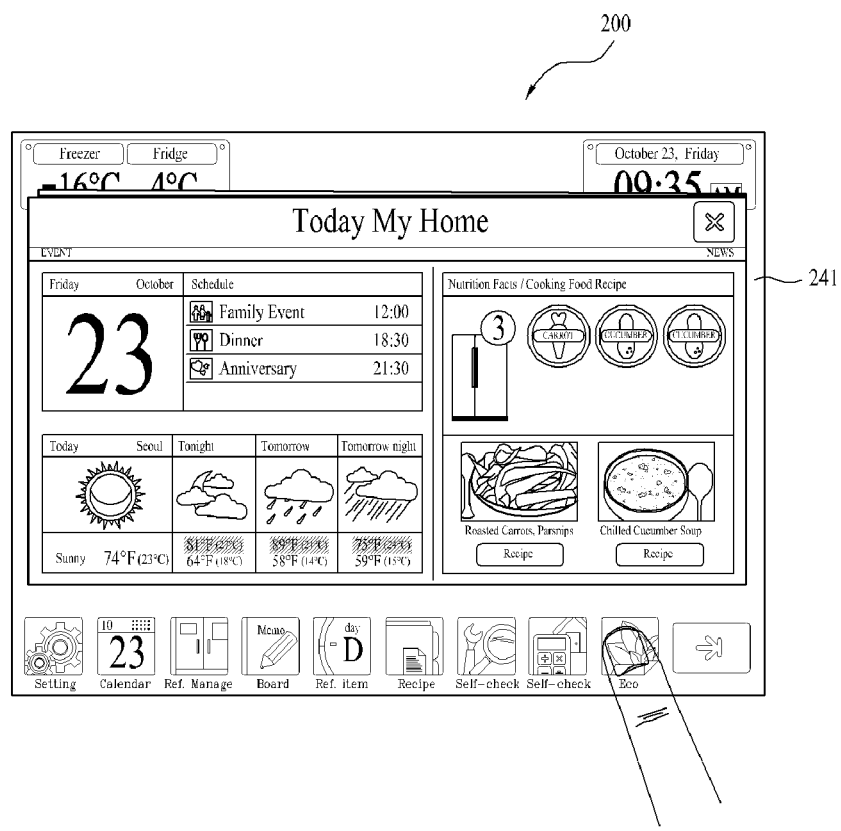
FIG. 68 is a screen state diagram illustrating a display screen displaying information related to the refrigerator that is displayed on the terminal for the refrigerator.
Figure 69:
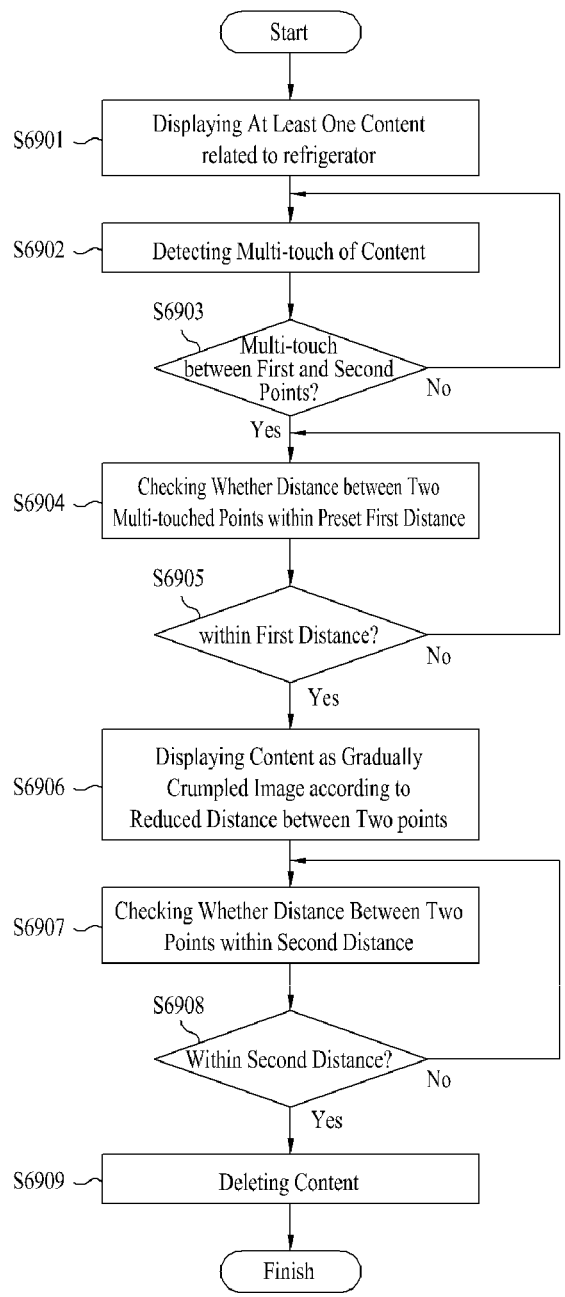
FIG. 69 is a flow chart illustrating a first embodiment of embodiments related to a process of deleting contents displayed on a screen, using multi-touch.

FIG. 68 is a screen state diagram illustrating a screen displaying information related to the refrigerator on the terminal for the refrigerator according to the invention.

In reference to FIG. 68, content information such as a current date, schedules of family members and a current weather may be displayed on an initial screen (or a standby screen) of the terminal 200 for the refrigerator.

Also, on the initial screen may be displayed a plurality of content icons for operating various functions of the refrigerator 100. After that, when the user selects a corresponding content icon via the user input part 230 or the touch screen type display module 241, a screen related to the contents is displayed on the display module 241.

In reference to FIGS. 69 to 78, there will be described in detail a process of deleting or restoring the contents displayed on the screen by the user's multi-touch according to embodiments of the invention as follows.

A first embodiment related to the content deleting and restoring will be as follows.

The first embodiment provides a function of deleting and restoring the contents according to a drawing degree of the fingers, when multi-touch enabled by drawing in the user's fingers is performed on the contents.

In reference to FIGS. 4 to 9, the first embodiment according to the invention will be described in detail as follows.

FIG. 4 is a flow chart of the first embodiment illustrating the process of deleting the contents on the screen by multi-touch according to the invention.

FIGS. 5 to 8 are screen state diagrams of the first embodiment illustrating the process of deleting the contents displayed on the screen by the multi-touch.

FIG. 9 is a screen state diagram of the first embodiment illustrating a process of restoring the deleted contents on the screen.

In reference to FIGS. 69 to 74, the controller 280 of the refrigerator 200 for the refrigerator displays at least one contents related to the refrigerator 100 on the screen of the display module 241 (S6901).

At this time, the contents may be various menu function icons related to the refrigerator 100.

For example, the contents may include current date information, current weather information, current refrigerator temperature state information, refrigerator power consumption information, family member schedule information and impending expiration date food information in the refrigerator 100.

Of course, the kinds of the contents may not be limited thereto.

Hence, the controller 280 detects whether the user's multi-touch is input on a currently displayed contents via the display module 241 (S6902).

When first and second points are multi-touched on the contents by the user based on the result of the detection (S6903), the controller 280 detects whether a distance between the first and second points is reduced within a preset first distance in a state of maintaining the user's multi-touch on the contents (S6904).

When the distance between the first and second points is reduced within the preset first distance (S6905), the controller 280 changes the contents into a gradually crumpled paper image, corresponding to the reduced distance between the first and second points (S6906).

In other words, the controller 280 displays the contents as an image of paper gradually crumpled according to the reduced distance between the two points.

Hence, in the state of displaying the content as the crumpled paper image, the controller re-checks whether the distance between the first and second points maintained by multi-touch on the contents is reduced within a preset second distance that is shorter than the preset first distance (S6907).

When the distance between the first and second points is reduced within the second distance based on the result of the detection (S6908), the controller 280 deletes the crumpled-paper-imaged contents (S6909).

In other words, according to the first embodiment of the invention, the contents may be displayed in the gradually crumpled paper image until the distance between the two multi-touched points is gradually reduced to "0", in the state of the user maintaining the multi-touch on specific contents. When the distance between two multi-touched points reaches "0", the contents may be deleted on the screen.

Figure 70:
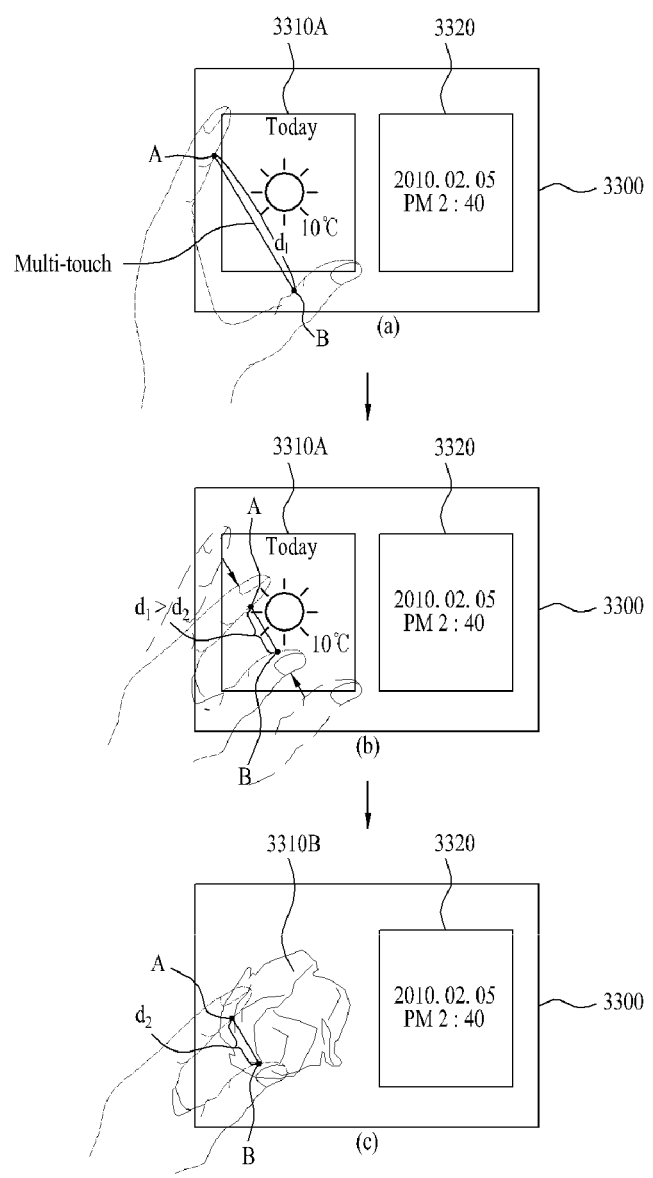
FIGS. 70 to 73 are screen state diagrams illustrating the first embodiment of the embodiments showing the process of deleting the contents displayed on the screen, using multi-touch according to the invention.

For example, FIG. 70 (*a*) illustrates a first content 3310A having information related to the current weather information and a second content 3320 having the current date information that are displayed on a screen 3300 of the display module 241.

Also, FIG. 70 (*a*) illustrates that A and B are multi-touched on the first content 3310A and that a distance between A and B is d1.

When the distance between the multi-touched A and B is reduce from d1 to d2 on the first content 3310 as shown in FIG. 70 (*b*), the controller 280 changes and display the first content 3310A into a first image 3310B of crumpled paper according to the reduced distance between A and B (d1–d2) as shown in FIG. 70 (*c*).

Figure 71:
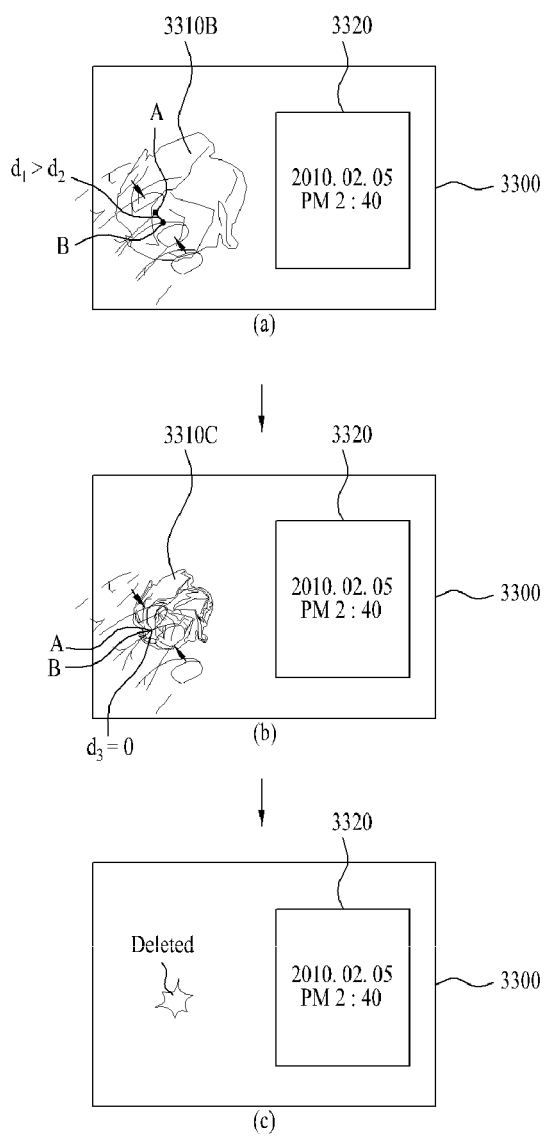

Also, the first content 3310A is changed into the first image 3310B in the process of FIG. 70 (*c*). when the distance between A and B points multi-touch maintained in the first image 3310B is reduced from d2 to d3 as shown in FIG. 71 (*a*) in that state, the controller 280 changes and displays a second image 3310C more crumpled than the first image 3310B according to the reduced distance (d2–d4) between the A and B multi-touch maintained in the first image 3310B.

Also, when the distance between A and B multi-touch maintained in the second image 3310C is reduced to "0" in the state of the second image 3310C changed from the first image 3301B, the controller 280 deletes the first content 3310A changed into the second shape 3310C as shown in FIG. 71 (*c*).

When the distance between multi-touched A and B is increased in the state of changing the first content 3310A into the first image 3310B or the second image 3310C.

Figure 72:
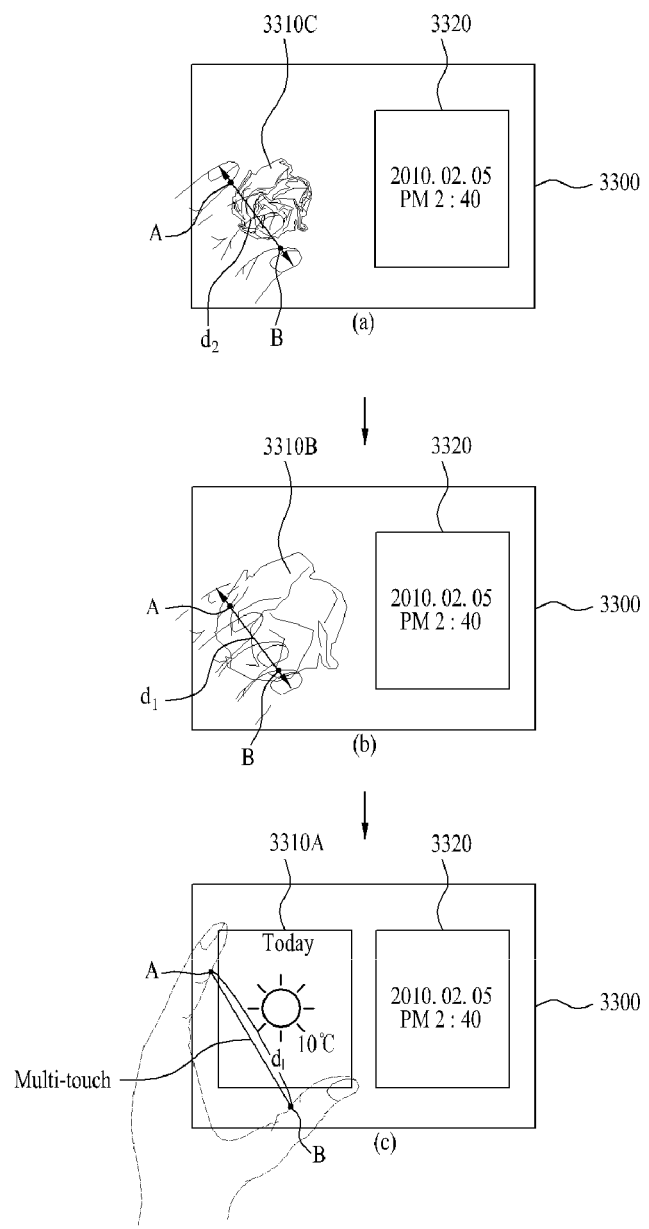

When the distance between the multi-touched A and B is increased in the state of the first content 3310A changed into the first image 3310B or the second image 3310C as shown in FIG. 72, the controller 280 may restore the first image 3310B or the second image 3310C to an initial image of the first content 3310A according to the increased distance between A and B.

In other words, FIG. 72 (*a*) illustrates that the first content 3310A is changed into the second image 3310C by the user's multi-touch, for example.

When the distance between A and B on the second image 3310C is increased from d3 to d2 as shown in FIG. 72 (*a*), the controller 280 restores the second image 3310C to the first image 3310B as shown in FIG. 72 (*b*).

When the distance between A and B on the first image 3310B is increased from d2 to d1 as shown in FIG. 72 (*b*) in the state of restoring the second image 3310C to the first image 3310B, the controller 280 restores the first image 3301B to the initial first content image 3310A as shown in FIG. 72 (*c*).

Figure 73:
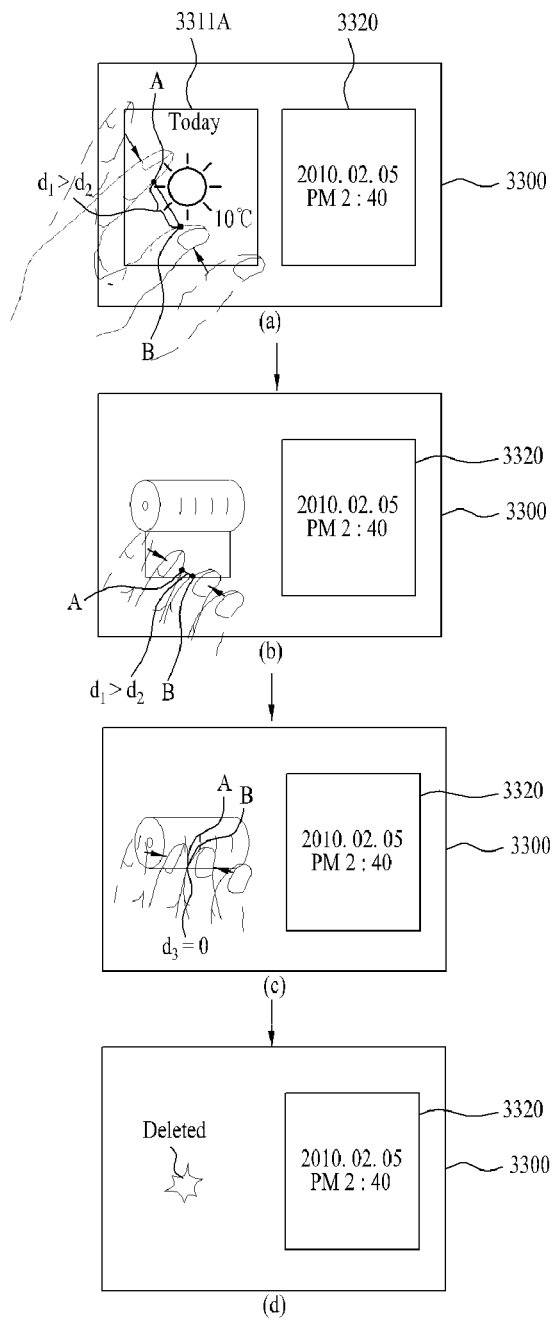

As shown in FIG. 73 the controller 280 may display the first content 3310A not only as the crumpled paper image but also as a roll of paper according to the reduced distance between the two multi-touched points.

Figure 74:
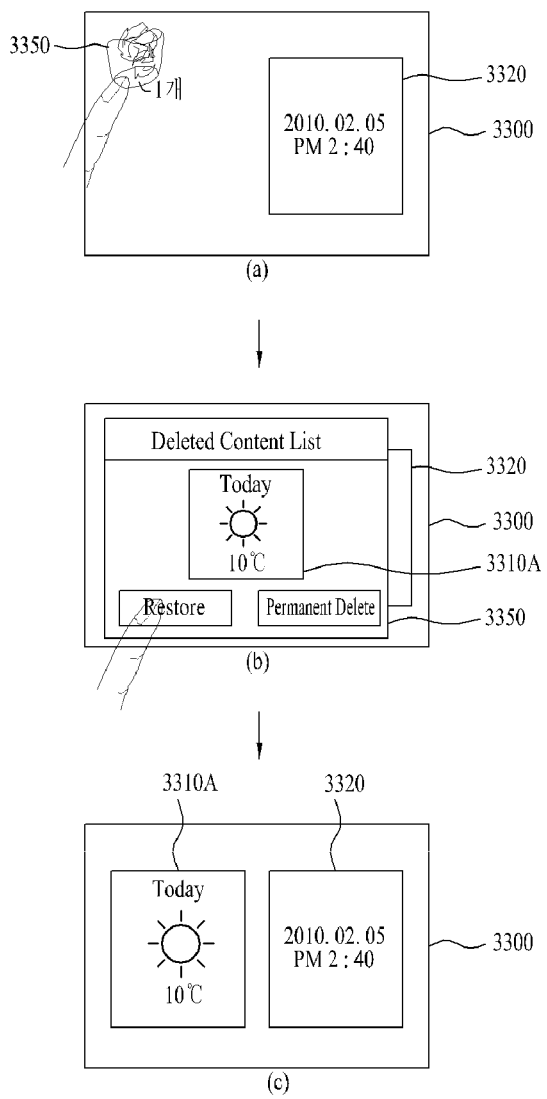
FIG. 74 is a screen state diagram of a first embodiment illustrating a process of restoring deleted contents on a screen.

As shown in FIG. 74, the controller 280 may restore the deleted content on the screen according to the user's multi-touch.

As shown in FIG. 74 (*a*), when the first content 3310A is deleted on the screen 3300 in the process of FIGS. 69 to 73, the controller 280 displays a recycle bin icon 3350 storing the deleted first content 3310A on the screen 3300.

In this instance, when the user selects the recycle bin icon 3350, the controller displays a list of contents stored in the recycle bin icon 3350 as shown in FIG. 74 (*d*).

When a command of restoring the deleted first content 3310A from the list of the contents stored in the recycle bin icon 3350, the controller 280 restores the deleted first content 3310A on the screen 3300 as shown in FIG. 74 (*c*).

In reference to FIGS. 75 and 76, a second embodiment related to the content deleting and restoring will be described as follows.

According to the second embodiment, once multi-touch implemented by the user's drawing in fingers on the content, the content is changed into a crumpled paper image according to a drawing degree of the fingers. The second embodiment provides a function of deleting the crumpled-paper image content when the multi-touch is released on the content in the state of displaying the crumpled-paper-imaged content.

In reference to FIGS. 75 and 76, the second embodiment will be described in detail as follows.

Figure 75:
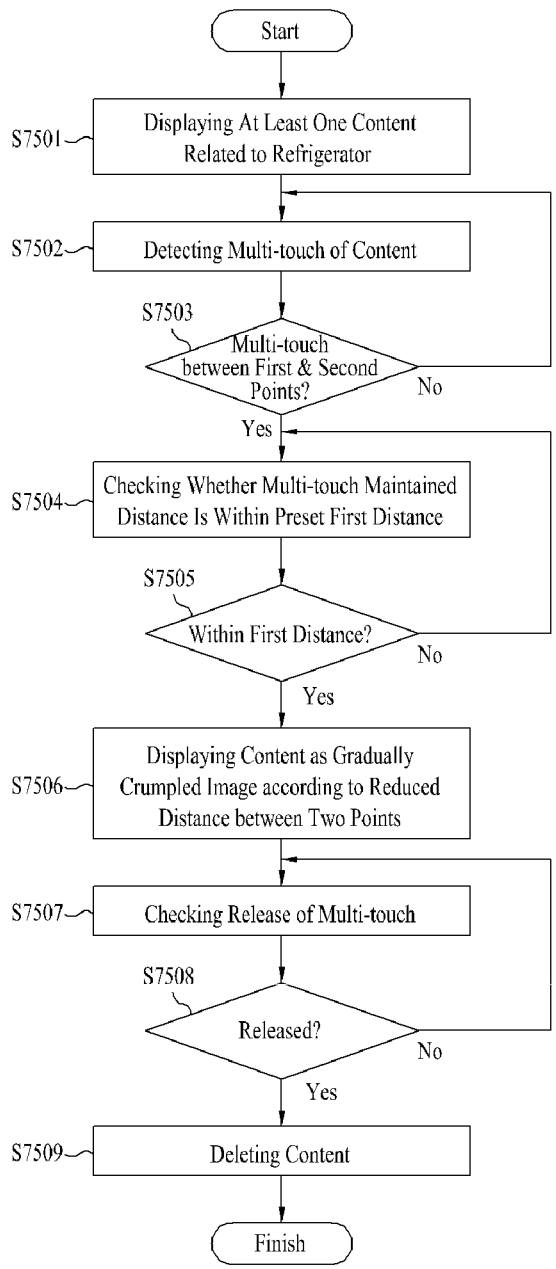
FIG. 75 is a flow chart of a second embodiment illustrating a process of deleting contents on a screen, using multi-touch according to the present invention.

FIG. 75 is a flow chart of the second embodiment illustrating a process of deleting contents on a screen by multi-touch.

Figure 76:
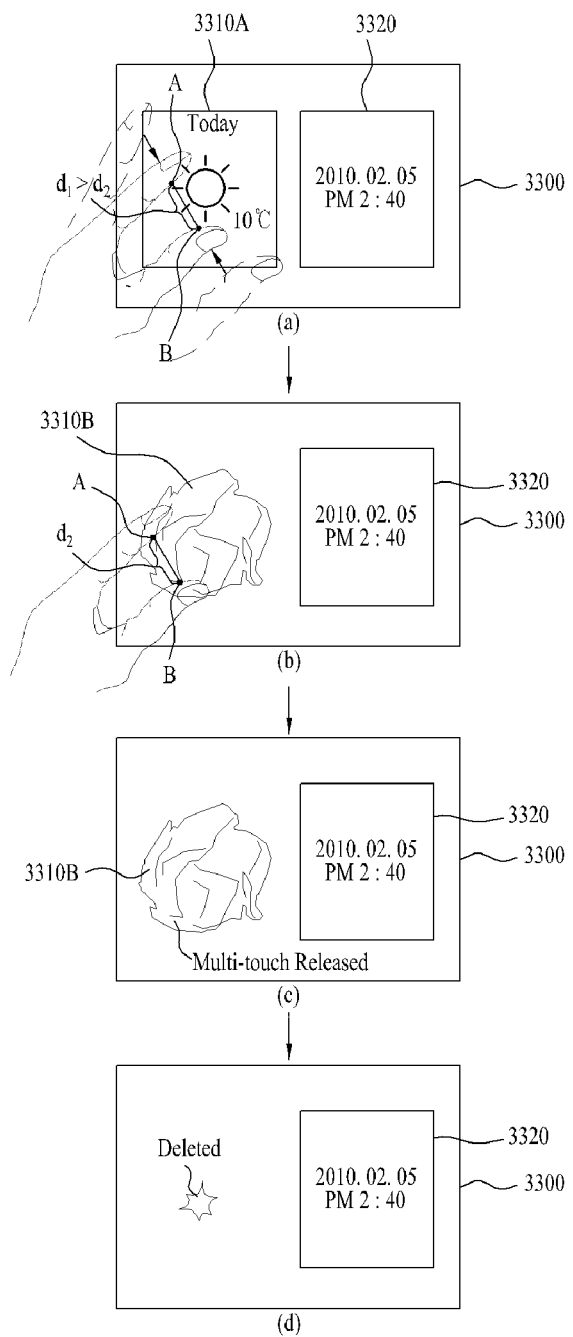
FIG. 76 is a screen state diagram of a second embodiment illustrating a process of deleting contents on a screen, using multi-touch according to the present invention.

FIG. 76 is a screen state diagram of the second embodiment illustrating the process of deleting the contents on the screen by multi-touch.

In reference to FIGS. 75 and 76, the controller 280 of the refrigerator 200 for the refrigerator displays at least one contents related to the refrigerator 100 on the screen of the display module 241 (S7501).

Hence, the controller 280 detects whether the user's multi-touch is input on a currently displayed contents via the display module 241 (S7502).

When first and second points are multi-touched on the contents by the user based on the result of the detection (S7503), the controller 280 detects whether a distance between the first and second points is reduced within a preset first distance in a state of maintaining the user's multi-touch on the contents (S7504).

When the distance between the first and second points is reduced within the preset first distance (S7505), the controller 280 changes the contents into a gradually crumpled paper image, corresponding to the reduced distance between the first and second points (S7506).

In other words, the controller 280 displays the contents as an image of paper gradually crumpled according to the reduced distance between the two points.

Hence, in the state of displaying the content as the crumpled paper image, the controller checks whether to release the multi-touch on the crumpled-paper imaged content (S7507).

When the multi-touch on the crumpled-paper imaged content is released (S7508), the controller 280 deletes the crumpled-paper-imaged contents (S7509).

In other words, according to this embodiment (the second embodiment) of the invention, the contents may be displayed in the gradually crumpled image as the distance between the two multi-touched points is gradually reduced. Once the multi-touch on the content is released, the controller 280 deletes the content on the screen.

For example, FIG. 76 (a) illustrates a first content 3310A having information related to the current weather information and a second content 3320 having the current date information that are displayed on a screen 3300 of the display module 241.

Also, FIG. 76 (a) illustrates that A and B are multi-touched on the first content 3310A and that a distance between A and B is d1.

When the distance between the multi-touched A and B is reduce from d1 to d2 on the first content 3310 as shown in FIG. 76 (b), the controller 280 changes and display the first content 3310A into a first image 3310B of crumpled paper according to the reduced distance between A and B (d1−d2) as shown in FIG. 70 (c).

When the multi-touch maintained on the first image 3310B is released as shown in FIG. 76 (c), the controller 280 deletes the first content 3310A having the first image 3310B on the screen 3300 as shown in FIG. 76 (d).

Although not shown in the drawings related to the second embodiment of content management, the process of FIGS. 72 to 74 according to the first embodiment related to the content management may be combined with the process according to the second embodiment related to the content management.

In reference to FIGS. 77 and 78, a third embodiment related to the content management will be described in detail.

The third embodiment related to the content deleting and restoring will be as follows.

Once multi-touch implemented by the user's drawing in fingers on the content, the content is changed into a crumpled paper image according to a drawing degree of the fingers. The second embodiment provides a function of deleting the crumpled-paper image content when the multi-touch is released on the content in the state of displaying the crumpled-paper-imaged content.

Figure 77:
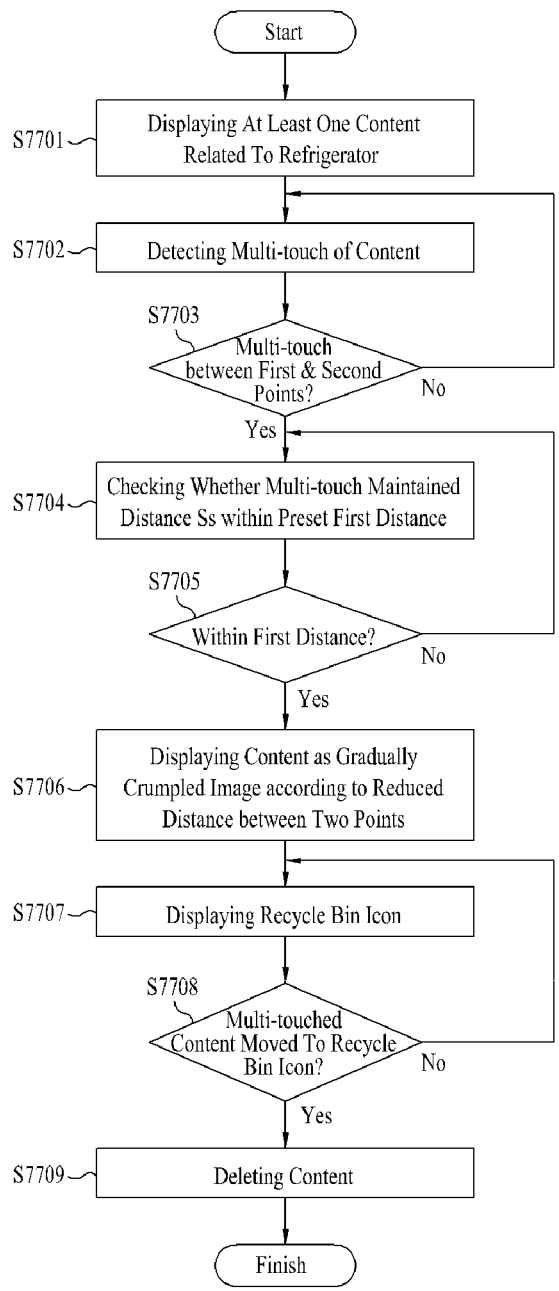
FIG. 77 is a screen state diagram of a third embodiment illustrating a process of deleting contents on a screen, using multi-touch according to the present invention.

FIG. 77 is a screen state diagram of a third embodiment illustrating a process of deleting contents on a screen, using multi-touch according to the present invention.

Figure 78:
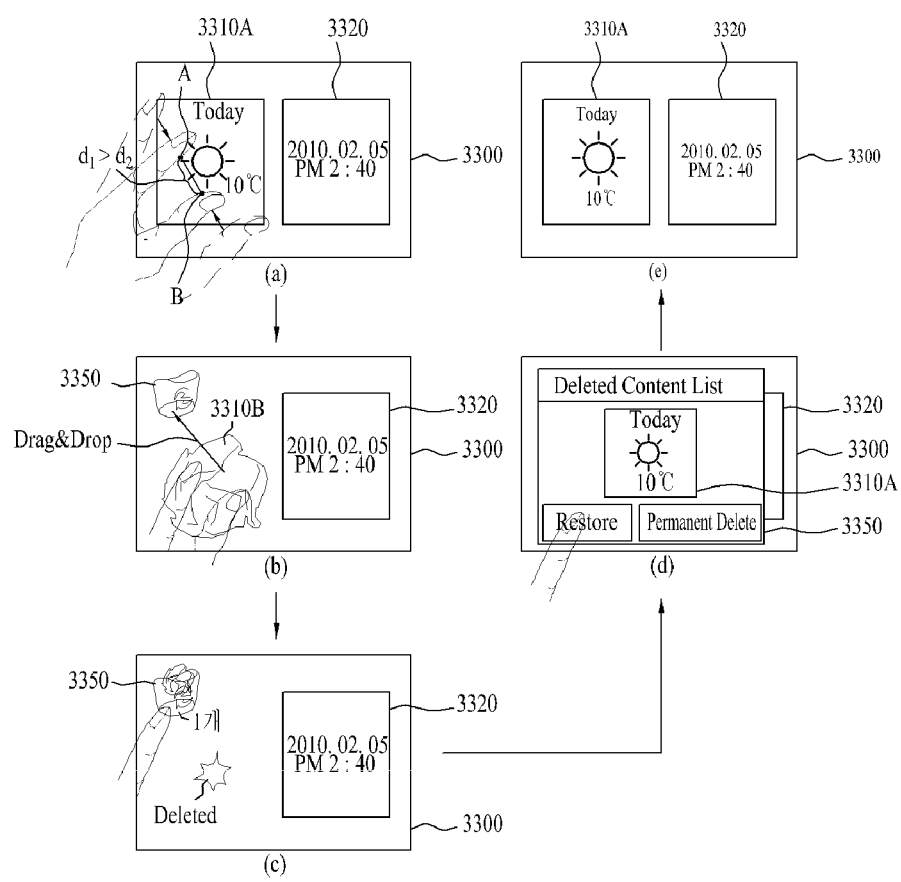
FIG. 78 is a screen state diagram of a third embodiment illustrating a process of deleting contents on a screen, using multi-touch according to the present invention.

FIG. 78 is a screen state diagram of a third embodiment illustrating a process of deleting contents on a screen, using multi-touch according to the present invention.

In reference to FIGS. 77 and 78, the controller 280 of the refrigerator 200 for the refrigerator displays at least one contents related to the refrigerator 100 on the screen of the display module 241 (S7701).

Hence, the controller 280 detects whether the user's multi-touch is input on a currently displayed contents via the display module 241 (S7702).

When first and second points are multi-touched on the contents by the user based on the result of the detection (S7703), the controller 280 detects whether a distance between the first and second points is reduced within a preset first distance in a state of maintaining the user's multi-touch on the contents (S7704).

When the distance between the first and second points is reduced within the preset first distance (S7705), the controller 280 changes the contents into a gradually crumpled paper image, corresponding to the reduced distance between the first and second points (S7706).

In other words, the controller 280 displays the contents as an image of paper gradually crumpled according to the reduced distance between the two points.

When the distance between the first and second points id reduced within a preset first distance, the controller 280 displays an icon for deleting the crumpled paper imaged content on the screen (S7707). In this instance, the icon may be a recycle bin image.

Hence, the crumpled paper imaged content is dragged and dropped to the recycle bin icon by the user's touch (S7708) and the controller 280 then deletes the crumpled paper imaged content (S7709).

In other words, according to the third embodiment, the content is displayed more crumpled image as the distance between the two multi-touched points is gradually reduced, in the state of the user maintaining the multi-touch on a specific content. Once the content is dragged and dropped in the recycle bin icon, the controller deletes the content on the screen.

For example, FIG. 78 (a) illustrates a first content 3310A having information related to the current weather information and a second content 3320 having the current date information that are displayed on a screen 3300 of the display module 241.

When the distance between the multi-touched A and B is reduce from d1 to d2 on the first content 3310 as shown in FIG. 78 (b), the controller 280 changes and display the first content 3310A into a first image 3310B of crumpled paper according to the reduced distance between A and B (d1−d2) as shown in FIG. 70 (c).

When the first content 3310A is changed into the first image 3310B as shown in FIG. 78 (b), the controller displays a recycle bin icon 3350 to delete the first content 3310A in the first image 3310B on the screen 3300.

When the first image 3310B is dragged and dropped in the recycle bin icon 3350 in the state of the user maintaining the multi-touch on the first image 3310B as shown in FIG. 78 (b), the controller 280 deletes the first content 3310A displayed in the first image 3310B on the screen 3300 as shown in FIG. 78 (c).

When the user selects the recycle bin icon 3350 in the state of deleting the first content 3310A by moving it to the recycle bin icon 3350 as shown in FIG. 78 (c), the controller displays a list of contents stored in the recycle bin icon 3350 as shown in FIG. 78 (d).

When a command of restoring the deleted first content 3310A from the list of the contents stored in the recycle bin icon 3350, the controller 280 restores the deleted first content 3310A on the screen 3300 as shown in FIG. 78 (e).

The present invention described above may be embodied in a recording medium as a code that can be read by a computer.

For example, the recording medium readable by the computer may be a ROM, RAM, CD-ROM, magnetic tape, floppy disk, optical data storing device, and it may be embodied as a carrier wave type (for example, transmission via internet).

The computer may include the controller 280 of the terminal 200 for the refrigerator.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Various variations and modifications of the terminal for the refrigerator and the control method thereof are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A refrigerator comprising a terminal to provide content related to the refrigerator, the terminal comprising:
   a touch screen to display at least one content related to the refrigerator; and
   a controller configured to delete the content on the screen, when a distance between first and second points is within a preset distance in a state of multi-touching first and second points on the content and to check whether the multi-touch is maintained,
   wherein, when a maintained distance of the multi-touch is within a first preset distance, the controller displays the content as a crumpled image,
   wherein the controller gradually increases a crumpled degree of the content as the distance between the two multi-touched points is reduced corresponding to a reduced distance between two points when the reduced distance is within the first preset distance,
   wherein, when the multi-touch on the content is released in a state that a maintained distance of the multi-touch is within a second preset distance, the controller deletes the content, and
   wherein, the controller displays the content as an initial image, when the controller detects that the multi-touch is not maintained.

2. The refrigerator according to claim 1, wherein, prior to displaying the content as the crumpled image, the controller displays the content as the initial image, and
   wherein, when the maintained distance of the multi-touch is over the preset distance, the controller changes the content displayed as the crumpled image to the initial image.

3. The refrigerator according to claim 2, wherein the controller gradually reduces a crumpled degree of the content according to an increased distance of the multi-touch, to display the content as the initial image.

4. The refrigerator according to claim 1, wherein, when a maintained distance of the multi-touch is within the preset distance, the controller displays a recycle bin icon for deleting a crumpled image of the content on the touch screen, and, when the content is dragged and dropped to the recycle bin icon, the controller deletes the content.

5. The refrigerator according to claim 4, wherein, prior to deleting the content, the content is displayed at an initial position on the touch screen, and
   wherein, when the recycle bin icon is selected, the controller displays at least one content deleted via the recycle bin icon, and, when the content is selected, the controller displays the content at the initial position on the touch screen again.

6. The refrigerator according to claim 1, wherein, when the multi-touch on the content is released in a state that the content is displayed as the crumpled image, the controller displays a recycle bin icon for deleting the content, and, when the content is dragged and dropped to the recycle bin icon, the controller deletes the content.

* * * * *